US011743897B2

(12) United States Patent
Luo et al.

(10) Patent No.: US 11,743,897 B2
(45) Date of Patent: Aug. 29, 2023

(54) TECHNIQUES FOR CONFIGURING UPLINK CHANNELS IN UNLICENSED RADIO FREQUENCY SPECTRUM BANDS

(71) Applicant: QUALCOMM Incorporated, San Diego, CA (US)

(72) Inventors: Tao Luo, San Diego, CA (US); Wanshi Chen, San Diego, CA (US); Durga Prasad Malladi, San Diego, CA (US); Yongbin Wei, San Diego, CA (US); Naga Bhushan, San Diego, CA (US); Aleksandar Damnjanovic, Del Mar, CA (US); Srinivas Yerramalli, San Diego, CA (US); Tingfang Ji, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/503,584

(22) Filed: Oct. 1, 2014

(65) Prior Publication Data
US 2015/0181589 A1    Jun. 25, 2015

Related U.S. Application Data

(60) Provisional application No. 61/919,518, filed on Dec. 20, 2013.

(51) Int. Cl.
*H04W 72/21*     (2023.01)
*H04L 5/00*      (2006.01)
(Continued)

(52) U.S. Cl.
CPC .......... *H04W 72/21* (2023.01); *H04B 7/0452* (2013.01); *H04L 5/001* (2013.01);
(Continued)

(58) Field of Classification Search
CPC .......... H04W 28/021; H04W 28/0205; H04W 16/14; H04W 28/02; H04W 16/02;
(Continued)

(56) References Cited

U.S. PATENT DOCUMENTS 8,670,410 B2   3/2014   Luo et al.
8,913,672 B2   12/2014  Luo et al.
(Continued)

FOREIGN PATENT DOCUMENTS

CN    1973459 A     5/2007
CN    102036301 A   4/2011
(Continued)

OTHER PUBLICATIONS

Ahmed Mohsin N., "LTE Uplink Modeling and Channel Estimation", Jun. 2011, Master Thesis Performed in Computer Engineering Division, Department of Electrical Engineering, Linköping University, S-581 83 Linköping, Sweden, Total pp. 63 (Year: 2011).*

(Continued)

*Primary Examiner* — Shah M Rahman
(74) *Attorney, Agent, or Firm* — Dalei Dong; Holland & Hart LLP

(57) ABSTRACT

Techniques are described for wireless communication. An orthogonal frequency-division multiple access (OFDMA) configuration of an uplink channel is identified for communications in an unlicensed radio frequency spectrum band. An OFDMA waveform is generated based on the identified OFDMA configuration. The OFDMA waveform is communicated in a signal in the unlicensed radio frequency spectrum band. A virtual cell identifier of a first base station may be associated with transmissions between the first base station and a first user equipment (UE). A set of common resource blocks may be identified for transmission of a demodulation reference signal (DM-RS) between the first (Continued)

US 11,743,897 B2
Page 2 base station and the first UE. A configuration of an uplink channel may be dynamically selected for uplink communications in an unlicensed radio frequency spectrum band. A waveform may be generated based on the selected configuration. The waveform may be communicated in a signal in the unlicensed radio frequency spectrum band.

96 Claims, 30 Drawing Sheets

(51) Int. Cl.
- H04L 27/00 (2006.01)
- H04B 7/0452 (2017.01)
- H04W 74/08 (2009.01)
- H04B 7/06 (2006.01)
- H04W 16/14 (2009.01)
- H04B 7/0456 (2017.01)

(52) U.S. Cl.
CPC .......... *H04L 5/0032* (2013.01); *H04L 5/0041* (2013.01); *H04L 5/0048* (2013.01); *H04L 5/0051* (2013.01); *H04L 5/0073* (2013.01); *H04L 27/0006* (2013.01); *H04W 74/0833* (2013.01); *H04B 7/0456* (2013.01); *H04B 7/0604* (2013.01); *H04L 5/0007* (2013.01); *H04L 5/0044* (2013.01); *H04L 5/0053* (2013.01); *H04W 16/14* (2013.01)

(58) Field of Classification Search
CPC . H04W 28/00; H04W 16/00; H04W 72/0413; H04W 74/0833; H04W 72/21; H04B 7/0452; H04B 7/0604; H04B 7/0456; H04L 5/001; H04L 5/0051; H04L 5/0073; H04L 27/0006; H04L 5/0041; H04L 5/0032; H04L 5/0048; H04L 5/0053; H04L 5/0044; H04L 5/0007
See application file for complete search history.

(56) References Cited

U.S. PATENT DOCUMENTS

| | | | | |
|---|---|---|---|---|
| 2007/0153684 A1* | 7/2007 | Choi | H04W 72/06 | 370/229 |
| 2007/0274288 A1* | 11/2007 | Smith | H04L 5/0092 | 370/351 |
| 2008/0318608 A1* | 12/2008 | Inoue | H04B 1/707 | 455/509 |
| 2009/0175159 A1* | 7/2009 | Bertrand | H04W 72/0406 | 370/203 |
| 2009/0316814 A1* | 12/2009 | Seo | H04B 7/0665 | 375/260 |
| 2010/0034152 A1* | 2/2010 | Imamura | H04L 5/0007 | 370/329 |
| 2010/0208629 A1* | 8/2010 | Ahn | H04L 5/0053 | 370/280 |
| 2010/0246515 A1* | 9/2010 | Tsai | H04L 5/005 | 370/329 |
| 2011/0039568 A1* | 2/2011 | Zhang | H04W 72/14 | 455/452.1 |
| 2011/0141928 A1* | 6/2011 | Shin | H04L 1/0028 | 370/252 |
| 2011/0170459 A1* | 7/2011 | Anderson | H04L 1/0041 | 370/280 |
| 2011/0171985 A1* | 7/2011 | Papasakellariou | H04W 72/02 | 455/509 |
| 2011/0188481 A1* | 8/2011 | Damnjanovic | H04W 16/10 | 370/336 |
| 2011/0201341 A1* | 8/2011 | Choudhury | H04W 72/0426 | 455/450 |
| 2011/0205988 A1* | 8/2011 | Zhang | H04L 1/06 | 370/329 |
| 2012/0093020 A1* | 4/2012 | Iwai | H04L 5/0053 | 370/252 |
| 2012/0093089 A1* | 4/2012 | Park | H04B 7/0417 | 370/328 |
| 2012/0127948 A1* | 5/2012 | Chung | H04L 5/0053 | 370/329 |
| 2012/0140726 A1* | 6/2012 | Moon | H04B 7/2606 | 370/329 |
| 2012/0250631 A1 | 10/2012 | Hakola et al. | | |
| 2013/0034062 A1* | 2/2013 | Seo | H04L 12/40026 | 370/329 |
| 2013/0089063 A1* | 4/2013 | Yang | H04W 72/0413 | 370/329 |
| 2013/0203458 A1 | 8/2013 | Charbit et al. | | |
| 2013/0229931 A1 | 9/2013 | Kim | | |
| 2013/0242882 A1* | 9/2013 | Blankenship | H04L 5/0039 | 370/329 |
| 2013/0242890 A1* | 9/2013 | He | H04W 72/0413 | 370/329 |
| 2013/0250874 A1 | 9/2013 | Luo et al. | | |
| 2013/0265945 A1* | 10/2013 | He | H04W 60/04 | 370/329 |
| 2013/0279437 A1 | 10/2013 | Ng et al. | | |
| 2014/0029537 A1* | 1/2014 | Golitschek Edler von Elbwart | H04W 72/042 | 370/329 |
| 2014/0036889 A1* | 2/2014 | Kim | H04L 1/1854 | 370/336 |
| 2014/0105151 A1* | 4/2014 | Hong | H04W 72/04 | 370/329 |
| 2014/0112277 A1 | 4/2014 | Yang et al. | | |
| 2014/0153478 A1* | 6/2014 | Kazmi | H04B 7/15542 | 370/315 |
| 2014/0169316 A1* | 6/2014 | Kim | H04L 5/0048 | 370/329 |
| 2014/0211736 A1 | 7/2014 | Noh et al. | | |
| 2014/0293881 A1 | 10/2014 | Khoshnevis et al. | | |
| 2014/0329553 A1* | 11/2014 | Nakashima | H04W 52/365 | 455/522 |
| 2014/0348063 A1 | 11/2014 | Kang et al. | | |
| 2014/0348115 A1* | 11/2014 | Wang | H04N 21/2365 | 370/329 |
| 2014/0362780 A1* | 12/2014 | Malladi | H04W 16/14 | 370/329 |
| 2015/0009939 A1* | 1/2015 | Zhang | H04W 72/1289 | 370/329 |
| 2015/0036566 A1* | 2/2015 | Blankenship | H04W 52/281 | 370/311 |
| 2015/0146681 A1* | 5/2015 | Liu | H04L 5/0007 | 370/330 |
| 2015/0162966 A1* | 6/2015 | Kim | H04B 17/00 | 370/252 |
| 2015/0181366 A1* | 6/2015 | Chae | H04W 56/004 | 370/336 |
| 2015/0181589 A1* | 6/2015 | Luo | H04L 5/0048 | 370/329 |
| 2015/0237602 A1* | 8/2015 | Chae | H04W 72/042 | 370/329 |
| 2015/0271788 A1* | 9/2015 | Kim | H04L 5/0053 | 370/329 |
| 2015/0319779 A1* | 11/2015 | Li | H04L 27/2613 | 370/329 |
| 2016/0006546 A1* | 1/2016 | Yl | H04L 5/001 | 370/329 |
| 2016/0066292 A1* | 3/2016 | Womack | H04W 56/0005 | 370/350 |
| 2016/0192385 A1* | 6/2016 | Tooher | H04W 72/0446 | 370/336 |
| 2016/0234850 A1* | 8/2016 | Freda | H04W 72/02 | |
| 2019/0007173 A1* | 1/2019 | Dabeer | H04L 1/1621 | |
| 2019/0124656 A1* | 4/2019 | Yerramalli | H04W 74/085 | |
| 2019/0191486 A1* | 6/2019 | Myung | H04L 5/0044 | |
| 2019/0239247 A1* | 8/2019 | Koorapaty | H04W 72/0446 | |

(56) References Cited

U.S. PATENT DOCUMENTS

| | | | | |
|---|---|---|---|---|
| 2019/0288814 | A1* | 9/2019 | Horiuchi | H04L 5/0053 |
| 2019/0394760 | A1* | 12/2019 | Hwang | H04W 72/042 |
| 2021/0144737 | A1* | 5/2021 | Cao | H04L 5/0094 |

FOREIGN PATENT DOCUMENTS

| | | | | | |
|---|---|---|---|---|---|
| CN | 102438247 | A | | 5/2012 | |
| CN | 102460998 | A | | 5/2012 | |
| CN | 102860070 | A | | 1/2013 | |
| CN | 104683083 | A | * | 6/2015 | H04B 7/028 |
| JP | 2011514723 | A | | 5/2011 | |
| JP | 2011530837 | A | | 12/2011 | |
| KR | 20050123041 | A | | 12/2005 | |
| KR | 20070060791 | A | | 6/2007 | |
| KR | 20080060843 | A | | 7/2008 | |
| KR | 20130138826 | A | | 12/2013 | |
| WO | WO-2006001658 | A1 | | 1/2006 | |
| WO | WO-2008078932 | A1 | | 7/2008 | |
| WO | WO-2010030941 | A2 | | 3/2010 | |
| WO | WO-2011129628 | A2 | | 10/2011 | |
| WO | WO-2012037408 | | | 3/2012 | |
| WO | WO-2012141462 | A2 | | 10/2012 | |
| WO | WO-2012148445 | A1 | | 11/2012 | |
| WO | WO-2013015576 | A2 | | 1/2013 | |
| WO | WO-2013015653 | A2 | | 1/2013 | |
| WO | WO-2013025054 | A2 | | 2/2013 | |
| WO | WO-2013050869 | A1 | | 4/2013 | |
| WO | WO-2013067463 | A1 | | 5/2013 | |
| WO | WO-2013157892 | A1 | | 10/2013 | |

OTHER PUBLICATIONS

McBeath et al., "Efficient Signaling for VoIP in OFDMA", Proc. IEEE WCNC'07, Mar. 2007. Total pp. 5 (Year: 2007).*
Ahmed Mohsin N.,"LTE Uplink Modeling and Channel Estimation", Jun. 2011, Master Thesis Performed in Computer Engineering Division, Department of Electrical Engineering, Linköping University, S-58183 Linköping, Sweden, Total Pages: 63 (Year: 2011).*
McBeath et al., "Efficient Signaling for VoIP in OFDMA", Proc. IEEE WCNC'07, Mar. 2007, Total Pages: 5 (Year: 2007).*
ISA/EPO, Partial International Search Report of the International Searching Authority, Int'l. App. No. PCT/US2014/069330, dated Mar. 11, 2015, European Patent Office, Rijswijk, NL, 5 pgs.
IPEA/EPO, Second Written Opinion of the International Preliminary Examining Authority, Int'l Appl. No. PCT/US2014/069330, dated Feb. 24, 2016, European Patent Office, Rijswijk, NL, 10 pgs.
Hitachi Ltd., "Consideration for DL DMRS for CoMP," 3GPP TSG-RAN WG1 Meeting #69, Prague, Czech Republic, May 21-25, 2012, 4 pgs., R1-122706, 3rd Generation Partnership Project.
ISA/EPO, International Search Report and Written Opinion of the International Searching Authority, Int'l Appl. No. PCT/US2014/069330, dated Jun. 10, 2015, European Patent Office, Rijswijk, NL, 19 pgs.
New Postcom, "Remaining Issues on Uplink Control Signaling," 3GPP TSG RAN WG1 Meeting #70, Qingdao, China, Aug. 13-17, 2012, 6 pgs., R1-123350, 3rd Generation Partnership Project.
European Search Report—EP17193338—Search Authority—The Hague—dated Aug. 24, 2018.
3GPP: "3rd Generation Partnership Project; Remaining issues on SRS Configuration," TSG RAN WG1 meeting #70, 3GPP, R1-123352, Qingdao, China, Aug. 2012, 5 pages.
Spreadtrum Communications: "Exploiting the Potentials of TDD Schemes for IMT-Advanced," 3GPP TSG RAN WG1 #54 meeting, R1-083246, Jeju, Korea, Aug. 18-23, 2008, (Aug. 14, 2008), 3 pages.
InterDigital Communications: et al., "Improving LTE UL Coverage for VoIP", R1-120145, 3GPP TSG RAN WG1 #68, 3GPP Sever Publication Date (Jan. 31, 2012), Dresden, Germany, Feb. 6-10, 2012, 5 pages.
Intel Corporation: Remaining Issues of Antenna Ports Quasi Co-Location Definition, 3GPP Draft, 3GPP TSG-RAN WG1 #70, R1-123425, Qingdao, China, Aug. 13-17, 2012, 7 Pages.
Nishio A., et al., "System Evaluation of MU-MIMO and Multi-Cluster Allocation in LTE-Advanced Uplink", Jan. 1, 2012, XP055247010, 5 Pages.

* cited by examiner

TECHNIQUES FOR CONFIGURING UPLINK CHANNELS IN UNLICENSED RADIO FREQUENCY SPECTRUM BANDS

CROSS REFERENCES

The present Application for Patent claims priority to U.S. Provisional Patent Application No. 61/919,518 by Luo et al., entitled "Techniques For Configuring Uplink Channels In Unlicensed Radio Frequency Spectrum Bands," filed Dec. 20, 2013, assigned to the assignee hereof, and which is hereby incorporated by reference in its entirety.

FIELD OF THE DISCLOSURE

The present disclosure, for example, relates to wireless communication systems, more specifically to techniques for configuring uplink channels in unlicensed radio frequency spectrum bands.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

For example, a wireless multiple-access communication system may include a number of base stations, each simultaneously supporting communication for multiple user equipments (UEs, such as mobile devices). A base station may communicate with UEs on downlink channels (e.g., for transmissions from a base station to a UE) and uplink channels (e.g., for transmissions from a UE to a base station).

The configuration of an uplink channel may have an impact on one or more metrics associated with the uplink channel (e.g., metrics related to symbol power or channel quality). The configuration of an uplink channel may also impact the ability to cancel interference from other waveforms when receiving and/or decoding the uplink channel, for example.

SUMMARY

The present disclosure, for example, relates to one or more techniques for configuring an uplink channel for uplink communications in an unlicensed radio frequency spectrum band. In some examples, the techniques may provide for dynamically selecting a configuration of an uplink channel for uplink communications in an unlicensed radio frequency spectrum band (e.g., a shared radio frequency spectrum band usable for Wi-Fi and/or LTE/LTE-A communications). The configuration may be selected, for example, from among an OFDMA configuration, a single carrier frequency-division multiple access (SC-FDMA) configuration, and a resource block (RB) interleaved FDMA configuration. In other examples, the techniques may provide for generating and/or communicating an OFDMA waveform in a signal in the unlicensed radio frequency spectrum band using the uplink channel. The OFDMA waveform may be variously configured for an uplink channel including a physical uplink shared channel (PUSCH), a physical uplink control channel (PUCCH), and/or a physical random access channel (PRACH), for example. In other examples, the techniques may provide for interference cancelation when an uplink channel is received and/or decoded.

In a first set of illustrative examples, a method for wireless communication is described. In one example, the method may include identifying an OFDMA configuration of an uplink channel for uplink communications in an unlicensed radio frequency spectrum band, generating an OFDMA waveform based on the identified OFDMA configuration, and communicating the generated OFDMA waveform in a signal in the unlicensed radio frequency spectrum band using the uplink channel.

In some examples, the uplink channel may include a Physical Uplink Shared Channel (PUSCH). In these examples, the method may further include allocating resources for the PUSCH based at least in part on a bitmap of interlaces or resource blocks, or based at least in part on a starting resource block and a number of resource blocks. In some examples, the method may include allocating resources for the PUSCH based at least in part on a starting interlace and a number of interlaces, and the interlace may be a pre-defined set of resource blocks selected to span an entire bandwidth. In some examples, allocating the resources for the PUSCH is for multi-cluster transmission in which a user equipment is assigned to two or more clusters adjacent to each other. In such a case, the method may include allocating resources for the PUSCH based in part on two or more of the resource blocks assigned to the user equipment. The method may also or alternately include mapping one or more modulation symbols to one or more resource elements according to one or more OFDM symbol positions, or mapping one or more modulation symbols to one or more resource elements according to one or more frequency sub-carriers, or mapping one or more modulation symbols to one or more resource elements according to an interleaving of time slots and frequency sub-carriers. The method may also or alternately include transmitting a demodulation reference signal (DM-RS) on the uplink channel in a first set of one or more time slots and one or more first frequency sub-carriers. The first set of one or more time slots and one or more first frequency sub-carriers may be the same as a second set of one or more time slots and one or more second frequency sub-carriers used to receive a user equipment specific reference signal (UE-RS) on a downlink channel. The method may also or alternately include transmitting a DM-RS on the uplink channel in a first set of one or more time slots and one or more first frequency sub-carriers. The first set of one or more time slots and one or more first frequency sub-carriers may differ in at least one respect from a second set of one or more time slots and one or more second frequency sub-carriers used to receive a UE-RS on a downlink channel.

In some examples, the method may include using PRB bundling when generating the OFDMA waveform based on the identified OFDMA configuration. The method may also or alternately include using precoder cycling when generating the OFDMA waveform based on the identified OFDMA configuration, wherein a precoder may be cycled through a pre-defined set of precoders. The precoder used for the precoder cycling may be indicated by a base station as part of an uplink grant. In some examples, the precoder may be derived by a UE based at least in part on downlink channel state information reference signal (CSI-RS) transmissions. [0010] In some examples, the uplink channel may include an uplink multiple-input multiple-output (UL-MIMO) channel or a multi-user MIMO (MU-MIMO) channel.

In some examples, the method may include applying symbol permutation or phase rotation to reduce a metric indicating symbol power when generating the OFDMA waveform based on the identified OFDMA configuration. The method may also or alternately include applying different scrambling sequences to the OFDMA waveform, and selecting one of the scrambling sequences for use when communicating the generated OFDMA waveform in the signal in the unlicensed radio frequency spectrum band.

In some examples, the uplink channel may include a Physical Uplink Control Channel (PUCCH). In these examples, communicating the generated OFDMA waveform in a signal in the unlicensed radio frequency spectrum band using the uplink channel may include transmitting duplicate copies of the PUCCH in a plurality of interleaved resource blocks. Communicating the generated OFDMA waveform in a signal in the unlicensed radio frequency spectrum band using the uplink channel may also or alternately include multiplexing the PUCCH within a plurality of interleaved resource blocks according to a code division multiplexing sequence or other orthogonal sequence. Communicating the generated OFDMA waveform in a signal in the unlicensed radio frequency spectrum band using the uplink channel may also or alternately include multiplexing the PUCCH within a plurality of resource elements of an enhanced resource element group.

In some examples, the uplink channel may include a Physical Random Access Channel (PRACH) transmitted on one or more pre-allocated interlaces.

In some examples, the method may include transmitting a sounding reference signal (SRS) on the uplink channel. The SRS may be located in an OFDM symbol position of a subframe that is different from a last OFDM symbol position of the subframe. In other examples, the method may include communicating the generated OFDMA waveform without an SRS in the signal in the unlicensed radio frequency spectrum band using the uplink channel.

In some examples, the method may include transmitting a channel state information reference signal (CSI-RS) in the uplink channel, independent of an allocation of resources and on all resource blocks. In some examples, the CSI-RS may be transmitted depending on a resource allocation. In these examples, the method may include indicating a rate matching for a PUSCH and a PUCCH to accommodate transmission of the CSI-RS. The method may also or alternately include transmitting a channel state information interference measurement (CSI-IM) in the uplink channel. In some examples, the method may further include generating, by a base station, a precoder to be used in a downlink channel based at least in part on the uplink CSI-RS transmission.

In some examples, the method may include using a first set of resource blocks to transmit the uplink channel when the uplink channel comprises a PUCCH but not a PUSCH, and using a second set of resource blocks to transmit the uplink channel when the uplink channel comprises the PUSCH but not the PUCCH. The second set of resource blocks may be different than the first set of resource blocks. In these examples, and when the uplink channel comprises the PUCCH and the PUSCH, the method may further include frequency division multiplexing the PUCCH and the PUSCH on the uplink channel, using a subset of less than all of the first set of resource blocks to transmit the PUCCH, and using at least some of the second set of resource blocks to transmit the PUSCH. When the PUCCH and the PUSCH are frequency division multiplexed, the method may also include using at least one of the first set of resource blocks to transmit the PUSCH. Also or alternately, when the uplink channel includes the PUCCH and the PUSCH, the method may include frequency division multiplexing the PUCCH and the PUSCH by puncturing at least one frequency sub-input of at least one resource block of the first set of resource blocks to transmit at least part of the PUSCH.

In some examples, the method may include frequency division multiplexing a PUCCH and a PUSCH on the uplink channel, transmitting acknowledgements pertaining to a Physical Downlink Shared Channel (PDSCH) as part of the PUCCH, and transmitting channel quality information (CQI) as part of the PUSCH. In some examples, transmitting the CQI as part of the PUSCH may include transmitting CQI of a plurality of downlink carriers simultaneously.

In some examples, the method may include receiving signaling from a base station, and selecting the OFDMA configuration of the uplink channel based at least in part on the received signaling. In these examples, the signaling from the base station may indicate a resource block allocation, and the OFDMA configuration of the uplink channel may be selected based at least in part on the resource block allocation. In some examples, the OFDMA configuration of the uplink channel may be selected based at least in part on a modulation and coding scheme (MCS) indicated in a downlink grant received from the base station. In some examples, the OFDMA configuration of the uplink channel may be selected based at least in part on whether an uplink multiple-input multiple-output (UL-MIMO) or multi-user MIMO (MU-MIMO) is enabled or disabled.

In a second set of illustrative examples, an apparatus for wireless communication is described. In one example, the apparatus may include means for identifying an OFDMA configuration of an uplink channel for uplink communications in an unlicensed radio frequency spectrum band, means for generating an OFDMA waveform based on the identified OFDMA configuration, and means for communicating the generated OFDMA waveform in a signal in the unlicensed radio frequency spectrum band using the uplink channel. In certain examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to identify an OFDMA configuration of an uplink channel for uplink communications in an unlicensed radio frequency spectrum band, generate an OFDMA waveform based on the identified OFDMA configuration, and communicate the generated OFDMA waveform in a signal in the unlicensed radio frequency spectrum band using the uplink channel. In certain examples, the instructions may also be executable by the processor to implement one or more aspects of the method for wireless communication described above with respect to the first set of illustrative examples.

In a fourth set of illustrative examples, a computer program product for communication by a wireless communications apparatus in a wireless communications network is described. In one example, the computer program product may include a non-transitory computer-readable medium storing computer-executable code for wireless communications, the code executable by a processor to identify an OFDMA configuration of an uplink channel for uplink communications in an unlicensed radio frequency spectrum band, generate an OFDMA waveform based on the identified OFDMA configuration, and communicate the generated OFDMA waveform in a signal in the unlicensed radio frequency spectrum band using the uplink channel. In certain examples, the code may also be executable by the processor to implement one or more aspects of the method for wireless communication described above with respect to the first set of illustrative examples.

In a fifth set of illustrative examples, another method for wireless communication is described. In one example, the method may include associating a virtual cell identifier of a first base station with transmissions between the first base station and a first UE. The virtual cell identifier may also be associated with transmissions between a second base station and a second UE. The method may also include identifying a set of common resource blocks for transmission of a DM-RS in an uplink channel and a downlink channel between the first base station and the first UE. The identification of the set of common resource blocks may be based at least in part on the virtual cell identifier.

In some examples, the method may include identifying a first port associated with a first spatial multiplexing for transmission of the DM-RS between the first base station and the first UE. The first spatial multiplexing may be different from a second spatial multiplexing associated with a second port used to transmit a DM-RS between the second base station and the second UE. In these examples, the method may further include associating a first link identifier with the uplink channel between the first base station and the first UE, associating a second link identifier with the downlink channel between the first base station and the first UE, and transmitting the first link identifier with transmissions in the uplink channel or transmitting the second link identifier with transmissions in the downlink channel. The first link identifier may be different from the second link identifier. Transmitting the first link identifier with transmissions in the uplink channel may include generating the DM-RS as a function of the first link identifier, and transmitting the second link identifier with transmissions in the downlink channel may include generating the DM-RS as a function of the second link identifier.

In a sixth set of illustrative examples, another apparatus for wireless communication is described. In on example, the apparatus may include means for associating a virtual cell identifier of a first base station with transmissions between the first base station and a first UE, and means for identifying a set of common resource blocks for transmission of a DM-RS in an uplink channel and a downlink channel between the first base station and the first UE. The virtual cell identifier may also be associated with transmissions between a second base station and a second UE. The identification of the set of common resource blocks may be based at least in part on the virtual cell identifier. In certain examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor, memory in electronic communication with the processor, and instructions stored in the memory. The instructions may be executable by the processor to associate a virtual cell identifier of a first base station with transmissions between the first base station and a first UE, and identify a set of common resource blocks for transmission of a DM-RS in an uplink channel and a downlink channel between the first base station and the first UE. The virtual cell identifier may also be associated with transmissions between a second base station and a second UE. The identification of the set of common resource blocks may be based at least in part on the virtual cell identifier. In certain examples, the instructions may also be executable by the processor to implement one or more aspects of the method for wireless communication described above with respect to the fifth set of illustrative examples.

In an eighth set of illustrative examples, another computer program product for communication by a wireless communications apparatus in a wireless communications network is described. In one example, the computer program product may include a non-transitory computer-readable medium storing computer-executable code for wireless communications, the code executable by a processor to associate a virtual cell identifier of a first base station with transmissions between the first base station and a first UE, and identify a set of common resource blocks for transmission of a DM-RS in an uplink channel and a downlink channel between the first base station and the first UE. The virtual cell identifier may also be associated with transmissions between a second base station and a second UE. The identification of the set of common resource blocks may be based at least in part on the virtual cell identifier. In certain examples, the code may also be executable by the processor to implement one or more aspects of the method for wireless communication described above with respect to the fifth set of illustrative examples.

In a ninth set of illustrative examples, another method for wireless communication is described. In one example, the method may include dynamically selecting a configuration of an uplink channel for uplink communications in an unlicensed radio frequency spectrum band, generating a waveform based on the selected configuration, and communicating the generated waveform in a signal in the unlicensed radio frequency spectrum band using the uplink channel.

In some examples, the configuration of the uplink channel may be selected from an OFDMA configuration, a single carrier frequency-division multiple access (SC-FDMA) configuration, and a resource block interleaved frequency-division multiple access (FDMA) configuration.

In some examples, the method may include receiving signaling from a base station, and selecting the configuration of the uplink channel based at least in part on the received signaling. In these examples, the signaling from the base station may indicate a resource block allocation, and the configuration of the uplink channel may be selected based at least in part on the resource block allocation. In some examples, the configuration of the uplink channel may be selected based at least in part on a modulation and coding scheme (MCS) indicated in a downlink grant received from the base station. In some examples, the configuration of the uplink channel may be selected based at least in part on whether an uplink multiple-input multiple-output (UL-MIMO) or multi-user MIMO (MU-MIMO) is enabled or disabled.

In a tenth set of illustrative examples, another apparatus for wireless communication is described. In one example, the apparatus may include means for dynamically selecting a configuration of an uplink channel for uplink communications in an unlicensed radio frequency spectrum band, means for generating a waveform based on the selected configuration, and means for communicating the generated waveform in a signal in the unlicensed radio frequency spectrum band using the uplink channel. In certain examples, the apparatus may further include means for implementing one or more aspects of the method for wireless communication described above with respect to the ninth set of illustrative examples.

In an eleventh set of illustrative examples, another apparatus for wireless communication is described. In one example, the apparatus may include a processor, memory in electronic communication with the processor, and instructions stored in the memory. The instructions may be executable by the processor to dynamically select a configuration of an uplink channel for uplink communications in an unlicensed radio frequency spectrum band, generate a waveform based on the selected configuration, and communicate the generated waveform in a signal in the unlicensed radio frequency spectrum band using the uplink channel. In certain examples, the instructions may also be executable by the processor to implement one or more aspects of the method for wireless communication described above with respect to the ninth set of illustrative examples.

In a twelfth set of illustrative examples, another computer program product for communication by a wireless communications apparatus in a wireless communications network is described. The computer program product may include a non-transitory computer-readable medium storing computer-executable code for wireless communications, the code executable by a processor to dynamically select a configuration of an uplink channel for uplink communications in an unlicensed radio frequency spectrum band, generate a waveform based on the selected configuration, and communicate the generated waveform in a signal in the unlicensed radio frequency spectrum band using the uplink channel. In certain examples, the code may also be executable by the processor to implement one or more aspects of the method for wireless communication described above with respect to the ninth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
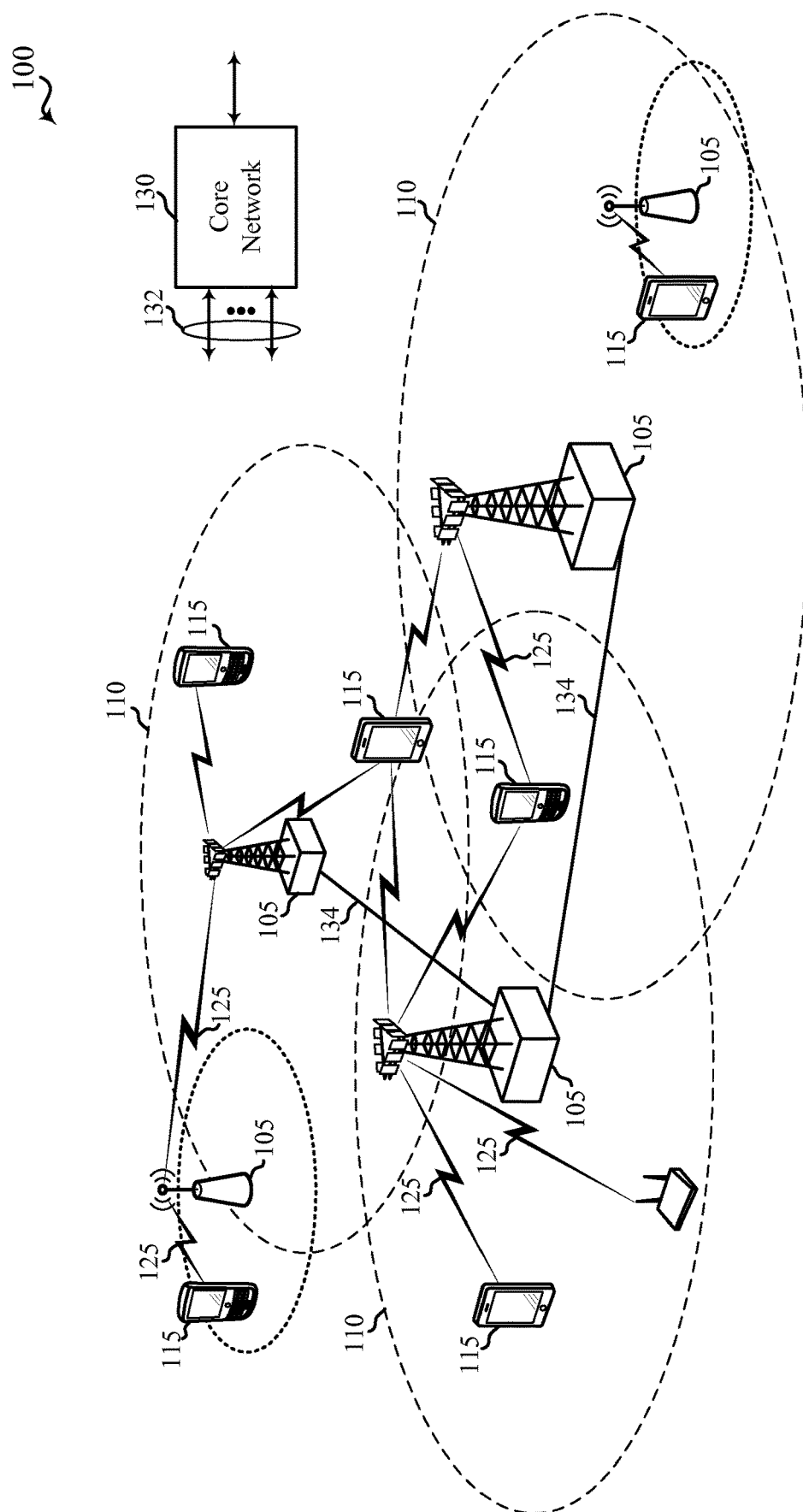
FIG. 1 shows a block diagram of a wireless communication system, in accordance with various aspects of the present disclosure.

When configuring an uplink channel for uplink communications (e.g., LTE/LTE-A transmissions) in an unlicensed radio frequency spectrum band (e.g., a shared radio frequency spectrum band usable for Wi-Fi and/or LTE/LTE-A communications), it may be desirable to configure the uplink channel in different ways, depending on the nature of the uplink communications, the potential for interference, and/or other factors. As disclosed herein, an uplink channel may be configured autonomously (e.g., by a UE), or in response to signaling received from a base station, which signaling may indicate how the uplink channel needs to be configured or provide information from which a UE may determine how to configure the uplink channel. An uplink channel may also be configured based on a type or types of channel included in the uplink channel, such as a PUSCH, a PUCCH, and/or a physical random access channel (PRACH). An uplink channel may also be configured based on a potential for interference and/or other factors.

In some examples, an uplink channel for LTE/LTE-A uplink communications in an unlicensed radio frequency spectrum band may be different from an uplink channel for LTE/LTE-A uplink communications in a licensed radio frequency spectrum band, and there may be advantages to configuring the uplink channel for LTE/LTE-A uplink communications in the unlicensed radio frequency spectrum band differently than the uplink channel for LTE/LTE-A uplink communications in the licensed radio frequency spectrum band.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communication system 100, in accordance with various aspects of the present disclosure. The wireless communication system 100 includes a plurality of base stations 105 (e.g., eNBs, WLAN access points, or other access points), a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band and/or an unlicensed radio frequency spectrum band. In other examples, the wireless communication system 100 may support wireless communication using access technology different from LTE/LTE-A. In LTE/LTE-A communication systems, the term evolved NodeB or eNB may be, for example, used to describe the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different types of access networks, such as cellular or other WWAN access networks, or WLAN access networks.

The communication links 125 shown in wireless communication system 100 may include uplink channels for carrying uplink (UL) communications (e.g., transmissions from a UE 115 to a base station 105) and/or downlink channels for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications or transmissions may be made using a licensed radio frequency spectrum band, an unlicensed radio frequency spectrum band, or both. Similarly, the uplink communications or transmissions may be made using a licensed radio frequency spectrum band, an unlicensed radio frequency spectrum band, or both.

In some examples of the wireless communication system 100, various deployment scenarios for LTE/LTE-A in an unlicensed radio frequency spectrum band may be supported, including a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and a standalone mode in which LTE/LTE-A downlink and uplink communications between a base station (e.g., eNB) and a UE may take place in an unlicensed radio frequency spectrum band. Base stations 105 as well as UEs 115 may support one or more of these or similar modes of operation. OFDMA waveforms may be used in the communication links 125 for LTE/LTE-A downlink communications in a licensed and/or an unlicensed radio frequency spectrum band, while OFDMA, SC-FDMA and/or RB interleaved FDMA waveforms may be used in the communication links 125 for LTE/LTE-A uplink communications in a licensed and/or an unlicensed radio frequency spectrum band.

Figure 2A:
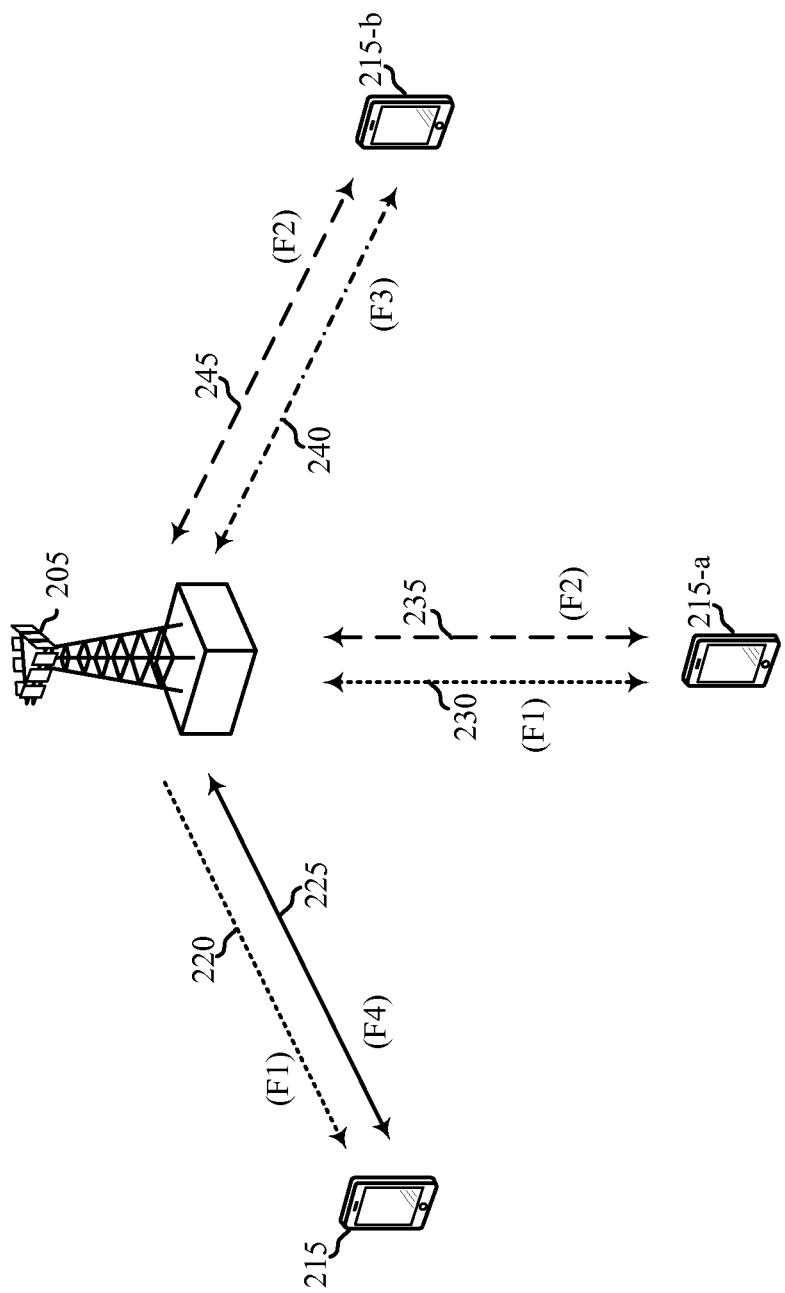
FIG. 2A shows a diagram that illustrates examples of deployment scenarios for using LTE/LTE-A in an unlicensed radio frequency spectrum band, in accordance with various aspects of the present disclosure.

FIG. 2A shows a diagram that illustrates examples of deployment scenarios for using LTE/LTE-A in an unlicensed radio frequency spectrum band, in accordance with various aspects of the present disclosure. In one example, FIG. 2A illustrates a wireless communication system 200 illustrating examples of a supplemental downlink mode and a carrier aggregation mode for an LTE/LTE-A network that supports deployment in unlicensed radio frequency spectrum band. The wireless communication system 200 may be an example of portions of the wireless communication system 100 of FIG. 1. Moreover, the base station 205 may be an example of aspects of one or more of the base stations 105 of FIG. 1, while the UEs 215, 215-a, and 215-b may be examples of aspects of one or more of the UEs 115 of FIG. 1.

In the example of a supplemental downlink mode in the wireless communication system 200, the base station 205 may transmit OFDMA waveforms to a UE 215 using a downlink channel 220. The downlink channel 220 may be associated with a frequency F1 in an unlicensed radio frequency spectrum band. The base station 205 may transmit OFDMA waveforms to the same UE 215 using a first bidirectional link 225 and may receive SC-FDMA waveforms from that UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the base station 205. In some examples, the downlink channel 220 may be used for unicast services (e.g., addressed to one UE) or for multicast services (e.g., addressed to several UEs). This scenario may occur with any service provider (e.g., a traditional mobile network operator (MNO)) that uses a licensed radio frequency spectrum band and needs to relieve some of the traffic and/or signaling congestion.

In one example of a carrier aggregation mode in the wireless communication system 200, the base station 205 may transmit OFDMA waveforms to a UE 215-a using a second bidirectional link 230 and may receive OFDMA waveforms, SC-FDMA waveforms, and/or RB interleaved FDMA waveforms from the same UE 215-a using the second bidirectional link 230. The second bidirectional link 230 may be associated with the frequency F1 in the unlicensed radio frequency spectrum band. The base station 205 may also transmit OFDMA waveforms to the same UE 215-a using a third bidirectional link 235 and may receive SC-FDMA waveforms from the same UE 215-a using the third bidirectional link 235. The third bidirectional link 235 may be associated with a frequency F2 in a licensed radio frequency spectrum band. The second bidirectional link 230 may provide a downlink and uplink capacity offload for the base station 205. Like the supplemental downlink mode described above, this scenario may occur with any service provider (e.g., MNO) that uses a licensed radio frequency spectrum band and needs to relieve some of the traffic and/or signaling congestion.

In another example of a carrier aggregation mode in the wireless communication system 200, the base station 205 may transmit OFDMA waveforms to a UE 215-b using a fourth bidirectional link 240 and may receive OFDMA waveforms, SC-FDMA waveforms, and/or RB interleaved waveforms from the same UE 215-b using the fourth bidirectional link 240. The fourth bidirectional link 240 may be associated with a frequency F3 in an unlicensed radio frequency spectrum band. The base station 205 may also transmit OFDMA waveforms to the same UE 215-b using a fifth bidirectional link 245 and may receive SC-FDMA waveforms from the same UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the base station 205. This example and those provided above are presented for illustrative purposes and there may be other similar modes of operation or deployment scenarios that combine LTE/LTE-A in licensed and unlicensed radio frequency spectrum bands for capacity offload.

As described above, the typical service provider that may benefit from the capacity offload offered by using LTE/LTE-A in an unlicensed radio frequency spectrum band is a traditional MNO having access rights to an LTE/LTE-A radio frequency spectrum band. For these service providers, an operational configuration may include a bootstrapped mode (e.g., supplemental downlink, carrier aggregation) that uses the LTE/LTE-A primary component carrier (PCC) on the licensed radio frequency spectrum band and a secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

Figure 2B:
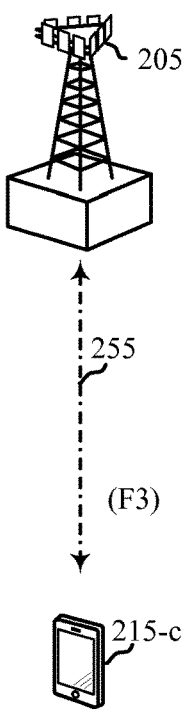
FIG. 2B shows a wireless communication system that illustrates an example of a standalone mode for using LTE/LTE-A in an unlicensed radio frequency spectrum band, in accordance with various aspects of the present disclosure.

FIG. 2B shows a wireless communication system 250 that illustrates an example of a standalone mode for using LTE/LTE-A in an unlicensed radio frequency spectrum band, in accordance with various aspects of the present disclosure. The wireless communication system 250 may be an example of portions of the wireless communication system 100 and/or 200 described with reference to FIGS. 1 and/or 2A. Moreover, the base station 205 may be an example of aspects of one or more of the base stations 105 and/or 205 described with reference to FIGS. 1 and/or 2A, while the UE 215-c may be an example of aspects of one or more of the UEs 115 and/or 215 described with reference to FIGS. 1 and/or 2A.

In the example of a standalone mode in the wireless communication system 250, the base station 205 may transmit OFDMA waveforms to the UE 215-c using a bidirectional link 255 and may receive OFDMA waveforms, SC-FDMA waveforms, and/or RB interleaved FDMA waveforms from the UE 215-c using the bidirectional link 255. The bidirectional link 255 may be associated with the frequency F3 in the unlicensed radio frequency spectrum band described with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have access to a licensed radio frequency spectrum band.

In some examples, a transmitting device such as a base station 105, 205 (e.g., an eNB) described with reference to FIGS. 1, 2A, and/or 2B, or a UE 115 and/or 215 described with reference to FIGS. 1, 2A, and/or 2B, may use a gating interval to gain access to a channel of the unlicensed radio frequency spectrum band. The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting apparatus needs to perform a Clear Channel Assessment (CCA). The outcome of the CCA may indicate to the transmitting apparatus whether a channel of the unlicensed radio frequency spectrum band is available or in use. When the CCA indicates that the channel is available (e.g., "clear" for use), the gating interval may allow the transmitting apparatus to use the channel—typically for a predefined transmission interval. When the CCA indicates that the channel is not available (e.g., in use or reserved), the gating interval may prevent the transmitting apparatus from using the channel during the transmission interval.

In some examples, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in a licensed radio frequency spectrum band, and to synchronize at least one boundary of the periodic gating interval with at least one boundary of a periodic frame structure (e.g., an LTE/LTE-A radio frame) associated with the cellular downlink.

Figure 3:
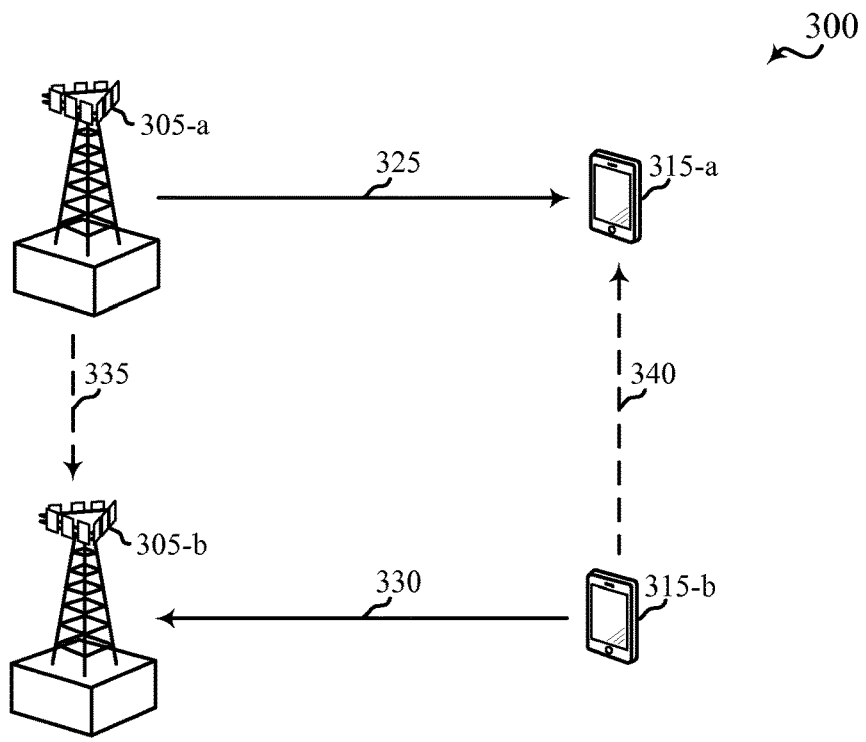
FIG. 3 shows a first example of interference that may arise between the UEs and the base stations of a wireless communication system as the UEs and the base stations communicate in a common radio frequency spectrum band, in accordance with various aspects of the present disclosure.

Under some scenarios, wireless communications (e.g., transmissions) received by a UE or a base station (e.g., an eNB) may be associated with interference. In this regard, FIG. 3 shows a first example of interference that may arise between the UEs and the base stations of a wireless communication system 300 as the UEs and the base stations communicate in a common radio frequency spectrum band, in accordance with various aspects of the present disclosure. In some examples, the wireless communication system 300 may be an example of one or more aspects of the wireless communication system 100, 200, and/or 250 described with reference to FIGS. 1, 2A, and/or 2B.

By way of example, FIG. 3 shows a first base station 305-a, a second base station 305-b, a first UE 315-a, and a second UE 315-b. When one of the UEs (e.g., the first UE 315-a) receives a first transmission 325 from one of the eNBs (e.g., the first base station 305-a), the first transmission 325 may be associated with second interference 340 as a result of another UE (e.g., the second UE 315-b) making a second transmission 330 to another eNB (e.g., the second base station 305-b). Similarly, when one of the base stations (e.g., the second base station 305-b) receives the second transmission 330 from one of the UEs (e.g., the second UE 315-b), the second transmission 330 may be associated with first interference 335 as a result of another base station (e.g., the first base station 305-a) making the first transmission 325 to another UE (e.g., the first UE 315-a). Without coordination between the first UE 315-a, the second UE 315-b, the first base station 305-a, and the second base station 305-b, the receivers at the first UE 315-a, the second UE 315-b, the first base station 305-a, and the second base station 305-b may only be able to blindly estimate the nature of interference such as the first interference 335 and/or the second interference 340. A blind estimate of interference may not be sufficient to enable cancelation of the interference.

Figure 4:
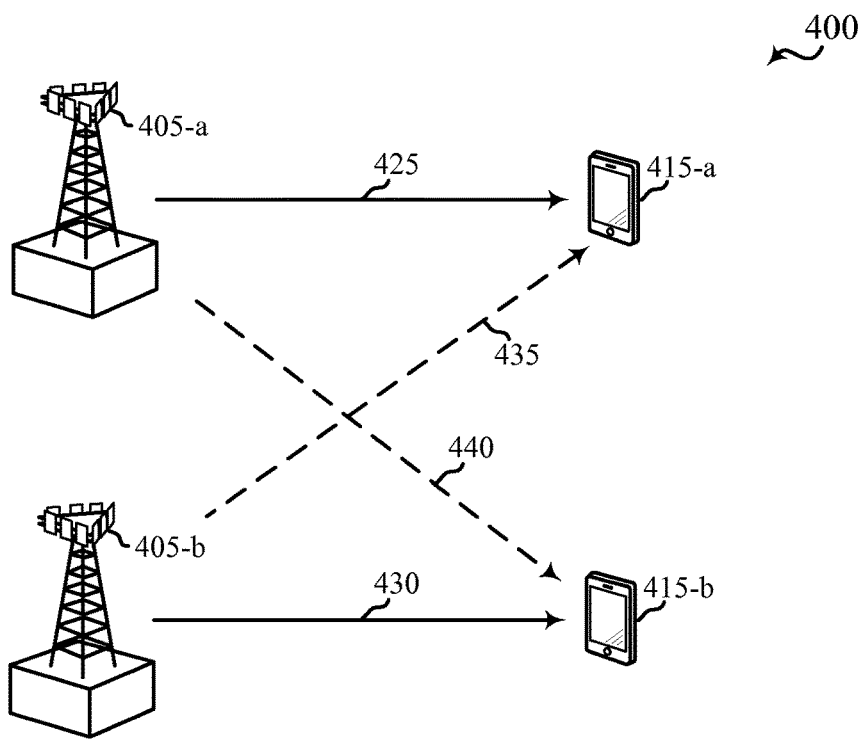
FIG. 4 shows a second example of interference that may arise the UEs and the base stations of a wireless communication system as the UEs and the base stations communicate in a common radio frequency spectrum band, in accordance with various aspects of the present disclosure.

FIG. 4 shows a second example of interference that may arise between the UEs and the base stations of a wireless communication system 400 as the UEs and the base stations communicate in a common radio frequency spectrum band, in accordance with various aspects of the present disclosure.

By way of example, FIG. 4 shows a first base station 405-a, a second base station 405-b, a first UE 415-a, and a second UE 415-b. When one of the UEs (e.g., the first UE 415-a) receives a first transmission 425 from one of the base stations (e.g., the first base station 405-a), the first transmission 425 may be associated with first interference 435 as a result of another base station (e.g., the second base station 405-b) making a second transmission 430 to another UE (e.g., the second UE 415-b). Similarly, when the second UE 415-b receives the second transmission 430 from the second base station 405-b, the second transmission 430 may be associated with second interference 440 as a result of the first transmission 425 from the first base station 405-a to the first UE 415-a. Without coordination between the first UE 415-a, the second UE 415-b, the first base station 405-a, and the second base station 405-b, the receivers at the first UE 415-a, the second UE 415-b, the first base station 405-a, and the second base station 405-b may only be able to blindly estimate the nature of interference such as the first interference 435 and/or the second interference 440. A blind estimate of interference may not be sufficient to enable cancelation of the interference.

To facilitate cancelation of interference under scenarios such as those described with reference to FIGS. 4 and/or 5, the base stations with overlapping coverage areas may be assigned (or may negotiate) a common virtual cell identifier (i.e., Virtual Cell ID). The base stations, and the UEs with which they communicate, may then associate the common virtual cell identifier with their transmissions (e.g., the base stations may associate the common virtual cell identifier with downlink transmissions from the base stations to the UEs, and the UEs may associate the common virtual cell identifier with uplink transmissions from the UEs to the base stations).

A port associated with a first spatial multiplexing may be identified for transmission of a DM-RS between one base station (e.g., first base station 305-a or 405-a described with reference to FIG. 3 or 4) and one or more UEs (e.g., the first UE 315-a or 415-a), and a port associated with a second spatial multiplexing may be identified for transmission of a DM-RS between another base station (e.g., second base station 305-b or 405-b) and one or more UEs (e.g., second UE 315-b or 415-b). This may improve the ability of a base station (e.g., first base station 305-a/405-a or second base station 305-b/405-b) or UE (e.g., first UE 315-a/415-a or second UE 315-b/415-b) to cancel interference from a received transmission. Improved interference cancelation may improve channel estimation and/or other aspects of a wireless communication system.

When the base stations shown in FIGS. 3 and/or 4 are assigned the same virtual cell identifier, the DM-RS generated by the base stations and UEs may be the same, which may also enable improved interference cancelation.

In some examples, different link identifiers may be assigned to an uplink channel and a downlink channel, such that the different link identifiers may be associated with respective transmissions in the uplink channel and the downlink channel. For example, with reference to the first base station 305-a/405-a and the first UE 315-a/415-a in FIGS. 3 and/or 4, a first link identifier may be associated with the uplink channel between the first base station 305-a/405-a and the first UE 315-a/415-a, and a second link identifier may be associated with the downlink channel between the second base station 305-b/405-b and the second UE 315-b/415-b, wherein the first link identifier is different from the second link identifier. In some examples, transmitting the first link identifier with transmissions in the uplink channel may include generating a DM-RS as a function of the first link identifier. Similarly, transmitting the second link identifier with transmissions in the uplink channel may include generating a DM-RS as a function of the second link identifier. By assigning a link identifier to each transmission, a receiver may determine whether interference is a result of an uplink transmission or a downlink transmission. An uplink transmission may include an SRS and a PUCCH structure, whereas a downlink transmission may include a CRS and have configured channel state information reference signal (CSI-RS) processes. This knowledge may also be used to improve interference cancelation.

Figure 5:
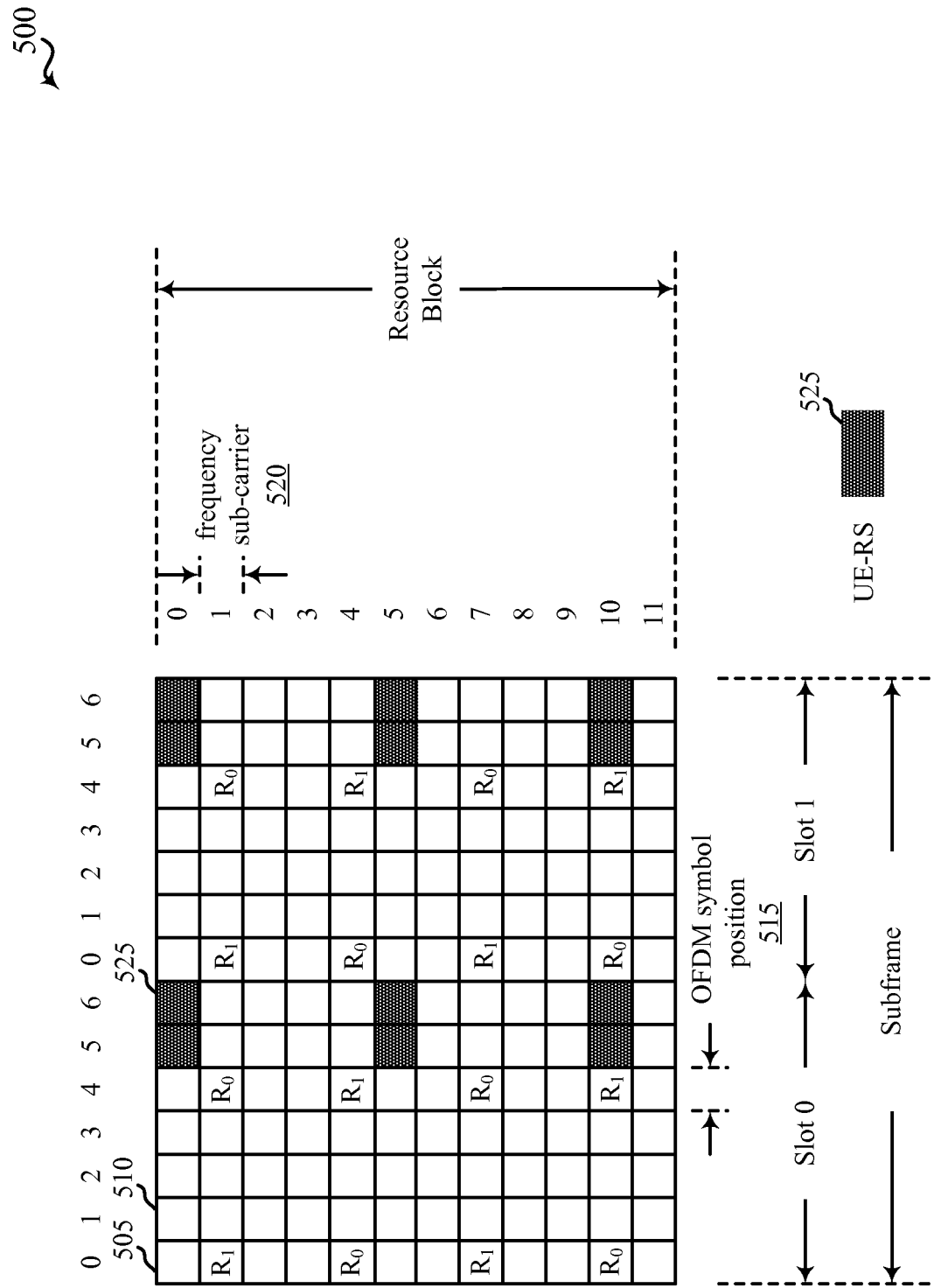
FIG. 5 shows a downlink channel resource block in which a user equipment reference signal (UE-RS) may be transmitted in a downlink channel, in accordance with various aspects of the present disclosure.

FIG. 5 shows a downlink channel resource block 500 in which a user equipment reference signal (UE-RS) may be transmitted in a downlink channel, in accordance with various aspects of the present disclosure. The term UE-RS may, in some examples, be used to distinguish a DM-RS transmitted in a downlink channel from a DM-RS transmitted in an uplink channel.

The downlink channel resource block 500 includes a plurality of resource elements (e.g., first resource element 505 and second resource element 510). Each resource element may correspond to one of a number of time slots (e.g., OFDM symbol positions 515) and one of a number of frequency sub-carriers 520. By way of example, the downlink channel resource block 500 includes resource elements spanning fourteen OFDM symbol positions (or two slots, labeled Slot 0 and Slot 1; or one Subframe) and twelve frequency sub-carriers.

By way of further example, a UE-RS 525 may be transmitted in a set of one or more time slots and one or more frequency sub-carriers of the downlink channel resource block 500, such as, in the resource elements found at the intersections of frequency sub-carriers 0, 5, and 10 and OFDM symbol positions 5 and 6 in each of Slot 0 and Slot 1. In some examples, a common reference signal (CRS) may be transmitted in the downlink channel resource block 500 (e.g., when the downlink channel resource block 500 is in a subframe 0 or a subframe 5 of a frame (not shown)). In some examples, CSI-RS processes may be included in the downlink channel resource block 500.

Figure 6:
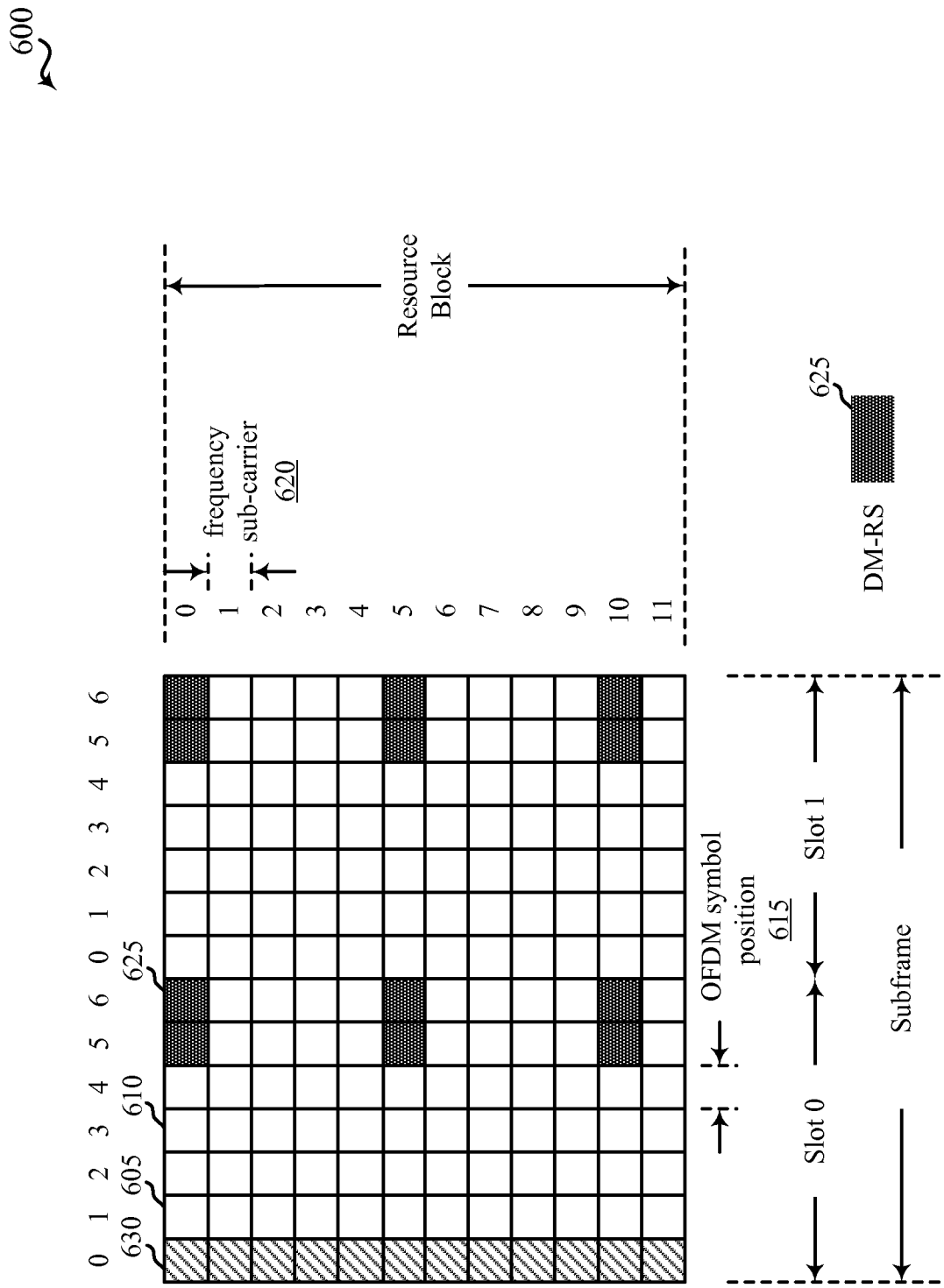
FIG. 6 shows an uplink channel resource block for transmitting a DM-RS in an uplink channel, in accordance with various aspects of the present disclosure.

FIG. 6 shows an uplink channel resource block 600 for transmitting a DM-RS in an uplink channel, in accordance with various aspects of the present disclosure.

The uplink channel resource block 600 may be structured similarly to the downlink channel resource block 500 described with reference to FIG. 5, and may include a plurality of resource elements (e.g., first resource element 605 and second resource element 610). Each resource element may correspond to one of a number of time slots (e.g., OFDM symbol positions 615) and one of a number of frequency sub-carriers 620. By way of example, the uplink channel resource block 600 includes resource elements spanning fourteen OFDM symbol positions (or two slots, labeled Slot 0 and Slot 1; or one Subframe) and twelve frequency sub-carriers.

By way of further example, a DM-RS 625 may be transmitted in a set of one or more time slots and one or more frequency sub-carriers of the uplink channel resource block 600, such as, in the resource elements found at the intersections of frequency sub-carriers 0, 5, and 10 and OFDM symbol positions 5 and 6 in each of Slot 0 and Slot 1. In this manner, a common set of resource blocks may be identified for transmission of a DM-RS in an uplink channel and a UE-RS in a downlink channel between a base station and a UE that are communicating with one another. This may improve the ability of the base station and UE to cancel interference. Also, the uplink and downlink waveforms may be made orthogonal in their UE-RS/DM-RS portion.

Because the DM-RS 625 shown in FIG. 6 occupies certain frequency sub-carriers in the last OFDM symbol position of the subframe, a sounding reference signal (SRS) 630 may be located in an OFDM symbol position other than the last OFDM symbol position. In FIG. 6, an SRS 630 is located in the first OFDM symbol position of the subframe. In other examples, an SRS may be located in a different OFDM symbol position.

Figure 7:
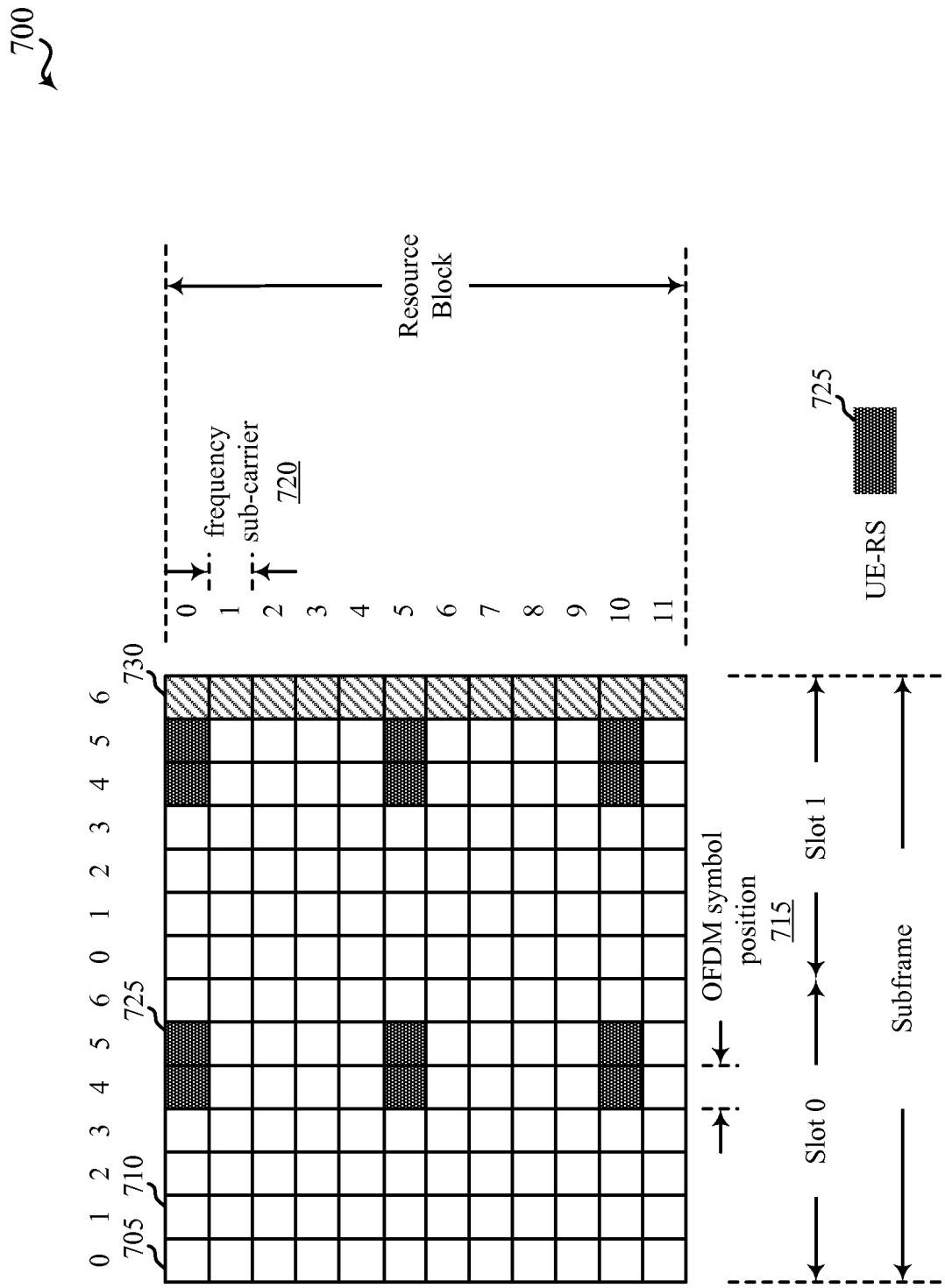
FIG. 7 shows another uplink channel resource block for transmitting a DM-RS in an uplink channel, in accordance with various aspects of the present disclosure.

FIG. 7 shows another uplink channel resource block 700 for transmitting a DM-RS in an uplink channel, in accordance with various aspects of the present disclosure.

The uplink channel resource block 700 may be structured similarly to the downlink channel resource block 500 described with reference to FIG. 5, and may include a plurality of resource elements (e.g., first resource element 705 and second resource element 710). Each resource element may correspond to one of a number of time slots (e.g., OFDM symbol positions 715) and one of a number of frequency sub-carriers 720. By way of example, the uplink channel resource block 700 includes resource elements spanning fourteen OFDM symbol positions (or two slots, labeled Slot 0 and Slot 1; or one Subframe) and twelve frequency sub-carriers.

By way of further example, a DM-RS 725 may be transmitted in a set of one or more time slots and one or more frequency sub-carriers of the uplink channel resource block 700, such as, in the resource elements found at the intersections of frequency sub-carriers 0, 5, and 10 and OFDM symbol positions 4 and 5 in each of Slot 0 and Slot 1. In this manner, and in comparison to the downlink channel resource block 500 described with reference to FIG. 5, a non-colliding set of resource blocks may be identified for transmission of a DM-RS 725 in an uplink channel and a UE-RS 525 in a downlink channel, between a base station and a UE that are communicating with one another. This may enable an SRS 730 to be located in the last OFDM symbol position of the uplink channel resource block 700, similarly to where an SRS is located in an uplink channel for LTE/LTE-A uplink communications in a licensed radio frequency spectrum band. In other examples, an SRS may be located in a different OFDM symbol position. Also, the uplink and downlink waveforms may be made orthogonal in their UE-RS/DM-RS portion.

Turning now to the transmission of a PUCCH and/or a PUSCH, a PUCCH transmission in a conventional LTE/LTE-A communication may only occupy one resource block. However, there may be a requirement that certain communications (e.g., LTE/LTE-A communications in an unlicensed radio frequency spectrum band) occupy at least a certain percentage of the available frequency bandwidth (e.g., at least 80% of the available frequency bandwidth).

Figure 8A:
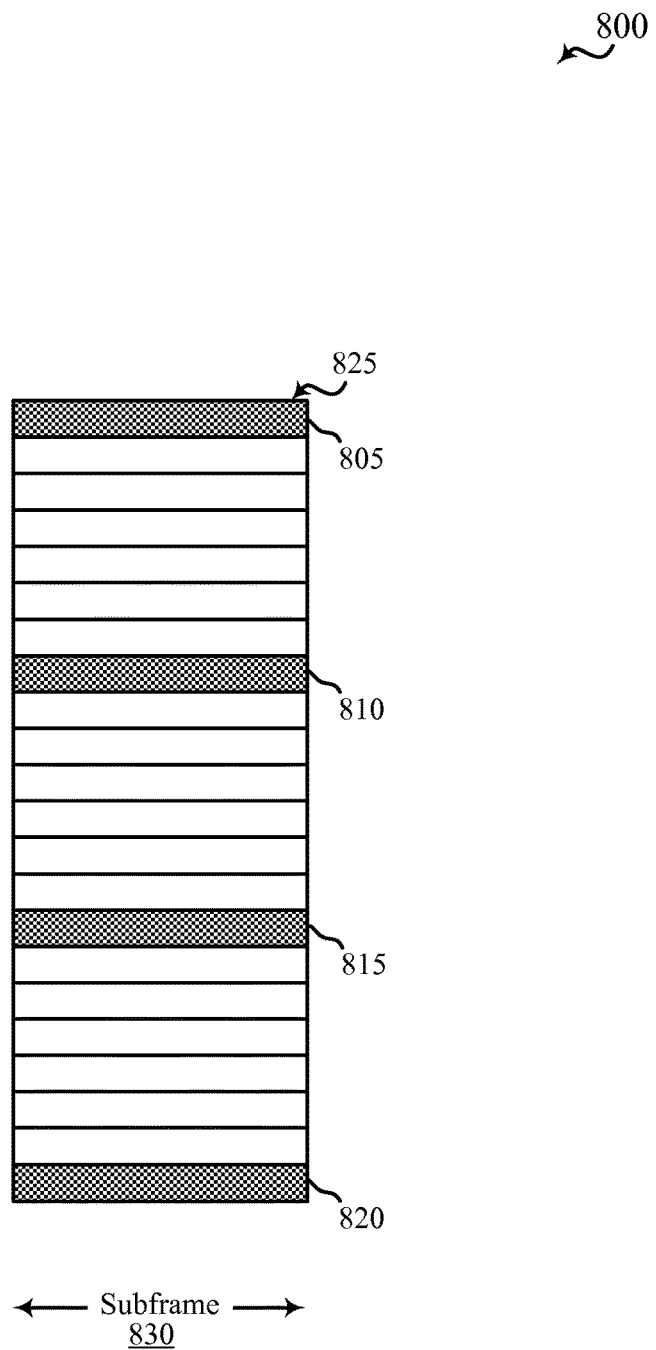
FIG. 8A shows an example of how a PUCCH may be transmitted using a plurality of interleaved resource blocks, such as a first resource block, a second resource block, a third resource block, and a fourth resource block, in accordance with various aspects of the present disclosure.

In this regard, FIG. 8A shows an example 800 of how a PUCCH may be transmitted using a plurality of interleaved resource blocks, such as a first resource block 805, a second resource block 810, a third resource block 815, and a fourth resource block 820, in accordance with various aspects of the present disclosure. The first resource block 805, the second resource block 810, the third resource block 815, and the fourth resource block 820 may span a certain percentage of the available frequency bandwidth 825 of a subframe 830, so that transmissions using the first resource block 805, the second resource block 810, the third resource block 815, and the fourth resource block 820 occupy at least the required percentage of the frequency bandwidth. In one example, duplicate copies of the PUCCH may be transmitted in each of the first resource block 805, the second resource block 810, the third resource block 815, and the fourth resource block 820. In some examples, different subsets of symbols (not shown) in the first resource block 805, the second resource block 810, the third resource block 815, and the fourth resource block 820 may be allocated for PUCCH transmissions of different UEs. In another example, a PUCCH may be multiplexed within the first resource block 805, the second resource block 810, the third resource block 815, and the fourth resource block 820 according to a code division multiplexing sequence or other orthogonal sequence.

Figure 8B:
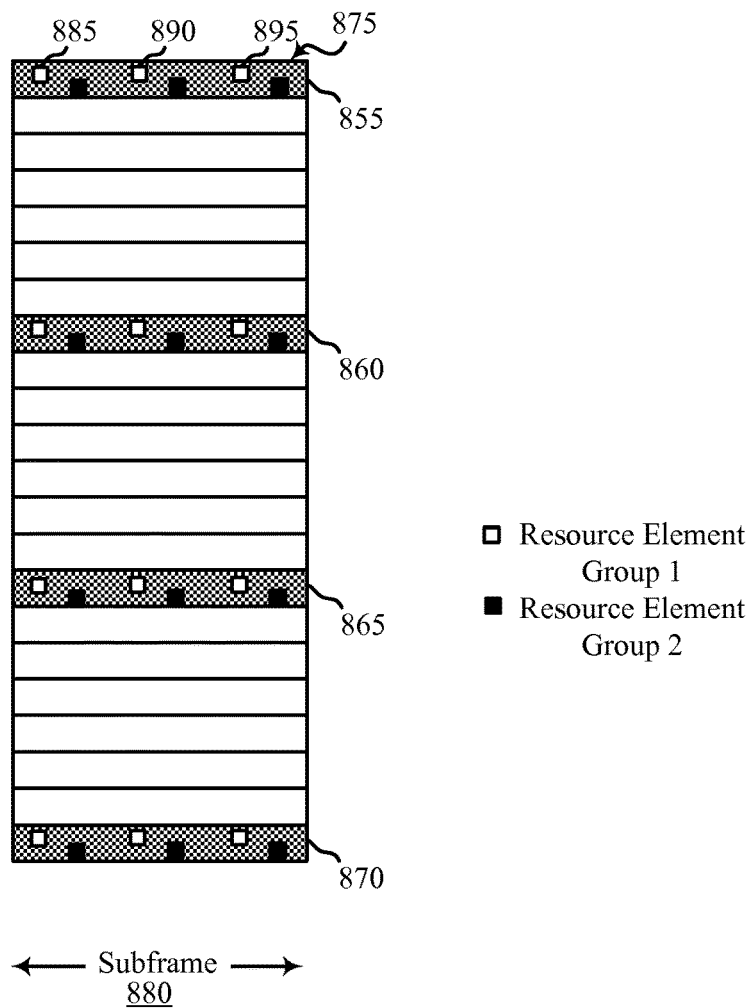
FIG. 8B shows an example of PUCCH multiplexing within a plurality of resource elements (e.g., first resource element, second resource element, and third resource element) of an enhanced resource element group, in accordance with various aspects of the present disclosure.

FIG. 8B shows an example 850 of PUCCH multiplexing within a plurality of resource elements (e.g., first resource element 885, second resource element 890, and third resource element 895) of an enhanced resource element group, in accordance with various aspects of the present disclosure. The enhanced resource element group may be distributed across a plurality of interleaved resource blocks, such as a first resource block 855, a second resource block 860, a third resource block 865, and a fourth resource block 870 that span a certain percentage of the available frequency bandwidth 875 of a subframe 880.

By way of example, FIG. 8B shows two resource element groups (e.g., Resource Element Group 1 and Resource Element Group 2). The different resource element groups may be associated with different UEs (e.g., a UE1 and a UE2). The resource element groups may be multiplexed within the first resource block 855, the second resource block 860, the third resource block 865, and the fourth resource block 870.

Figure 9:
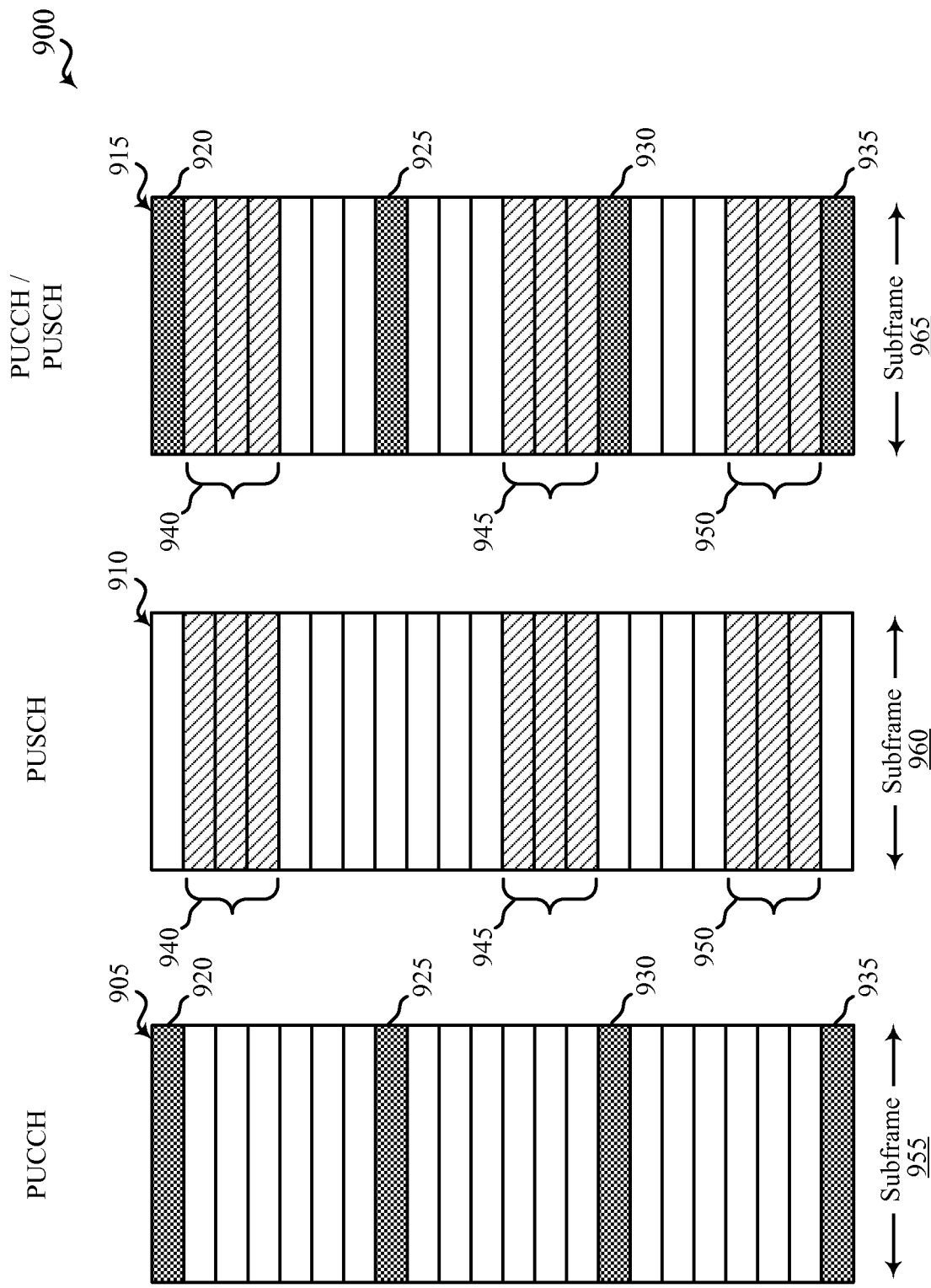
FIG. 9 shows an example of frequency division multiplexing in the transmission of a PUCCH and a PUSCH, in accordance with various aspects of the present disclosure.

FIG. 9 shows an example 900 of frequency division multiplexing in the transmission of a PUCCH and a PUSCH, in accordance with various aspects of the present disclosure. FIG. 9 shows three different sets of resource blocks, a first set of resource blocks 905, a second set of resource blocks 910, and a third set of resource blocks 915. Each set of resource blocks may represent the frequency bandwidth of a particular subframe, such as a first subframe 955, a second subframe 960, and a third subframe 965. In some examples, the frequency division multiplexing transmission of the PUCCH and the PUSCH may span at least a certain percentage, including all, of the available frequency bandwidth of a particular subframe.

In the first set of resource blocks 905 representing a frequency bandwidth of the first subframe 955, an uplink channel to be transmitted may include a PUCCH. In such a scenario, a first subset of resource blocks of the first set of resource blocks 905 may be used to transmit the uplink channel. The first subset of resource blocks may include a plurality of interleaved resource blocks, such as a first resource block 920, a second resource block 925, a third resource block 930, and a fourth resource block 935. One or more UEs may transmit during each of the interleaved resource blocks.

In the second set of resource blocks 910 representing a frequency bandwidth of the second subframe 960, an uplink channel to be transmitted may include a PUSCH. In such a scenario, a second subset of resource blocks of the second set of resource blocks 910 may be used to transmit the uplink channel. The second subset of resource blocks may include a plurality of interleaved resource blocks (including a first group of resource blocks 940, a second group of resource blocks 945, and a third group of resource blocks 950).

In the third set of resource blocks 915 representing a frequency bandwidth of the third subframe 965, an uplink channel to be transmitted may include a PUCCH and a PUSCH. In such a scenario, the PUCCH and the PUSCH may be frequency division multiplexed, using the first subset of resource blocks including the first resource block 920, the second resource block 925, the third resource block 930, and the fourth resource block 935 to transmit the PUCCH and the second subset of resource blocks (including the first group of resource blocks 940, the second group of resource blocks 945, and the third group of resource blocks 950) to transmit the PUSCH.

Figure 10:
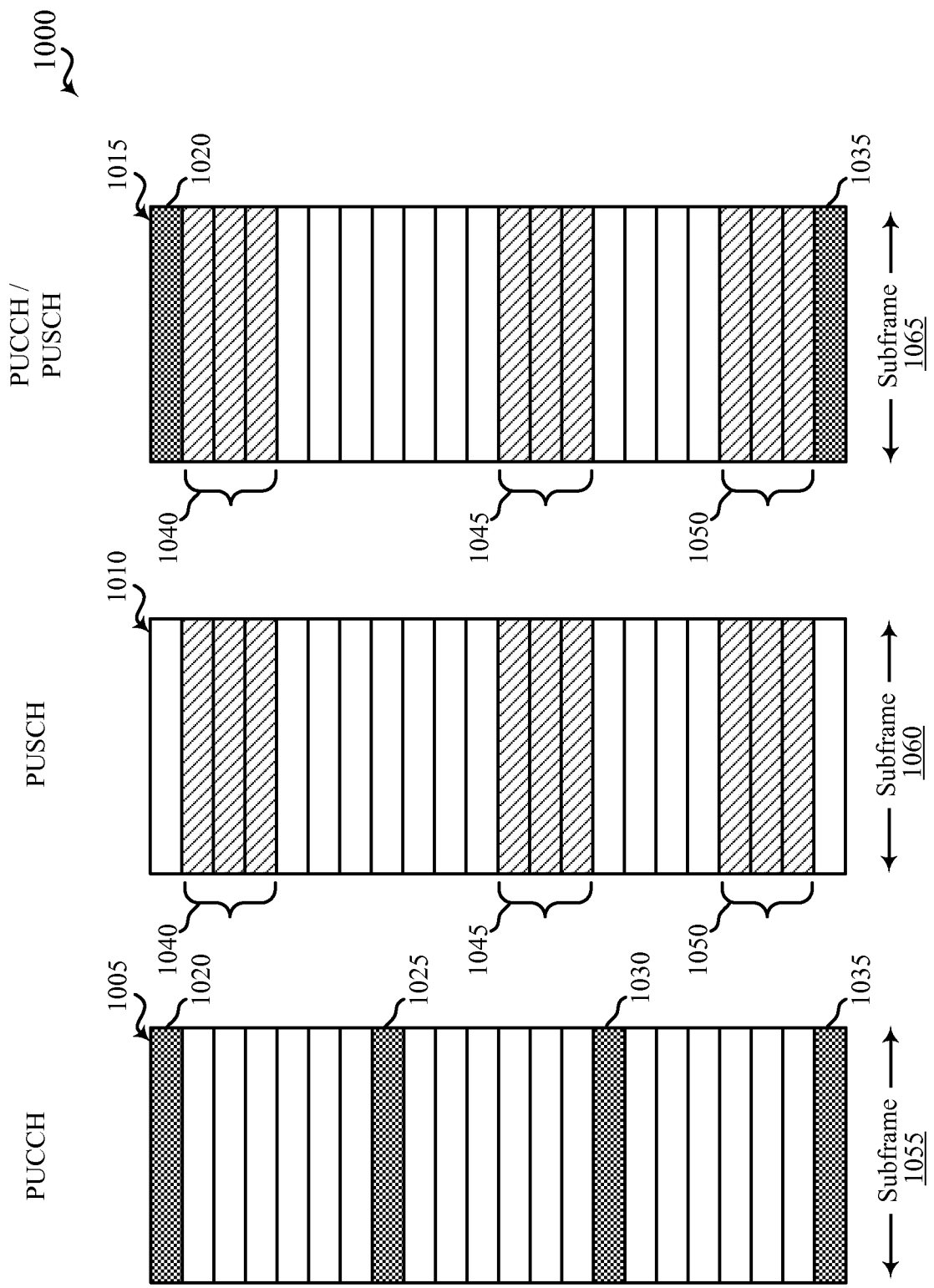
FIG. 10 shows another example of frequency division multiplexing in the transmission of a PUCCH and a PUSCH, in accordance with various aspects of the present disclosure.

FIG. 10 shows another example 1000 of frequency division multiplexing in the transmission of a PUCCH and a PUSCH, in accordance with various aspects of the present disclosure. FIG. 10 shows three different sets of resource blocks. For example, a first set of resource blocks 1005, a second set of resource blocks 1010, and a third set of resource blocks 1015. Each set of resource blocks may represent the frequency bandwidth of a particular subframe. For example, the first set of resource blocks 1005 may represent the frequency bandwidth of a first subframe 1055, the second set of resource blocks 1010 may represent the frequency bandwidth of a second subframe 1060, and the third set of resource blocks 1015 may represent the frequency bandwidth of a third subframe 1065. In some examples, the frequency division multiplexing transmission of the PUCCH and the PUSCH may span at least a certain percentage, including all, of the available frequency bandwidth of a particular subframe.

In the first set of resource blocks 1005 representing a frequency bandwidth of the first subframe 1055, an uplink channel to be transmitted may include a PUCCH. In such a scenario, a first subset of resource blocks of the first set of resource blocks 1005 may be used to transmit the uplink channel. The first subset of resource blocks may include a plurality of interleaved resource blocks, such as a first resource block 1020, a second resource block 1025, a third resource block 1030, and a fourth resource block 1035.

In the second set of resource blocks 1010 representing a frequency bandwidth of the second subframe 1060, an uplink channel to be transmitted may include a PUSCH. In such a scenario, a second subset of resource blocks of the first set of resource blocks may be used to transmit the uplink channel. The second subset of resource blocks may include a plurality of interleaved resource blocks (including a first group of resource blocks 1040, a second group of resource blocks 1045, and a third group of resource blocks 1050).

In the third set of resource blocks 1015 representing a frequency bandwidth of the third subframe 1065, an uplink channel to be transmitted may include a PUCCH and a PUSCH. In such a scenario, the PUCCH and the PUSCH may be frequency division multiplexed. When frequency division multiplexing the PUCCH and the PUSCH on the uplink channel, a number of resource blocks assigned for PUCCH may be different from a number of resource blocks assigned for PUCCH when the PUCCH and PUSCH are not frequency division multiplexed on the uplink channel (e.g., for a standalone PUCCH transmission on the uplink channel). For example, a subset (e.g., less than all) of the first set of resource blocks (e.g., first resource block 1020 and fourth resource block 1035) may be used to transmit the PUCCH, and the resource blocks of the first set of resource blocks 1005 that are not used to transmit the PUCCH (e.g., second resource block 1025 and third resource block 1030) may be used to transmit the PUSCH. In another example, the resource blocks of the first set of resource blocks 1005 that are not used to transmit the PUCCH (e.g., second resource block 1025 and third resource block 1030) may be used to transmit a PUCCH or a PUSCH of a different UE. The first resource block 1020 and the fourth resource block 1035 of the first set used to transmit the PUCCH may, in some examples, be selected such that they span at least a certain percentage of the available resource blocks.

In another example of frequency division multiplexing the transmission of a PUCCH and a PUSCH, the PUCCH and the PUSCH may be frequency division multiplexed by puncturing at least one frequency sub-carrier of at least one resource block of the first set of resource blocks 1005, to transmit at least part of the PUSCH. For example, a resource block assigned to transmit PUCCH may have a narrower sub-carrier frequency bandwidth or shorter time period than a resource block (e.g., the first set of resource blocks 1005) assigned to transmit PUCCH when the PUCCH and PUSCH are not frequency division multiplexed on the uplink channel (e.g., a standalone PUCCH transmission on the uplink channel).

In another example of frequency division multiplexing the transmission of a PUCCH and a PUSCH, some resources assigned to PUCCH may overlap with resources assigned to PUSCH. When resources assigned to PUCCH that overlap with resources assigned to PUSCH are not used, the resources assigned to the PUCCH that overlap with resources assigned to PUSCH may be used to transmit PUSCH.

Figure 11:
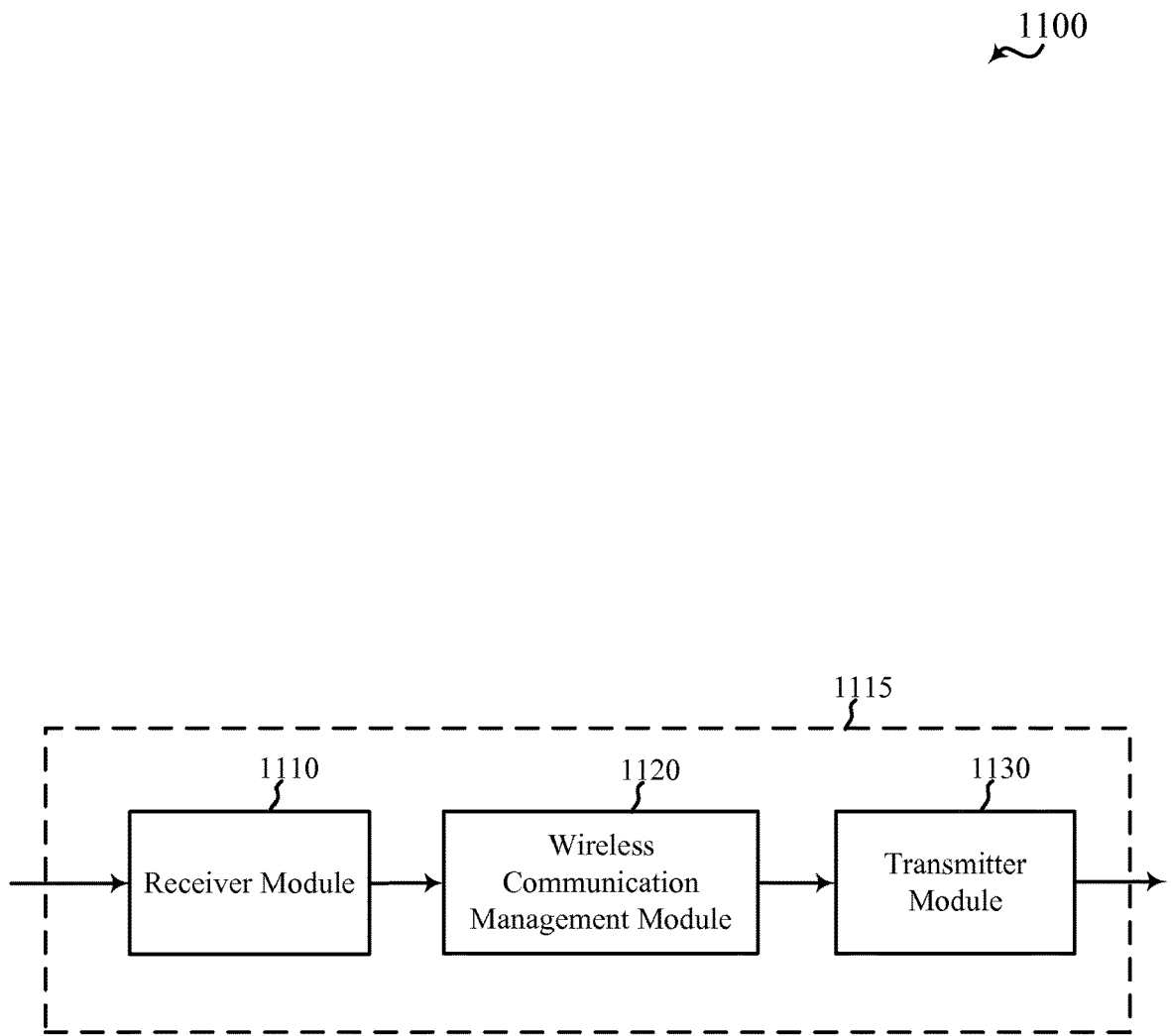
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. In some examples, the apparatus 1115 may be an example of aspects of one or more of the UEs 115, 215, and/or 1815 described with reference to FIGS. 1, 2A, 2B, and/or 18, aspects of one or more of the base stations 105, 205, and/or 1705 described with reference to FIGS. 1, 2A, 2B, and/or 17, and/or aspects of one or more of the apparatuses 1215, 1315, 1415, 1515, and/or 1615 described with reference to FIGS. 12, 13, 14, 15, and/or 16. The apparatus 1115 may also be a processor. The apparatus 1115 may include a receiver module 1110, a wireless communication management module 1120, and/or a transmitter module 1130. Each of these components may be in communication with each other.

The components of the apparatus 1115 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be or include a radio frequency (RF) receiver, such as an RF receiver operable to receive transmissions in a first radio frequency spectrum band (e.g., a licensed radio frequency spectrum band, such as a radio frequency spectrum band usable for LTE/LTE-A communications) and/or a second radio frequency spectrum band (e.g., an unlicensed radio frequency spectrum band, such as a shared radio frequency spectrum band usable for Wi-Fi and/or LTE/LTE-A communications). The receiver module 1110 may be used to receive various types of data and/or control signals (i.e., transmissions) over one or more communication links of a wireless communication system including the first and second radio frequency spectrum bands, such as one or more communication links of the wireless communication system 100, 200, and/or 250 described with reference to FIGS. 1, 2A, and/or 2B.

In some examples, the transmitter module 1130 may be or include an RF transmitter, such as an RF transmitter operable to transmit in the first radio frequency spectrum band and/or the second radio frequency spectrum band. The transmitter module 1130 may be used to transmit various types of data and/or control signals (i.e., transmissions) over one or more communication links of the wireless communication system including the first radio frequency spectrum band and the second radio frequency spectrum band.

In some examples, the wireless communication management module 1120 may manage the receipt of wireless communications via the receiver module 1110 and/or the transmission of wireless communications via the transmitter module 1130.

Figure 12:
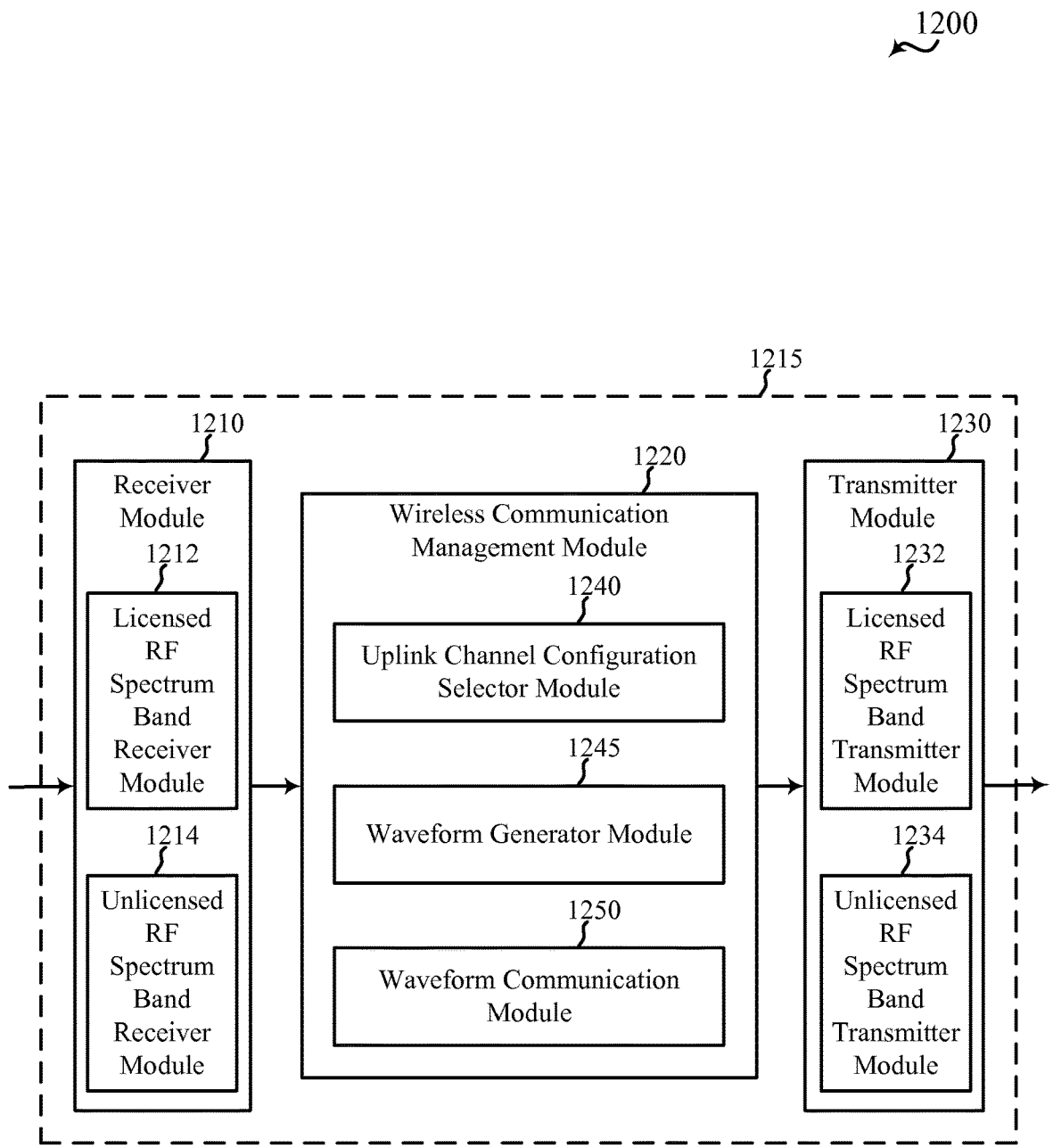
FIG. 12 shows a block diagram of an apparatus for use in wireless communication (e.g., to dynamically select a configuration of an uplink channel for uplink communications in an unlicensed radio frequency spectrum band), in accordance with various aspects of the present disclosure.

FIG. 12 shows a block diagram 1200 of an apparatus 1215 for use in wireless communication (e.g., to dynamically select a configuration of an uplink channel for uplink communications in an unlicensed radio frequency spectrum band), in accordance with various aspects of the present disclosure. In some examples, the apparatus 1215 may be an example of aspects of one or more of the UEs 115, 215, and/or 1815 described with reference to FIGS. 1, 2A, 2B, and/or 18, and/or aspects of one or more of the apparatuses 1115, 1315, 1415, 1515, and/or 1615 described with reference to FIGS. 11, 13, 14, 15, and/or 16. The apparatus 1215 may also be a processor. The apparatus 1215 may include a receiver module 1210, a wireless communication management module 1220, and/or a transmitter module 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be or include a radio frequency (RF) receiver, such as an RF receiver operable to receive transmissions in a first radio frequency spectrum band (e.g., a licensed radio frequency spectrum band usable for LTE/LTE-A communications) and/or a second radio frequency spectrum band (e.g., an unlicensed radio frequency spectrum band, such as a shared radio frequency spectrum band usable for Wi-Fi and/or LTE/LTE-A communications). The RF receiver may include separate receivers for the first radio frequency spectrum band and the second radio frequency spectrum band. The separate receivers may, in some examples, take the form of a licensed radio frequency spectrum band receiver module 1212 for communicating over the first radio frequency spectrum band, and an unlicensed radio frequency spectrum band receiver module 1214 for communicating over the second radio frequency spectrum band. The receiver module 1210, including the licensed radio frequency spectrum band receiver module 1212 and/or the unlicensed radio frequency spectrum band receiver module 1214, may be used to receive various types of data and/or control signals (i.e., transmissions) over one or more communication links of a wireless communication system including the first and second radio frequency spectrum bands, such as one or more communication links of the wireless communication system 100, 200, and/or 250 described with reference to FIGS. 1, 2A, and/or 2B.

In some examples, the transmitter module 1230 may be or include an RF transmitter, such as an RF transmitter operable to transmit in the first radio frequency spectrum band and/or the second radio frequency spectrum band. The RF transmitter may include separate transmitters for the first radio frequency spectrum band and the second radio frequency spectrum band. The separate transmitters may, in some examples, take the form of a licensed radio frequency spectrum band transmitter module 1232 for communicating over the first radio frequency spectrum band, and an unlicensed radio frequency spectrum band transmitter module 1234 for communicating over the second radio frequency spectrum band. The transmitter module 1230, including the licensed radio frequency spectrum band transmitter module 1232 and/or the unlicensed radio frequency spectrum band transmitter module 1234, may be used to transmit various types of data and/or control signals (i.e., transmissions) over one or more communication links of the wireless communication system including the first radio frequency spectrum band and the second radio frequency spectrum band.

In some examples, the wireless communication management module 1220 may be an example of one or more aspects of the wireless communication management module 1120 described with reference to FIG. 11 and may include a uplink channel configuration selector module 1240, a waveform generator module 1245, and/or a waveform communication module 1250. Each of these components may be in communication with each other.

In some examples, the uplink channel configuration selector module 1240 may be used to dynamically select a configuration of an uplink channel for uplink communications (e.g., LTE/LTE-A uplink communications) in an unlicensed radio frequency spectrum band. In some examples, the configuration of the uplink channel may be selected from among an OFDMA configuration, an SC-FDMA configuration, and/or an RB interleaved FDMA configuration.

In some examples, the uplink channel configuration selector module 1240 may select the configuration of the uplink channel based at least in part on signaling received from a base station (e.g., an eNB). The signaling may, in some examples, indicate an RB allocation. In some examples, the signaling may be received over a downlink channel in the licensed radio frequency spectrum band (e.g., via the licensed radio frequency spectrum band receiver module 1212) or over a downlink channel in the unlicensed radio frequency spectrum band (e.g., via the unlicensed radio frequency spectrum band receiver module 1214). In some examples, the signaling may include Layer 1 signaling (e.g., ePDCCH or PDCCH based signaling) and/or Layer 2 signaling (e.g., MAC header based signaling). The signaling may, in some examples, ask a UE or apparatus performing the method 2000 to dynamically or semi-statically select a configuration of the uplink channel based at least in part on the received signaling.

In other cases, the uplink channel configuration selector module 1240 may select the configuration of the uplink channel based on the proximity of the apparatus 1215 to a base station. For example, an RB level interleaved FDMA configuration or an OFDMA configuration may be selected when the apparatus 1215 is relatively closer to the base station, as determined, for example, by a signal strength or signal quality of communications with the base station.

In some examples, the uplink channel for which the configuration is selected may include a PUSCH, a PUCCH, or a PRACH. In some examples, the uplink channel may include a UL-MIMO channel. When the channel includes a PRACH, the PRACH may be transmitted on one or more pre-allocated interlaces.

In some examples, the waveform generator module 1245 may be used to generate a waveform based on the selected configuration. When the selected configuration is an OFDMA configuration, the generated waveform may be an OFDMA waveform. When the selected configuration is an SC-FDMA configuration, the generated waveform may be an SC-FDMA waveform. When the selected configuration is an RB interleaved FDMA configuration, the generated waveform may be an RB interleaved FDMA waveform.

In some examples, the waveform communication module 1250 may be used to communicate (e.g., transmit) the generated waveform in a signal in the unlicensed radio frequency spectrum band using the uplink channel. The signal may be transmitted via the unlicensed radio frequency spectrum band transmitter module 1234.

In some examples, the wireless communication management module 1220 may be used to communicate the configuration it selects to a base station. In other cases, the base station may blindly detect which configuration the apparatus 1215 selected (e.g., based on a waveform received from the apparatus 1215 over the unlicensed radio frequency spectrum band).

Figure 13:
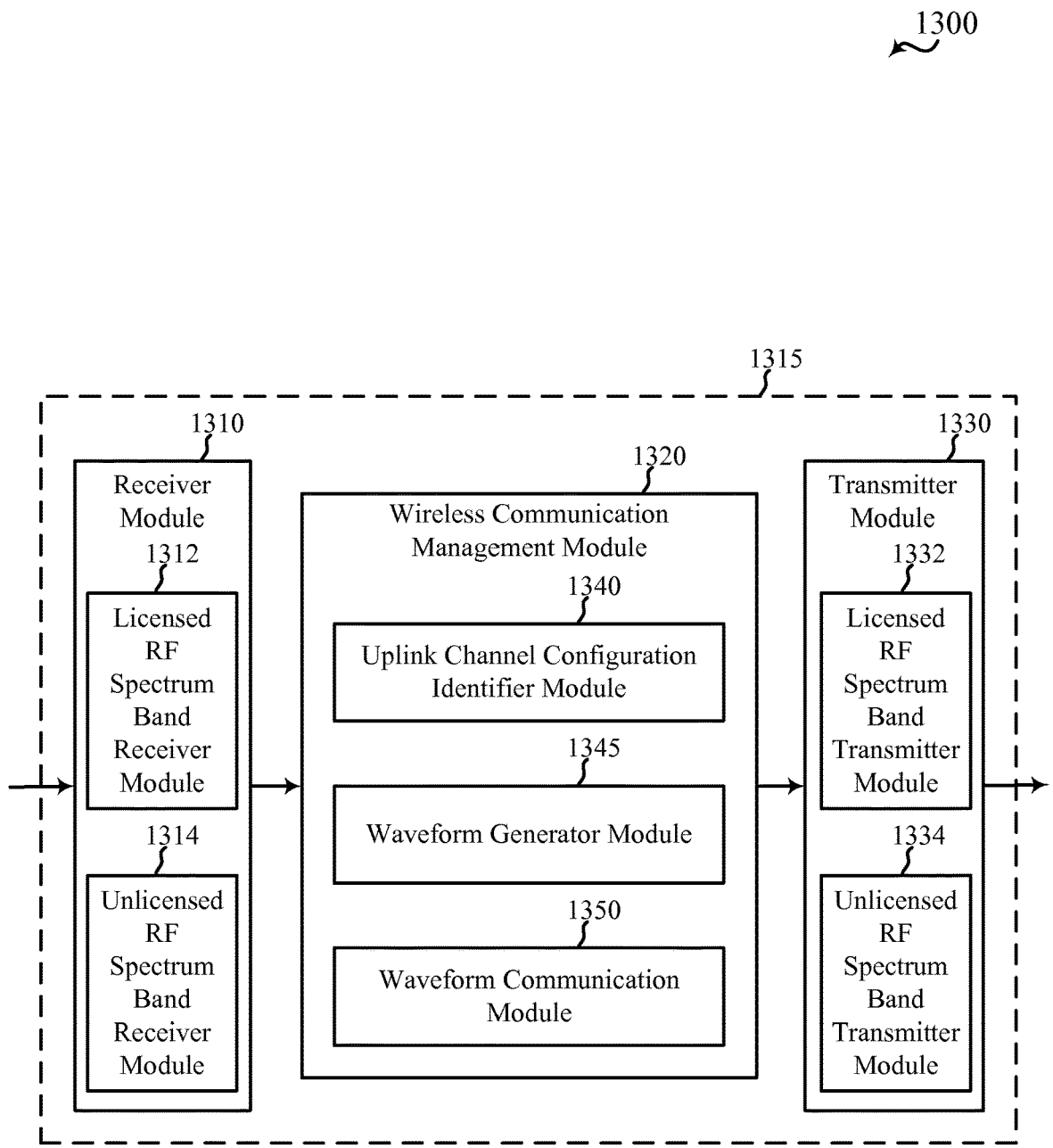
FIG. 13 shows a block diagram of an apparatus for use in wireless communication (e.g., to identify an OFDMA configuration of an uplink channel for uplink communications in an unlicensed radio frequency spectrum band), in accordance with various aspects of the present disclosure.

FIG. 13 shows a block diagram 1300 of an apparatus 1315 for use in wireless communication (e.g., to identify an OFDMA configuration of an uplink channel for uplink communications in an unlicensed radio frequency spectrum band), in accordance with various aspects of the present disclosure. In some examples, the apparatus 1315 may be an example of aspects of one or more of the UEs 115, 215, and/or 1815 described with reference to FIGS. 1, 2A, 2B, and/or 18, and/or aspects of one or more of the apparatuses 1115, 1215, 1415, 1515, and/or 1615 described with reference to FIGS. 11, 12, 14, 15, and/or 16. The apparatus 1315 may also be a processor. The apparatus 1315 may include a receiver module 1310, a wireless communication management module 1320, and/or a transmitter module 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be or include a radio frequency (RF) receiver, such as an RF receiver operable to receive transmissions in a first radio frequency spectrum band (e.g., a licensed radio frequency spectrum band usable for LTE/LTE-A communications) and/or a second radio frequency spectrum band (e.g., an unlicensed radio frequency spectrum band, such as a shared radio frequency spectrum band usable for Wi-Fi and/or LTE/LTE-A communications). The RF receiver may include separate receivers for the first radio frequency spectrum band and the second radio frequency spectrum band. The separate receivers may, in some examples, take the form of a licensed radio frequency spectrum band receiver module 1312 for communicating over the first radio frequency spectrum band, and an unlicensed radio frequency spectrum band receiver module 1314 for communicating over the second radio frequency spectrum band. The receiver module 1310, including the licensed radio frequency spectrum band receiver module 1312 and/or the unlicensed radio frequency spectrum band receiver module 1314, may be used to receive various types of data and/or control signals (i.e., transmissions) over one or more communication links of a wireless communication system including the first and second radio frequency spectrum bands, such as one or more communication links of the wireless communication system 100, 200, and/or 250 described with reference to FIGS. 1, 2A, and/or 2B.

In some examples, the transmitter module 1330 may be or include an RF transmitter, such as an RF transmitter operable to transmit in the first radio frequency spectrum band and/or the second radio frequency spectrum band. The RF transmitter may include separate transmitters for the first radio frequency spectrum band and the second radio frequency spectrum band. The separate transmitters may, in some examples, take the form of a licensed radio frequency spectrum band transmitter module 1332 for communicating over the first radio frequency spectrum band, and an unlicensed radio frequency spectrum band transmitter module 1334 for communicating over the second radio frequency spectrum band. The transmitter module 1330, including the licensed radio frequency spectrum band transmitter module 1332 and/or the unlicensed radio frequency spectrum band transmitter module 1334, may be used to transmit various types of data and/or control signals (i.e., transmissions) over one or more communication links of the wireless communication system including the first radio frequency spectrum band and the second radio frequency spectrum band.

In some examples, the wireless communication management module 1320 may be an example of one or more aspects of the wireless communication management module 1120 described with reference to FIG. 11 and may include an uplink channel configuration identifier module 1340, a waveform generator module 1345, and/or a waveform communication module 1350. Each of these components may be in communication with each other.

In some examples, the uplink channel configuration identifier module 1340 may be used to identify an OFDMA configuration of an uplink channel for uplink communications (e.g., LTE/LTE-A uplink communications) in an unlicensed radio frequency spectrum band.

In some examples, the uplink channel for which the configuration is identified may include a PUSCH, a PUCCH, or a PRACH. In some examples, the uplink channel may include a UL-MIMO channel. When the channel includes a PRACH, the PRACH may be transmitted on one or more pre-allocated interlaces.

In some examples, the waveform generator module 1345 may be used to generate an OFDMA waveform based on the identified OFDMA configuration.

In some examples, the waveform communication module 1350 may be used to communicate (e.g., transmit) the generated OFDMA waveform in a signal in the unlicensed radio frequency spectrum band using the uplink channel. The signal may be transmitted via the unlicensed radio frequency spectrum band transmitter module 1334.

Figure 14:
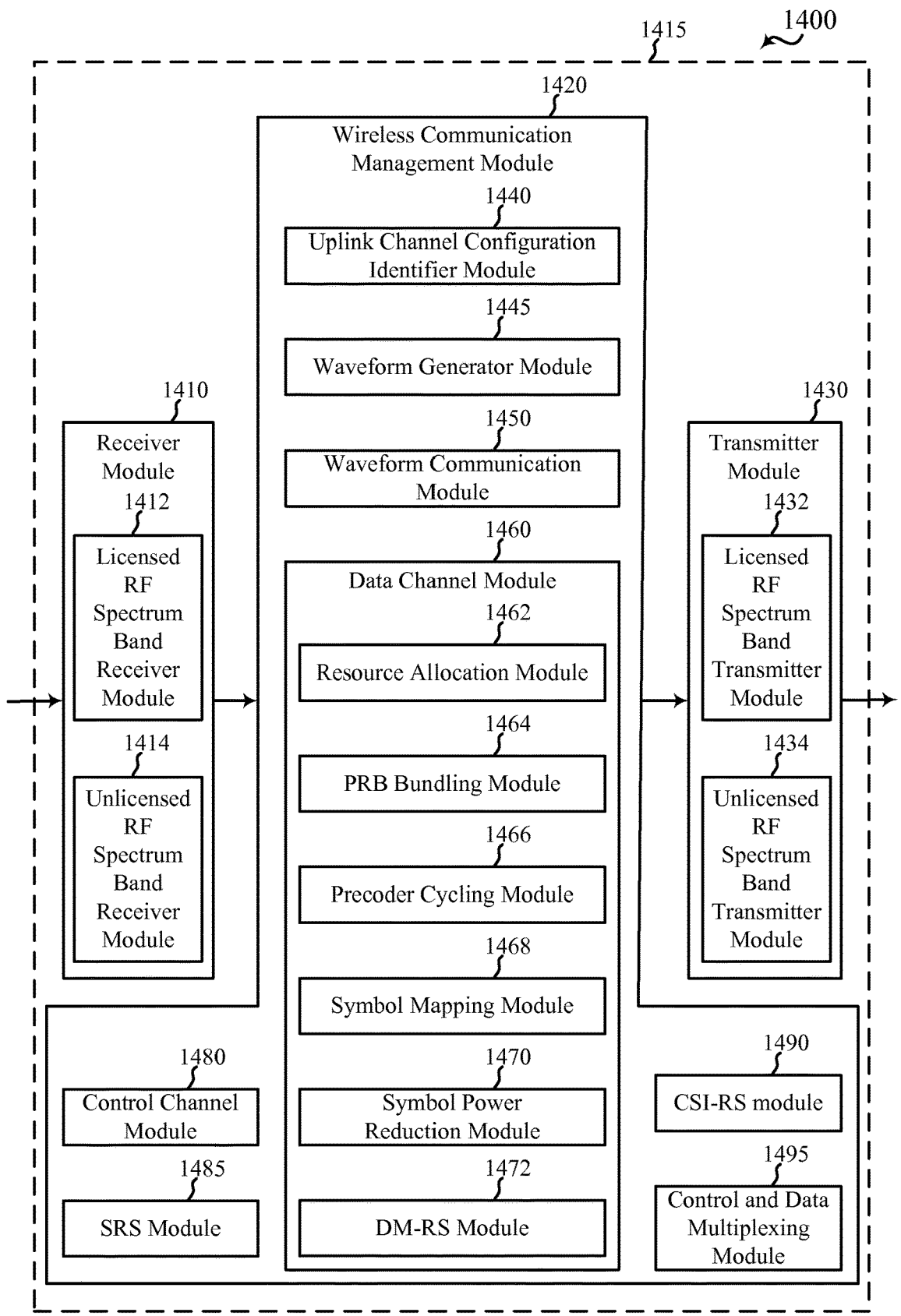
FIG. 14 shows a block diagram of an apparatus for use in wireless communication (e.g., to identify an OFDMA configuration of an uplink channel for uplink communications in an unlicensed radio frequency spectrum band), in accordance with various aspects of the present disclosure.

FIG. 14 shows a block diagram 1400 of an apparatus 1415 for use in wireless communication (e.g., to identify an OFDMA configuration of an uplink channel for uplink communications in an unlicensed radio frequency spectrum band), in accordance with various aspects of the present disclosure. In some examples, the apparatus 1415 may be an example of aspects of one or more of the UEs 115, 215, and/or 1815 described with reference to FIGS. 1, 2A, 2B, and/or 18, and/or aspects of one or more of the apparatuses 1115, 1215, 1315, 1515, and/or 1615 described with reference to FIGS. 11, 12, 13, 15, and/or 16. The apparatus 1415 may also be a processor. The apparatus 1415 may include a receiver module 1410, a wireless communication management module 1420, and/or a transmitter module 1430. Each of these components may be in communication with each other.

The components of the apparatus 1415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may be or include a radio frequency (RF) receiver, such as an RF receiver operable to receive transmissions in a first radio frequency spectrum band (e.g., a licensed radio frequency spectrum band usable for LTE/LTE-A communications) and/or a second radio frequency spectrum band (e.g., an unlicensed radio frequency spectrum band, such as a shared radio frequency spectrum band usable for WiFi and/or LTE/LTE-A communications). The RF receiver may include separate receivers for the first radio frequency spectrum band and the second radio frequency spectrum band. The separate receivers may, in some examples, take the form of a licensed radio frequency spectrum band receiver module 1412 for communicating over the first radio frequency spectrum band, and an unlicensed radio frequency spectrum band receiver module 1414 for communicating over the second radio frequency spectrum band. The receiver module 1410, including the licensed radio frequency spectrum band receiver module 1412 and/or the unlicensed radio frequency spectrum band receiver module 1414, may be used to receive various types of data and/or control signals (i.e., transmissions) over one or more communication links of a wireless communication system including the first and second radio frequency spectrum bands, such as one or more communication links of the wireless communication system 100, 200, and/or 250 described with reference to FIGS. 1, 2A, and/or 2B.

In some examples, the transmitter module 1430 may be or include an RF transmitter, such as an RF transmitter operable to transmit in the first radio frequency spectrum band and/or the second radio frequency spectrum band. The RF transmitter may include separate transmitters for the first radio frequency spectrum band and the second radio frequency spectrum band. The separate transmitters may, in some examples, take the form of a licensed radio frequency spectrum band transmitter module 1432 for communicating over the first radio frequency spectrum band, and an unlicensed radio frequency spectrum band transmitter module 1434 for communicating over the second radio frequency spectrum band. The transmitter module 1430, including the licensed radio frequency spectrum band transmitter module 1432 and/or the unlicensed radio frequency spectrum band transmitter module 1434, may be used to transmit various types of data and/or control signals (i.e., transmissions) over one or more communication links of the wireless communication system including the first radio frequency spectrum band and the second radio frequency spectrum band.

In some examples, the wireless communication management module 1420 may be an example of one or more aspects of the wireless communication management module 1120 and/or 1320 described with reference to FIGS. 11 and/or 13 and may include an uplink channel configuration identifier module 1440, a waveform generator module 1445, a waveform communication module 1450, a data channel module 1460, a control channel module 1480, an SRS module 1485, a CSI-RS module 1490, and/or a control and data multiplexing module 1495. Each of these components may be in communication with each other.

In some examples, the uplink channel configuration identifier module 1440 may be used to identify an OFDMA configuration of an uplink channel for uplink communications (e.g., LTE/LTE-A uplink communications) in an unlicensed radio frequency spectrum band.

In some examples, the uplink channel for which the configuration is identified may include a PUSCH, a PUCCH, or a PRACH. In some examples, the uplink channel may include a UL-MIMO channel. When the channel includes a PRACH, the PRACH may be transmitted on one or more pre-allocated interlaces.

In some examples, the waveform generator module 1445 may be used to generate an OFDMA waveform based on the identified OFDMA configuration.

In some examples, the waveform communication module 1450 may be used to communicate (e.g., transmit) the generated OFDMA waveform in a signal in the unlicensed radio frequency spectrum band using the uplink channel. The signal may be transmitted via the unlicensed radio frequency spectrum band transmitter module 1434.

In some examples, the data channel module 1460 may include a resource allocation module 1462, a physical resource block (PRB) bundling module 1464, a precoder cycling module 1466, a symbol mapping module 1468, a symbol power reduction module 1470, a DM-RS module 1472. The data channel module 1460 may be used, for example, to manage the configuration, generation, and/or transmission of a PUSCH.

In some examples, the resource allocation module 1462 may be used to allocate resources for the uplink channel. In some examples, the allocation of resources may be based at least in part on a bitmap, and may include, for example, Type 0 and Type 1 resource blocks. Also or alternately, the allocation of resources may be based at least in part on a starting resource block and a number of resource blocks (e.g., the allocation of resources may be resource indication value (RIV) based with Type 2 localized or Modified Type 2 distributed resource blocks).

In some examples, the PRB bundling module 1464 may be used to apply PRB bundling when generating the OFDMA waveform. The PRB bundling may be grant specific (e.g., all physical resource blocks in a transmission for a PUSCH may be bundled).

In some examples, the precoder cycling module 1466 may be used to apply precoder cycling when generating the OFDMA waveform. In some examples, the precoder cycling may include cycling through a pre-defined set of precoders.

In some examples, the symbol mapping module 1468 may be used to map one or more modulation symbols. In some examples, the symbol mapping module 1468 may map modulation symbols to one or more resource elements according to one or more OFDMA symbol positions. In the same or other cases, the symbol mapping module 1468 may map modulation symbols to one or more resource elements according to one or more frequency sub-carriers. The symbol mapping module 1468 may also or alternately map modulation symbols to one or more resource elements according to an interleaving of time slots and frequency sub-carriers.

In some examples, the symbol power reduction module 1470 may be used to reduce symbol power. For example, the symbol power reduction module 1470 may apply symbol permutation or phase rotation, to reduce a metric indicating symbol power, when generating the OFDMA waveform. The symbol power reduction module 1470 may also, or alternately, apply different scrambling sequences to the OFDMA waveform, and may select one of the scrambling sequences for use when communicating the generated OFDMA waveform in the signal in the unlicensed radio frequency spectrum band.

In some examples, the DM-RS module 1472 may be used to transmit a DM-RS on the uplink channel. The DM-RS module 1472 may transmit the DM-RS in a set of one or more time slots and one or more frequency sub-carriers. The DM-RS module 1472 may transmit the DM-RS in conjunction with communicating the generated OFDMA waveform.

In some examples, the set of one or more time slots and one or more frequency sub-carriers in which the DM-RS is transmitted may be the same as a set of one or more time slots and one or more frequency sub-carriers used to receive a UE-RS on a downlink channel (e.g., as described with reference to FIG. 5 and FIG. 6). In other cases, the set of one or more time slots and one or more frequency sub-carriers in which the DM-RS is transmitted may differ in at least one respect from a set of one or more time slots and one or more frequency sub-carriers used to receive a UE-RS on a downlink channel (e.g., as described with reference to FIG. 5 and FIG. 7). The downlink channel may be a downlink channel used for downlink communications (e.g., LTE/LTE-A downlink communications) in the licensed radio frequency spectrum band or the unlicensed radio frequency spectrum band.

In some examples, the control channel module 1480 may be used to manage the configuration, generation, and/or transmission of a PUSCH. In some examples, the control channel module 1480 may be used to manage the transmission of duplicate copies of the PUCCH in a plurality of interleaved resource blocks, as described, for example, with reference to FIG. 8A. In other cases, the control channel module 1480 may be used to manage transmission of the PUCCH within a plurality of interleaved resource blocks, according to a code division multiplexing sequence or other orthogonal sequence, as described, for example, with reference to FIG. 8A. In other cases, the control channel module 1480 may be used to multiplex the PUCCH within a plurality of resource elements of an enhanced resource element group, as described, for example, with reference to FIG. 8B.

In some examples, the SRS module 1485 may be used to manage the configuration, generation, and/or transmission of an SRS on the uplink channel. The SRS may be located in an OFDM symbol of a subframe that is different from a last OFDM symbol of the subframe, as described, for example, with reference to FIG. 4. In other cases, the SRS may be located in the last OFDM symbol of the subframe.

The SRS may, in some examples, be configured similarly to how SRS is configured for an LTE/LTE-A uplink channel in a licensed radio frequency spectrum band (e.g., the SRS may be Zadoff-Chu (ZC) sequence based).

In some examples, the CSI-RS module 1490 may be used to manage the configuration, generation, and/or transmission of a CSI-RS on the uplink channel. In some examples, the CSI-RS may be transmitted independent of an allocation of resources and on all resource blocks. In some examples, the CSI-RS may be transmitted depending on a resource allocation. The CSI-RS may be wideband and include N tones per resource block. The symbols used for CSI-RS may be pre-defined or defined through control channel (e.g., PUCCH) or radio resource control (RRC) signaling. The CSI-RS module 1490 may be used to indicate a rate matching required for PUSCH and PUCCH, to accommodate transmission of the CSI-RS, to other UEs or apparatuses that are frequency multiplexed on a same uplink subframe of the uplink channel as the apparatus 1415. The CSI-RS module 1490 may also be used to manage the configuration, generation, and/or transmission of a channel state information interference measurement (CSI-IM) on the uplink channel.

In some examples, the control and data multiplexing module 1495 may be used to manage the transmission of the uplink channel based on whether the uplink channel includes a control channel (e.g., a PUCCH) and/or a data channel (e.g., a PUSCH). For example, when the uplink channel includes the PUCCH but not the PUSCH, the control and data multiplexing module 1495 may configure the waveform communication module 1450 to transmit the uplink channel using a first set of resource blocks. When the uplink channel includes the PUSCH but not the PUCCH, the control and data multiplexing module 1495 may configure the waveform communication module 1450 to transmit the uplink channel using a second set of resource blocks, which second set of resource blocks is different from the first set of resource blocks. When the uplink channel includes both the PUSCH and the PUCCH, the control and data multiplexing module 1495 may configure the waveform communication module 1450 to frequency division multiplex the PUCCH and the PUSCH. In some examples, the waveform communication module 1450 may be configured to frequency division multiplex the PUCCH and the PUSCH by transmitting the PUCCH on a subset of less than all of the first set of resource blocks, and by transmitting the PUSCH on at least some of the second set of resource blocks, as described, for example, with reference to FIG. 10. In other cases, the waveform communication module 1450 may be configured to frequency division multiplex the PUCCH and the PUSCH by puncturing at least one frequency sub-carrier of at least one RB of the first set of resource blocks to transmit at least part of the PUSCH.

Figure 15:
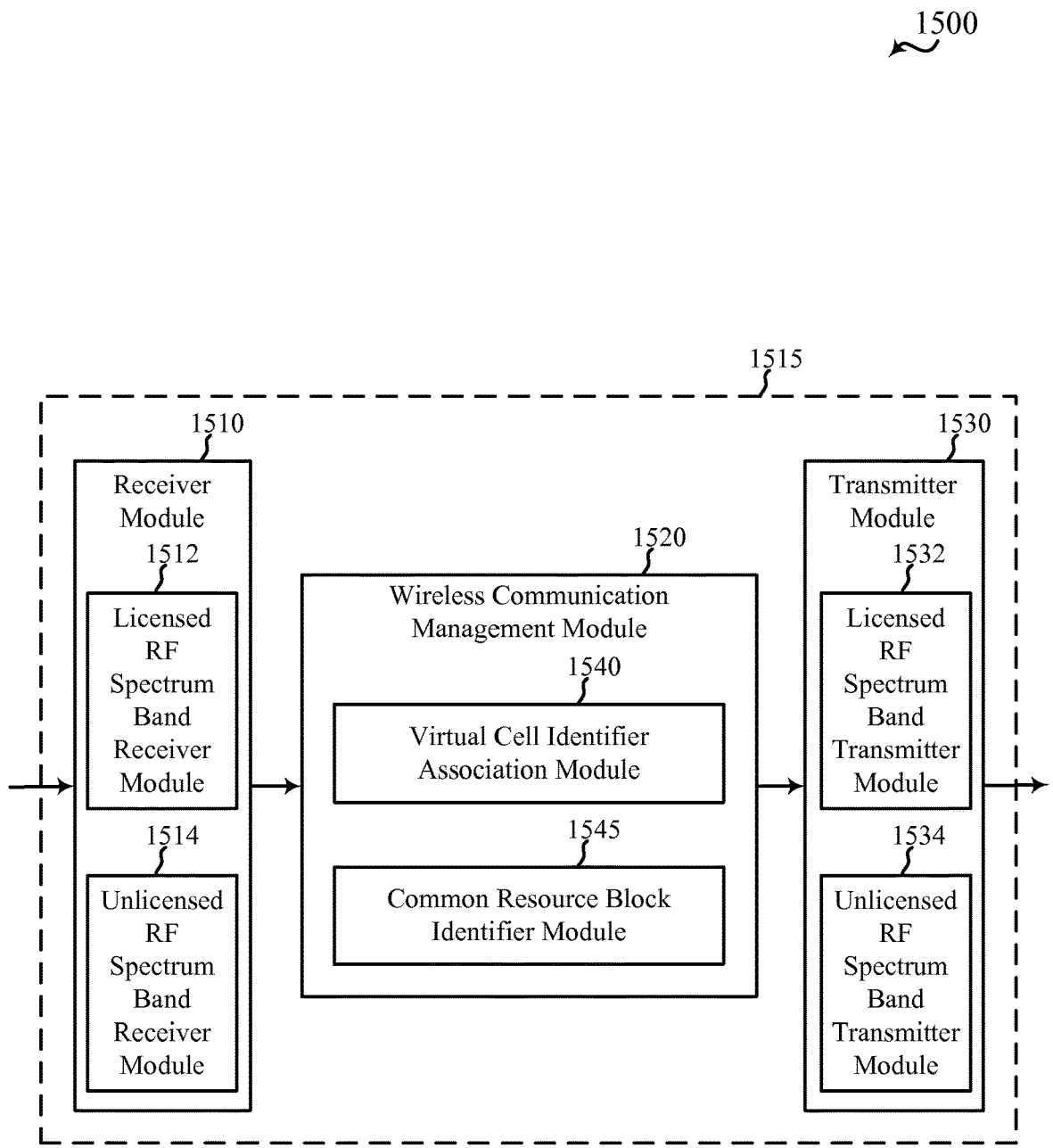
FIG. 15 shows a block diagram of an apparatus for use in wireless communication (e.g., to identify a set of common resource blocks for transmission of a DM-RS in an uplink channel for uplink communications in an unlicensed radio frequency spectrum band), in accordance with various aspects of the present disclosure.

FIG. 15 shows a block diagram 1500 of an apparatus 1515 for use in wireless communication (e.g., to identify a set of common resource blocks for transmission of a DM-RS in an uplink channel for uplink communications in an unlicensed radio frequency spectrum band), in accordance with various aspects of the present disclosure. In some examples, the apparatus 1515 may be an example of aspects of one or more of the UEs 115, 215, and/or 1815 described with reference to FIGS. 1, 2A, 2B, and/or 18, aspects of one or more of the base stations 105, 205, and/or 1705 described with reference to FIGS. 1, 2A, 2B, and/or 17, and/or aspects of one or more of the apparatuses 1115, 1215, 1315, 1415, and/or 1615 described with reference to FIGS. 11, 12, 13, 14, and/or 16. The apparatus 1515 may also be a processor. The apparatus 1515 may include a receiver module 1510, a wireless communication management module 1520, and/or a transmitter module 1530. Each of these components may be in communication with each other.

The components of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1510 may be or include a radio frequency (RF) receiver, such as an RF receiver operable to receive transmissions in a first radio frequency spectrum band (e.g., a licensed radio frequency spectrum band usable for LTE/LTE-A communications) and/or a second radio frequency spectrum band (e.g., an unlicensed radio frequency spectrum band, such as a shared radio frequency spectrum band usable for Wi-Fi and/or LTE/LTE-A communications). The RF receiver may include separate receivers for the first radio frequency spectrum band and the second radio frequency spectrum band. The separate receivers may, in some examples, take the form of a licensed radio frequency spectrum band receiver module 1512 for communicating over the first radio frequency spectrum band, and an unlicensed radio frequency spectrum band receiver module 1514 for communicating over the second radio frequency spectrum band. The receiver module 1510, including the licensed radio frequency spectrum band receiver module 1512 and/or the unlicensed radio frequency spectrum band receiver module 1514, may be used to receive various types of data and/or control signals (i.e., transmissions) over one or more communication links of a wireless communication system including the first and second radio frequency spectrum bands, such as one or more communication links of the wireless communication system 100, 200, and/or 250 described with reference to FIGS. 1, 2A, and/or 2B.

In some examples, the transmitter module 1530 may be or include an RF transmitter, such as an RF transmitter operable to transmit in the first radio frequency spectrum band and/or the second radio frequency spectrum band. The RF transmitter may include separate transmitters for the first radio frequency spectrum band and the second radio frequency spectrum band. The separate transmitters may, in some examples, take the form of a licensed radio frequency spectrum band transmitter module 1532 for communicating over the first radio frequency spectrum band, and an unlicensed radio frequency spectrum band transmitter module 1534 for communicating over the second radio frequency spectrum band. The transmitter module 1530, including the licensed radio frequency spectrum band transmitter module 1532 and/or the unlicensed radio frequency spectrum band transmitter module 1534, may be used to transmit various types of data and/or control signals (i.e., transmissions) over one or more communication links of the wireless communication system including the first radio frequency spectrum band and the second radio frequency spectrum band.

In some examples, the wireless communication management module 1520 may be an example of one or more aspects of the wireless communication management module 1120 described with reference to FIG. 11 and may include a virtual cell identifier association module 1540 and/or a common RB identifier module 1545. Each of these components may be in communication with each other.

In some examples, the virtual cell identifier association module 1540 may be used to associate a virtual cell identifier of a first base station with transmissions between the first base station and the apparatus 1515. The virtual cell identifier may also be associated with transmissions between a second base station and a second apparatus. The transmissions between the first base station and the apparatus 1515, and between the second base station and the second apparatus, may, in some examples, be communications (e.g., LTE/LTE-A communications) in an unlicensed radio frequency spectrum band (e.g., a shared radio frequency spectrum band usable for Wi-Fi and/or LTE/LTE-A communications).

In some examples, the common RB identifier module 1545 may be used to identify a set of common resource blocks for transmission of a DM-RS in an uplink channel and a downlink channel between the first base station and the apparatus 1515. The identification of the set of common resource blocks may be based at least in part on the virtual cell identifier associated with transmissions between the first base station and the apparatus 1515.

Figure 16:
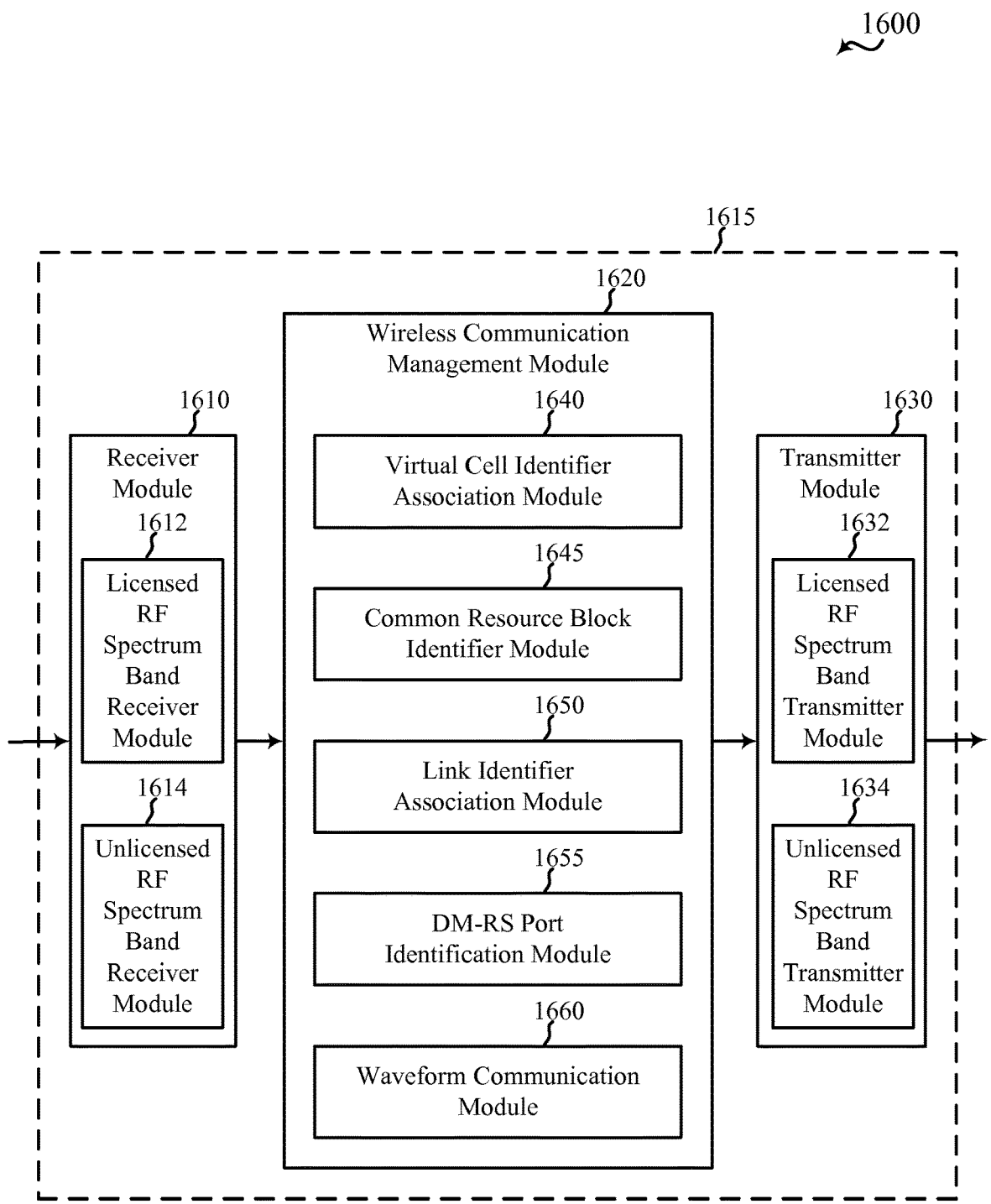
FIG. 16 shows a block diagram of an apparatus for use in wireless communication (e.g., to identify a set of common resource blocks for transmission of a DM-RS in an uplink channel for uplink communications in an unlicensed radio frequency spectrum band), in accordance with various aspects of the present disclosure.

FIG. 16 shows a block diagram 1600 of an apparatus 1615 for use in wireless communication (e.g., to identify a set of common resource blocks for transmission of a DM-RS in an uplink channel for uplink communications in an unlicensed radio frequency spectrum band), in accordance with various aspects of the present disclosure. In some examples, the apparatus 1615 may be an example of aspects of one or more of the UEs 115, 215, and/or 1815 described with reference to FIGS. 1, 2A, 2B, and/or 18, aspects of one or more of the base stations 105, 205, and/or 1705 described with reference to FIGS. 1, 2A, 2B, and/or 17, and/or aspects of one or more of the apparatuses 1115, 1215, 1315, 1415, and/or 1515 described with reference to FIGS. 11, 12, 13, 14, and/or 15. The apparatus 1615 may also be a processor. The apparatus 1615 may include a receiver module 1610, a wireless communication management module 1620, and/or a transmitter module 1630. Each of these components may be in communication with each other.

The components of the apparatus 1615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610 may be or include a radio frequency (RF) receiver, such as an RF receiver operable to receive transmissions in a first radio frequency spectrum band (e.g., a licensed radio frequency spectrum band usable for LTE/LTE-A communications) and/or a second radio frequency spectrum band (e.g., an unlicensed radio frequency spectrum band, such as a shared radio frequency spectrum band usable for Wi-Fi and/or LTE/LTE-A communications). The RF receiver may include separate receivers for the first radio frequency spectrum band and the second radio frequency spectrum band. The separate receivers may, in some examples, take the form of a licensed radio frequency spectrum band receiver module 1612 for communicating over the first radio frequency spectrum band, and an unlicensed radio frequency spectrum band receiver module 1614 for communicating over the second radio frequency spectrum band. The receiver module 1610, including the licensed radio frequency spectrum band receiver module 1612 and/or the unlicensed radio frequency spectrum band receiver module 1614, may be used to receive various types of data and/or control signals (i.e., transmissions) over one or more communication links of a wireless communication system including the first and second radio frequency spectrum bands, such as one or more communication links of the wireless communication system 100, 200, and/or 250 described with reference to FIGS. 1, 2A, and/or 2B.

In some examples, the transmitter module 1630 may be or include an RF transmitter, such as an RF transmitter operable to transmit in the first radio frequency spectrum band and/or the second radio frequency spectrum band. The RF transmitter may include separate transmitters for the first radio frequency spectrum band and the second radio frequency spectrum band. The separate transmitters may, in some examples, take the form of a licensed radio frequency spectrum band transmitter module 1632 for communicating over the first radio frequency spectrum band, and an unlicensed radio frequency spectrum band transmitter module 1634 for communicating over the second radio frequency spectrum band. The transmitter module 1630, including the licensed radio frequency spectrum band transmitter module 1632 and/or the unlicensed radio frequency spectrum band transmitter module 1634, may be used to transmit various types of data and/or control signals (i.e., transmissions) over one or more communication links of the wireless communication system including the first radio frequency spectrum band and the second radio frequency spectrum band.

In some examples, the wireless communication management module 1620 may be an example of one or more aspects of the wireless communication management module 1120 described with reference to FIG. 11 and may include a virtual cell identifier association module 1640, a common RB identifier module 1645, a link identifier association module 1650, a DM-RS port identification module 1655, and/or a waveform communication module 1660. Each of these components may be in communication with each other.

In some examples, the virtual cell identifier association module 1640 may be used to associate a virtual cell identifier of a first base station with transmissions between the first base station and the apparatus 1615. The virtual cell identifier may also be associated with transmissions between a second base station and a second apparatus. The transmissions between the first base station and the apparatus 1615, and between the second base station and the second apparatus, may, in some examples, be communications (e.g., LTE/LTE-A communications) in an unlicensed radio frequency spectrum band (e.g., a shared radio frequency spectrum band usable for Wi-Fi and/or LTE/LTE-A communications).

In some examples, the common RB identifier module 1645 may be used to identify a set of common resource blocks for transmission of a DM-RS in an uplink channel and a downlink channel between the first base station and the apparatus 1615. The identification of the set of common resource blocks may be based at least in part on the virtual cell identifier associated with transmissions between the first base station and the apparatus 1615.

In some examples, the link identifier association module 1650 may be used to associate a first link identifier with the uplink channel between the first base station and the apparatus 1615, and to associate a second link identifier with the downlink channel between the first base station and the apparatus 1615, where the first link identifier is different from the second link identifier.

In some examples, the DM-RS port identification module 1655 may be used to identify a port associated with a first spatial multiplexing for transmission of the DM-RS between the first base station and the apparatus 1615. The first spatial multiplexing may be different from a second spatial multiplexing associated with a port used to transmit a DM-RS between the second base station and the second apparatus.

In some examples, the waveform communication module 1660 may be used to transmit the first link identifier with transmissions in the uplink channel or transmit the second link identifier with transmissions in the downlink channel. The transmissions may be made via the identified port. In some examples, transmitting the first link identifier with transmissions in the uplink channel may include generating the DM-RS as a function of the first link identifier. In other cases, transmitting the second link identifier with transmissions in the downlink channel may include generating the DM-RS as a function of the second link identifier.

Figure 17:
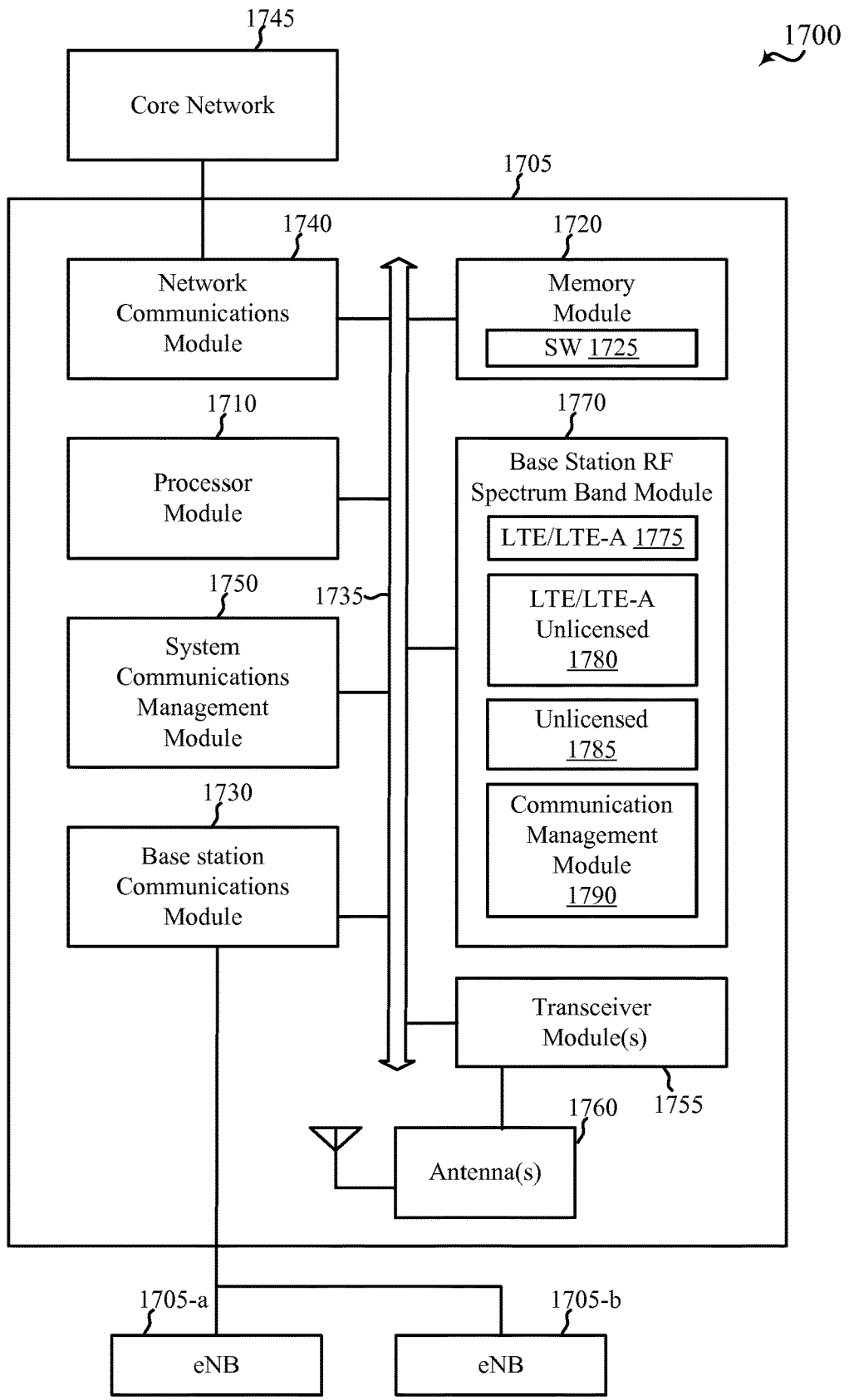
FIG. 17 shows a block diagram of a base station for use in wireless communication, in accordance with various aspects of the present disclosure.

FIG. 17 shows a block diagram 1700 of a base station 1705 for use in wireless communication, in accordance with various aspects of the present disclosure. In some examples, the base station 1705 may be an example of one or more aspects of one of the base stations 105 and/or 205 described with reference to FIGS. 1, 2A, and/or 2B, and/or one of the apparatuses 1115, 1515, and/or 1615 described with reference to FIGS. 11, 15, and/or 16. The base station 1705 may be configured to implement or facilitate at least some of the features and functions described with reference to FIGS. 1, 2A, 2B, 5, 6, 7, 8A, 8B, 9, 10, 11, 15, and/or 16. The base station 1705 may include a processor module 1710, a memory module 1720, at least one transceiver module (represented by transceiver module(s) 1755), at least one antenna (represented by antenna(s) 1760), and/or a base station RF spectrum band module 1770. The base station 1705 may also include one or more of a base station communications module 1730, a network communications module 1740, and a system communications management module 1750. Each of these components may be in communication with each other, directly or indirectly, over one or more buses 1735.

The memory module 1720 may include RAM and/or ROM. The memory module 1720 may store computer-readable, computer-executable software (SW) code 1725 containing instructions that are configured to, when executed, cause the processor module 1710 to perform various functions described herein for communicating (or managing communications) over a first radio frequency spectrum band (e.g., a licensed radio frequency spectrum band usable for LTE/LTE-A communications) and/or a second radio frequency spectrum band (e.g., an unlicensed radio frequency spectrum band usable for LTE/LTE-A communications). Alternatively, the software code 1725 may not be directly executable by the processor module 1710 but be configured to cause the base station 1705 (e.g., when compiled and executed) to perform various of the functions described herein.

The processor module 1710 may include an intelligent hardware device, e.g., a central processing unit (CPU), a microcontroller, an ASIC, etc. The processor module 1710 may process information received through the transceiver module(s) 1755, the base station communications module 1730, and/or the network communications module 1740. The processor module 1710 may also process information to be sent to the transceiver module(s) 1755 for transmission through the antenna(s) 1760, to the base station communications module 1730 for transmission to one or more other base stations 1705-*a* and 1705-*b*, and/or to the network communications module 1740 for transmission to a core network 1745, which may be an example of aspects of the core network 130 described with reference to FIG. 1. The processor module 1710 may handle, alone or in connection with the base station RF spectrum band module 1770, various aspects of communicating over (or managing communications over) the first radio frequency spectrum band and/or the second radio frequency spectrum band.

The transceiver module(s) 1755 may include a modem configured to modulate packets and provide the modulated packets to the antenna(s) 1760 for transmission, and to demodulate packets received from the antenna(s) 1760. The transceiver module(s) 1755 may, in some examples, be implemented as one or more transmitter modules and one or more separate receiver modules. The transceiver module(s) 1755 may support communications in the first radio frequency spectrum band and/or the second radio frequency spectrum band. The transceiver module(s) 1755 may be configured to communicate bi-directionally, via the antenna(s) 1760, with one or more of the UEs 115, 215, 1215, 1315, and/or 1415 described with reference to FIGS. 1, 2A, 2B, 12A, 13, and/or 14, for example. The base station 1705 may typically include multiple antennas 1760 (e.g., an antenna array). The base station 1705 may communicate with the core network 1745 through the network communications module 1740. The base station 1705 may also communicate with other base stations or eNBs, such as the eNBs 1705-*a* and 1705-*b*, using the base station communications module 1730.

According to the architecture of FIG. 17, the system communications management module 1750 may manage communications with other base stations and/or apparatuses. In some examples, functionality of the system communications management module 1750 may be implemented as a component of the transceiver module(s) 1755, as a computer program product, and/or as one or more controller elements of the processor module 1710.

The base station RF spectrum band module 1770 may be configured to perform, control, and/or facilitate some or all of the features and/or functions described with reference to FIGS. 1, 2A, 2B, 5, 6, 7, 8A, 8B, 9, 10, 11, 15, and/or 16 related to wireless communication in the first radio frequency spectrum band and/or the second radio frequency spectrum band. In some examples, the base station RF spectrum band module 1770 may be configured to support a supplemental downlink mode, a carrier aggregation mode, and/or a standalone mode of operation in the second radio frequency spectrum band. The base station RF spectrum band module 1770 may include an LTE/LTE-A module 1775 configured to handle LTE/LTE-A communications in a licensed radio frequency spectrum band, an LTE/LTE-A unlicensed module 1780 configured to handle LTE/LTE-A communications in an unlicensed radio frequency spectrum band, and/or an unlicensed module 1785 configured to handle communications other than LTE/LTE-A communications in an unlicensed radio frequency spectrum band. The base station RF spectrum band module 1770 may also include communication management module 1790. The communication management module 1790 may manage some or all of the communications with UEs and/or apparatuses such as the UEs 115, 215, and/or 1815 described with reference to FIGS. 1, 2A, 2B, and/or 18, and/or the apparatuses 1115, 1215, 1315, 1415, 1515, and/or 1615 described with reference to FIGS. 11, 12, 13, 14, 15, and/or 16. In some examples, and by way of example, the communication management module 1790 may be an example of one or more aspects of the wireless communication management module 1120, 1520, and/or 1620 described with reference to FIGS. 11, 15, and/or 16. The base station RF spectrum band module 1770, or portions of it, may include a processor, and/or some or all of the functions of the base station RF spectrum band module 1770 may be performed by the processor module 1710 and/or in connection with the processor module 1710.

Figure 18:
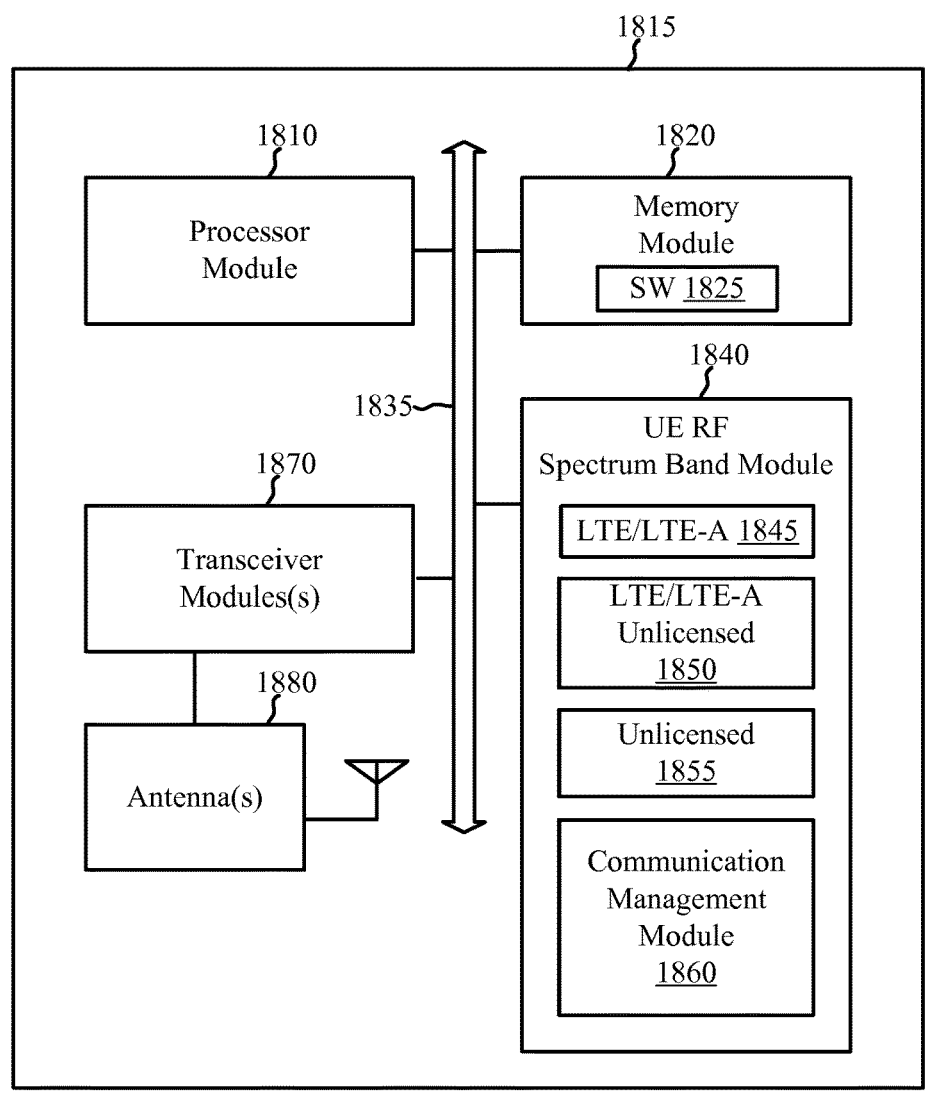
FIG. 18 shows a block diagram of a UE for use in wireless communication, in accordance with various aspects of the present disclosure.

FIG. 18 shows a block diagram 1800 of a UE 1815 for use in wireless communication, in accordance with various aspects of the present disclosure. The UE 1815 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 1815 may, in some examples, have an internal power supply (not shown), such as a small battery, to facilitate mobile operation. In some examples, the UE 1815 may be an example of one or more aspects of one of the UEs 115 and/or 215 described with reference to FIGS. 1, 2A, and/or 2B, and/or one of the apparatuses 1115, 1215, 1315, 1415, 1515, and/or 1615 described with reference to FIGS. 11, 12, 13, 14, 15, and/or 16. The UE 1815 may be configured to implement at least some of the features and functions described with reference to FIGS. 1, 2A, 2B, 5, 6, 7, 8A, 8B, 9, 10, 11, 12, 13, 14, 15, and/or 16.

The UE 1815 may include a processor module 1810, a memory module 1820, at least one transceiver module (represented by transceiver module(s) 1870), at least one antenna (represented by antenna(s) 1880), and/or a UE RF spectrum band module 1840. Each of these components may be in communication with each other, directly or indirectly, over one or more buses 1835.

The memory module 1820 may include random access memory (RAM) and/or read-only memory (ROM). The memory module 1820 may store computer-readable, computer-executable software (SW) code 1825 containing instructions that are configured to, when executed, cause the processor module 1810 to perform various functions described herein for communicating over (or managing communications over) a first radio frequency spectrum band (e.g., a licensed radio frequency spectrum band usable for LTE/LTE-A communications) and/or a second radio frequency spectrum band (e.g., an unlicensed radio frequency spectrum band usable for LTE/LTE-A communications). Alternatively, the software code 1825 may not be directly executable by the processor module 1810 but be configured to cause the UE 1815 (e.g., when compiled and executed) to perform various of the functions described herein.

The processor module 1810 may include an intelligent hardware device, e.g., a CPU, a microcontroller, an ASIC, etc. The processor module 1810 may process information received through the transceiver module(s) 1870 and/or information to be sent to the transceiver module(s) 1870 for transmission through the antenna(s) 1880. The processor module 1810 may handle, alone or in connection with the UE RF spectrum band module 1840, various aspects of communicating over (or managing communications over) the first radio frequency spectrum band and/or the second radio frequency spectrum band.

The transceiver module(s) 1870 may include a modem configured to modulate packets and provide the modulated packets to the antenna(s) 1880 for transmission, and to demodulate packets received from the antenna(s) 1880. The transceiver module(s) 1870 may, in some examples, be implemented as one or more transmitter modules and one or more separate receiver modules. The transceiver module(s) 1870 may support communications in the first radio frequency spectrum band and/or the second radio frequency spectrum band. The transceiver module(s) 1870 may be configured to communicate bi-directionally, via the antenna(s) 1880, with one or more of the base stations 105, 205, and/or 1705 described with reference to FIGS. 1, 2A, 2B, and/or 17, and/or the apparatuses 1115, 1515, and/or 1615 described with reference to FIGS. 11, 15, and/or 16. While the UE 1815 may include a single antenna, there may be examples in which the UE 1815 may include multiple antennas 1880.

The UE RF spectrum band module 1840 may be configured to perform and/or control some or all of the features and/or functions described with reference to FIGS. 1, 2A, 2B, 5, 6, 7, 8A, 8B, 9, 10, 11, 12, 13, 14, 15, and/or 16 related to wireless communication in the first radio frequency spectrum band and/or the second radio frequency spectrum band. For example, the UE RF spectrum band module 1840 may be configured to support a supplemental downlink mode, a carrier aggregation mode, and/or a standalone mode of operation in the second radio frequency spectrum band. The UE RF spectrum band module 1840 may include an LTE/LTE-A module 1845 configured to handle LTE/LTE-A communications in a licensed radio frequency spectrum band, an LTE/LTE-A unlicensed module 1850 configured to handle LTE/LTE-A communications in an unlicensed radio frequency spectrum band, and/or an unlicensed module 1855 configured to handle communications other than LTE/LTE-A communications in an unlicensed radio frequency spectrum band. The UE RF spectrum band module 1840 may also include a communication management module 1860. In some examples, and by way of example, the communication management module 1860 may be an example of one or more aspects of the wireless communication management module 1120, 1220, 1320, 1420, 1520, and/or 1620 described with reference to FIGS. 11, 12, 13, 14, 15, and/or 16. The UE RF spectrum band module 1840, or portions of it, may include a processor, and/or some or all of the functions of the UE RF spectrum band module 1840 may be performed by the processor module 1810 and/or in connection with the processor module 1810.

Figure 19:
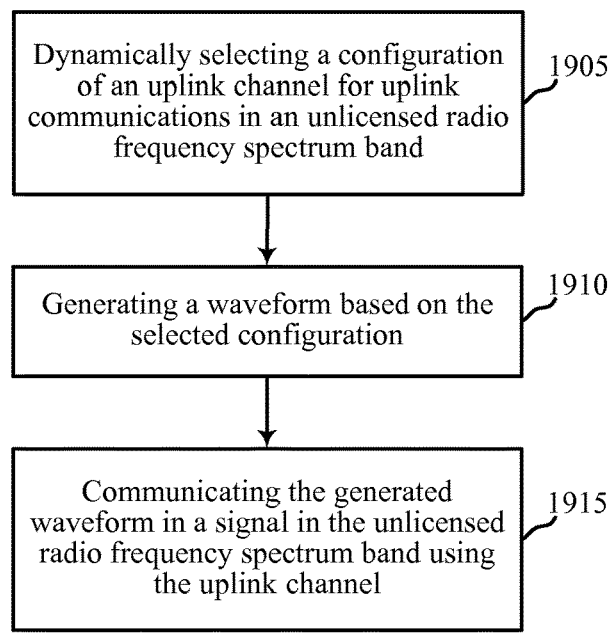
FIG. 19 is a flowchart illustrating an example of a method of wireless communication, in accordance with various aspects of the present disclosure.

FIG. 19 is a flowchart illustrating an example of a method 1900 of wireless communication, in accordance with various aspects of the present disclosure. For clarity, the method 1900 is described below with reference to aspects of one or more of the UEs 115, 215, and/or 1815 described with reference to FIGS. 1, 2A, 2B, and/or 18, and/or aspects of one or more of the apparatuses 1115 and/or 1215 described with reference to FIGS. 11 and/or 12. In some examples, a UE such as one of the UEs 115, 215, or 1815 or an apparatus such as one of the apparatuses 1115 or 1215 may execute one or more sets of codes to control the functional elements of the UE or apparatus to perform the functions described below.

At block 1905, the method 1900 may include dynamically selecting a configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). In some examples, the configuration of the uplink channel may be selected from among an OFDMA configuration, an SC-FDMA configuration, and/or an RB interleaved FDMA configuration.

In some examples, the configuration of the uplink channel may be selected based at least in part on signaling received from a base station (e.g., an eNB). In other cases, the configuration of the uplink channel may be selected based on its proximity to a base station. For example, a resource block level interleaved FDMA configuration or an OFDMA configuration may be selected when a UE or apparatus performing the method 1900 is relatively closer to the base station, as determined, for example, by a signal strength or signal quality of communications with the base station.

The operation(s) at block 1905 may be performed using the wireless communication management module 1120, 1220, and/or the communication management module 1860 described with reference to FIGS. 11, 12, and/or 18, and/or the uplink channel configuration selector module 1240 described with reference to FIG. 12.

At block 1910, the method 1900 may include generating a waveform based on the selected configuration. When the selected configuration is an OFDMA configuration, the generated waveform may be an OFDMA waveform. When the selected configuration is an SC-FDMA configuration, the generated waveform may be an SC-FDMA waveform. When the selected configuration is a resource block interleaved FDMA configuration, the generated waveform may be a resource block interleaved FDMA waveform. The operation(s) at block 1910 may be performed using the wireless communication management module 1120, 1220, and/or the communication management module 1860 described with reference to FIGS. 11, 12, and/or 18, and/or the waveform generator module 1245 described with reference to FIG. 12.

At block 1915, the method 1900 may include communicating (e.g., transmitting) the generated waveform in a signal in the unlicensed radio frequency spectrum band using the uplink channel. The operation(s) at block 1915 may be performed using the wireless communication management module 1120, 1220, and/or the communication management module 1860 described with reference to FIGS. 11, 12, and/or 18, the waveform communication module 1250 described with reference to FIG. 12, the transmitter module 1130 and/or 1230 described with reference to FIGS. 11 and/or 12, the unlicensed radio frequency spectrum band transmitter module 1234 described with reference to FIG. 12, and/or the transceiver module(s) 1870 described with reference to FIG. 18.

Thus, the method 1900 may provide for wireless communication. It should be noted that the method 1900 is just one implementation and that the operations of the method 1900 may be rearranged or otherwise modified such that other implementations are possible.

Figure 20:
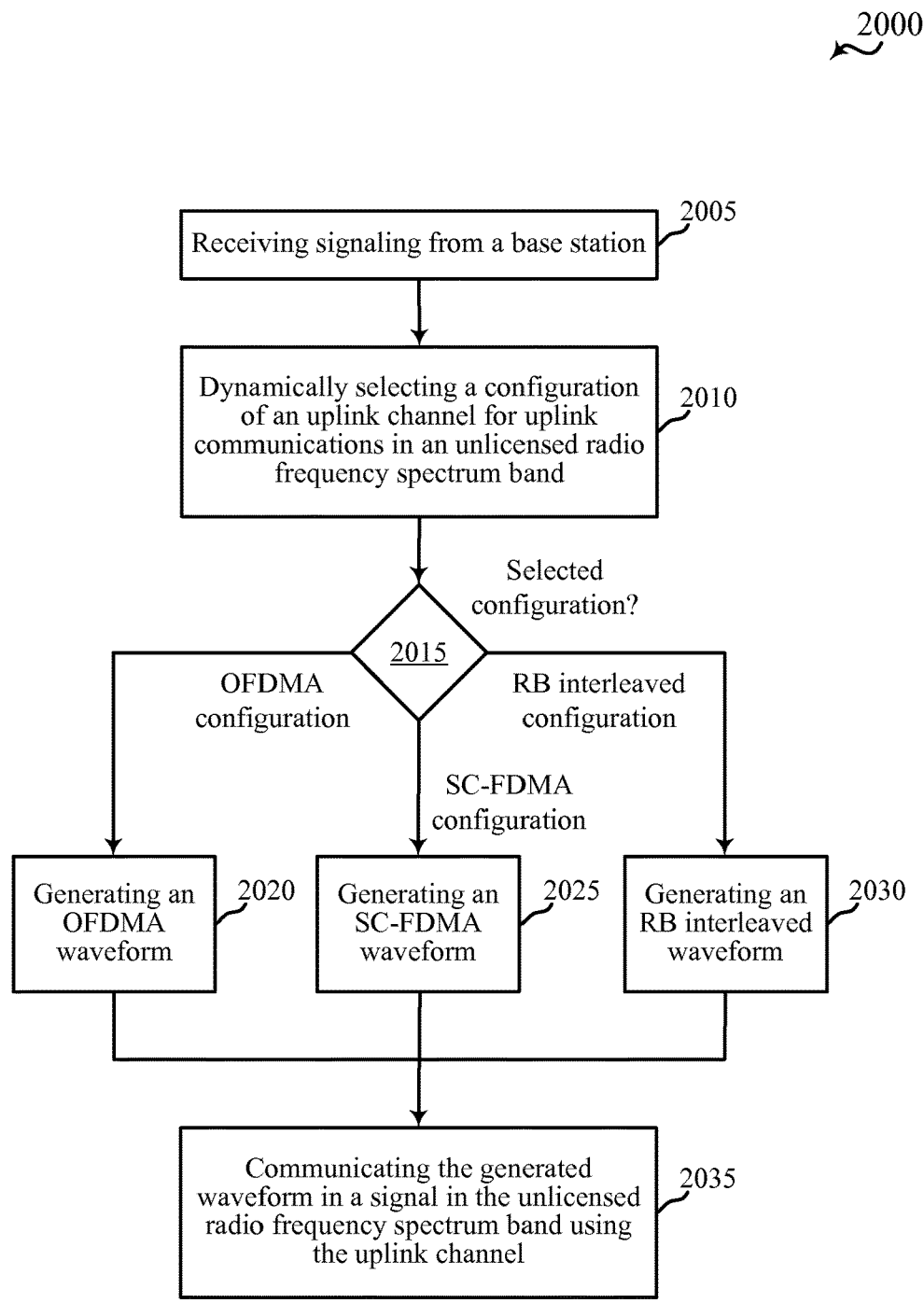
FIG. 20 is a flowchart illustrating an example of a method of wireless communication, in accordance with various aspects of the present disclosure.

FIG. 20 is a flowchart illustrating an example of a method 2000 of wireless communication, in accordance with various aspects of the present disclosure. For clarity, the method 2000 is described below with reference to aspects of one or more of the UEs 115, 215, and/or 1815 described with reference to FIGS. 1, 2A, 2B, and/or 18, and/or aspects of one or more of the apparatuses 1115 and/or 1215 described with reference to FIGS. 11 and/or 12. In some examples, a UE such as one of the UEs 115, 215, or 1815 or an apparatus such as one of the apparatuses 1115 or 1215 may execute one or more sets of codes to control the functional elements of the UE or apparatus to perform the functions described below.

At block 2005, the method 2000 may include receiving signaling from a base station (e.g., an eNB). The signaling may, in some examples, indicate a resource block allocation. In some examples, the signaling may be received over a downlink channel in a licensed radio frequency spectrum band (e.g., an LTE/LTE-A radio frequency spectrum band usable for LTE/LTE-A communications) or over a downlink channel in an unlicensed radio frequency spectrum band (e.g., a shared radio frequency spectrum band usable for Wi-Fi and/or LTE/LTE-A communications). In some examples, the signaling may include Layer 1 signaling (e.g., ePDCCH or PDCCH based signaling) and/or Layer 2 signaling (e.g., MAC header based signaling). The signaling may, in some examples, ask a UE or apparatus performing the method 2000 to dynamically or semi-statically select a configuration of the uplink channel based at least in part on the received signaling.

The operation(s) at block 2005 may be performed using the receiver module 1110 and/or 1210 described with reference to FIGS. 11 and/or 12, the transceiver module(s) 1870 described with reference to FIG. 18, and/or the wireless communication management module 1120, 1220, and/or the communication management module 1860 described with reference to FIGS. 11, 12, and/or 18.

At block 2010, the method 2000 may include dynamically selecting a configuration of an uplink channel for uplink communications (e.g., LTE/LTE-A uplink communications) in the unlicensed radio frequency spectrum band. The selection may be based at least in part on the signaling received at block 2005. In some examples, the configuration of the uplink channel may be selected from among an OFDMA configuration, an SC-FDMA configuration, and/or a resource block interleaved FDMA configuration. When the received signaling indicates a resource block allocation, the configuration of the uplink channel may, in some examples, be selected based on the resource block allocation.

In some examples, the uplink channel for which the configuration is selected may include a PUSCH, a PUCCH, or a PRACH. In some examples, the uplink channel may include a UL-MIMO channel. When the channel includes a PRACH, the PRACH may be transmitted on one or more pre-allocated interlaces, where an interlace is defined as a plurality of non-contiguous resource blocks. The non-contiguous resource blocks may be selected in such a manner that the resource blocks span at least 80% of the available bandwidth of the unlicensed radio frequency spectrum.

At block 2015, the flow of the method 2000 may be altered based on the selected configuration. For example, when the selected configuration is an OFDMA configuration, the flow of the method 2000 may be directed to block 2020. When the selected configuration is an SC-FDMA configuration, the flow of the method 2000 may be directed to block 2025. When the selected configuration is a resource block interleaved FDMA configuration, the flow of the method 2000 may be directed to block 2030.

The operation(s) at block 2010 and/or block 2015 may be performed using the wireless communication management module 1120, 1220, and/or the communication management module 1860 described with reference to FIGS. 11, 12, and/or 18, and/or the uplink channel configuration selector module 1240 described with reference to FIG. 12.

At block 2020, 2025, and/or 2030, the method 2000 may include generating a waveform based on the selected configuration. When the selected configuration is an OFDMA configuration, the waveform generated at block 2020 may be an OFDMA waveform. When the selected configuration is an SC-FDMA configuration, the waveform generated at block 2025 may be an SC-FDMA waveform. When the selected configuration is a resource block interleaved FDMA configuration, the waveform generated at block 2030 may be a resource block interleaved FDMA waveform. The operation(s) at block 2020, 2025, and/or 2030 may be performed using the wireless communication management module 1120, 1220, and/or the communication management module 1860 described with reference to FIGS. 11, 12, and/or 18, and/or the waveform generator module 1245 described with reference to FIG. 12.

At block 2035, the method 2000 may include communicating (e.g., transmitting) the generated waveform in a signal in the unlicensed radio frequency spectrum band using the uplink channel. The operation(s) at block 2035 may be performed using the wireless communication management module 1120, 1220, and/or the communication management module 1860 described with reference to FIGS. 11, 12, and/or 18, the waveform communication module 1250 described with reference to FIG. 12, the transmitter module 1130 and/or 1230 described with reference to FIGS. 11 and/or 12, the unlicensed radio frequency spectrum band transmitter module 1234 described with reference to FIG. 12, and/or the transceiver module(s) 1870 described with reference to FIG. 18.

In some examples, a UE or apparatus performing the method 2000 may communicate the configuration it selects to a base station. In other cases, the base station may blindly detect which configuration the UE or apparatus selected (e.g., based on a waveform received from the UE or apparatus over the unlicensed radio frequency spectrum band).

Thus, the method 2000 may provide for wireless communication. It should be noted that the method 2000 is just one implementation and that the operations of the method 2000 may be rearranged or otherwise modified such that other implementations are possible. In an alternative to the method 2000, a UE may or may not receive signaling from a base station and may autonomously select a configuration of the uplink channel.

Figure 21:
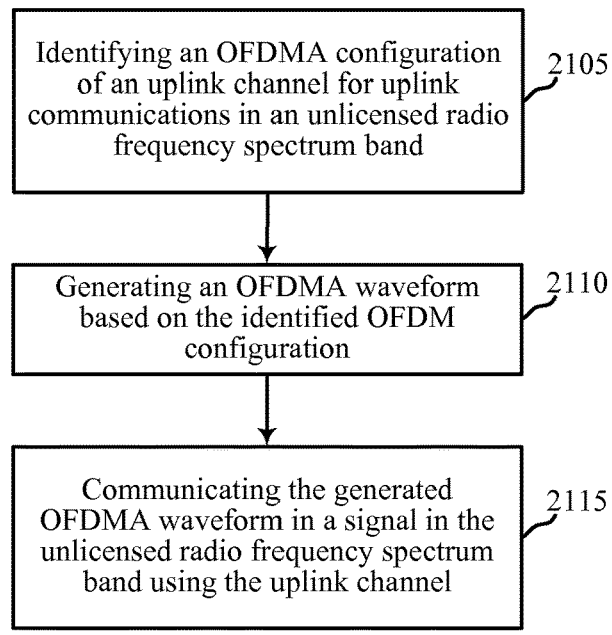
FIG. 21 is a flowchart illustrating an example of a method of wireless communication, in accordance with various aspects of the present disclosure.

FIG. 21 is a flowchart illustrating an example of a method 2100 of wireless communication, in accordance with various aspects of the present disclosure. For clarity, the method 2100 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2105, the method 2100 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). The operation(s) at block 2105 may be performed using the wireless communication management module 1120, 1220, 1320, 1420, and/or the communication management module 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

In some examples, the uplink channel for which the configuration is identified may include a PUSCH, a PUCCH, or a PRACH. In some examples, the uplink channel may include a UL-MIMO channel. When the channel includes a PRACH, the PRACH may be transmitted on one or more pre-allocated interlaces.

At block 2110, the method 2100 may include generating an OFDMA waveform based on the identified OFDMA configuration. The operation(s) at block 2110 may be performed using the wireless communication management module 1120, 1220, 1320, 1420, and/or the communication management module 1860 described with reference to FIGS. 11, 12, 13, 14, and/or 18, and/or the waveform generator module 1245, 1345, and/or 1445 described with reference to FIGS. 12, 13, and/or 14.

At block 2115, the method 2100 may include communicating (e.g., transmitting) the generated OFDMA waveform in a signal in the unlicensed radio frequency spectrum band using the uplink channel. The operation(s) at block 2115 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18.

Thus, the method 2100 may provide for wireless communication. It should be noted that the method 2100 is just one implementation and that the operations of the method 2100 may be rearranged or otherwise modified such that other implementations are possible.

Figure 22:
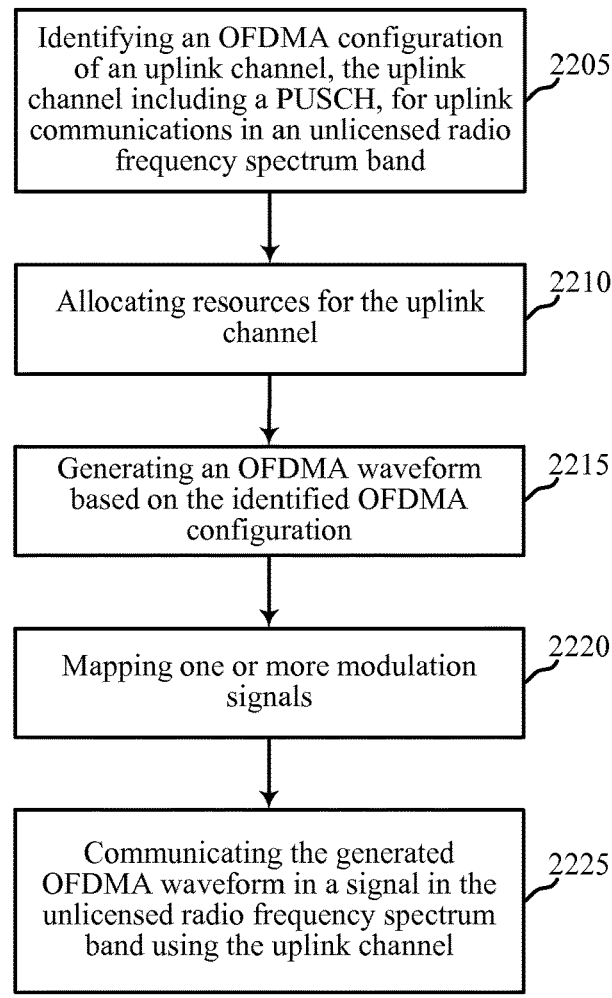
FIG. 22 is a flowchart illustrating an example of a method of wireless communication, in accordance with various aspects of the present disclosure.

FIG. 22 is a flowchart illustrating an example of a method 2200 of wireless communication, in accordance with various aspects of the present disclosure. For clarity, the method 2200 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2205, the method 2200 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). The uplink channel may include a PUSCH. In some examples, the uplink channel may include a UL-MIMO channel. The operation(s) at block 2205 may be performed using the wireless communication management module 1120, 1220, 1320, 1420, and/or the communication management module 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

At block 2210, the method 2200 may include allocating resources for the uplink channel. In some examples, the allocation of resources may be based at least in part on a bitmap, and may include, for example, Type 0 and Type 1 resource blocks. Also or alternately, the allocation of resources may be based at least in part on a starting resource block and a number of resource blocks (e.g., the allocation of resources may be resource indication value (RIV) based with Type 2 localized or Modified Type 2 distributed resource blocks). The operation(s) at block 2210 may be performed using the wireless communication management module 1120, 1220, 1320, 1420, and/or the communication management module 1860 described with reference to FIGS. 11, 12, 13, 14, and/or 18, and/or the data channel module 1460 and/or the resource allocation module 1462 described with reference to FIG. 14.

At block 2215, the method 2200 may include generating an OFDMA waveform based on the identified configuration. The operation(s) at block 2215 may be performed using the wireless communication management module 1120, 1220, 1320, 1420, and/or 1860 described with reference to FIGS. 11, 12, 13, 14, and/or 18, and/or the waveform generator module 1245, 1345, and/or 1445 described with reference to FIGS. 12, 13, and/or 14.

In some examples, the method 2200 may include using PRB bundling and/or precoder cycling when generating the OFDMA waveform. The PRB bundling may be grant specific (e.g., all physical resource blocks in a transmission for a PUSCH may be bundled). The precoder cycling may include cycling through a pre-defined set of precoders. A precoder used for the precoder cycling may be indicated by a base station as part of an uplink grant. The operation(s) at block 2220 may be performed using the wireless communication management module 1120, 1220, 1320, 1420, and/or the communication management module 1860 described with reference to FIGS. 11, 12, 13, 14, and/or 18, and/or the data channel module 1460, the PRB bundling module 1464, and/or the precoder cycling module 1466 described with reference to FIG. 14.

At block 2220, the method 2200 may include mapping one or more modulation symbols. In some examples, the modulation symbols may be mapped to one or more resource elements according to one or more OFDM symbol positions. In the same or other cases, the modulation symbols may be mapped to one or more resource elements according to one or more frequency sub-carriers. The modulation symbols may also or alternately be mapped to one or more resource elements according to an interleaving of time slots and frequency sub-carriers. The operation(s) at block 2220 may be performed using the wireless communication management module 1120, 1220, 1320, 1420, and/or the communication management module 1860 described with reference to FIGS. 11, 12, 13, 14, and/or 18, and/or the data channel module 1460 and/or the symbol mapping module 1468 described with reference to FIG. 14.

At block 2225, the method 2200 may include communicating (e.g., transmitting) the generated OFDMA waveform in a signal in the unlicensed radio frequency spectrum band using the uplink channel. The operation(s) at block 2225 may be performed using the wireless communication management module 1120, 1220, 1320, 1420, and/or the communication management module 1860 described with reference to FIGS. 11, 12, 13, 14, and/or 18, the transmitter module 1130, 1230, 1330, and/or 1430 described with reference to FIGS. 11, 12, 13, and/or 14, the waveform communication module 1250 described with reference to FIG. 12, the unlicensed radio frequency spectrum band transmitter module 1234 and/or 1434 described with reference to FIGS. 12 and/or 14, and/or the transceiver module(s) 1870 described with reference to FIG. 18.

In some examples, the method 2200 may include using one or more techniques to reduce symbol power. For example, the method 2200 may include applying symbol permutation or phase rotation to reduce a metric indicating symbol power when generating the OFDMA waveform. The method 2200 may also, or alternately, include applying different scrambling sequences to the OFDMA waveform, and selecting one of the scrambling sequences for use when communicating the generated OFDMA waveform in the signal in the unlicensed radio frequency spectrum band.

The technique(s) to reduce symbol power may be performed using the wireless communication management module 1120, 1220, 1320, 1420, and/or the communication management module 1860 described with reference to FIGS. 11, 12, 13, 14, and/or 18, and/or the data channel module 1460 and/or the symbol power reduction module 1470 described with reference to FIG. 14.

Thus, the method 2200 may provide for wireless communication. It should be noted that the method 2200 is just one implementation and that the operations of the method 2200 may be rearranged or otherwise modified such that other implementations are possible.

Figure 23:
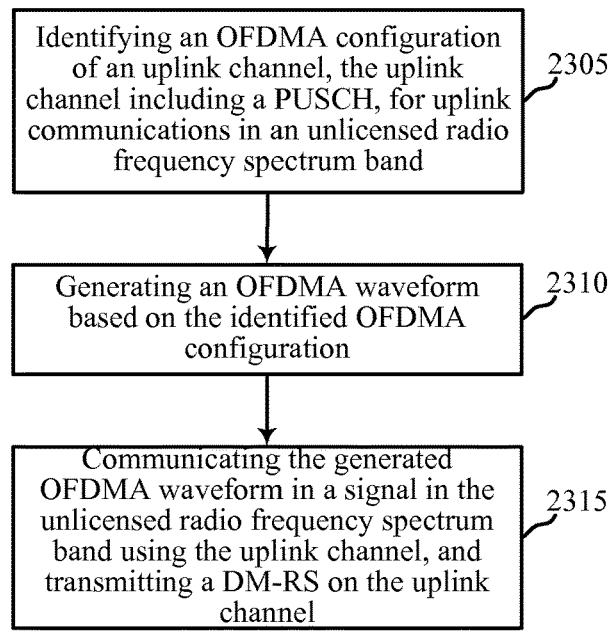
FIG. 23 is a flowchart illustrating an example of a method of wireless communication, in accordance with various aspects of the present disclosure.

FIG. 23 is a flowchart illustrating an example of a method 2300 of wireless communication, in accordance with various aspects of the present disclosure. For clarity, the method 2300 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2305, the method 2300 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). In some examples, the uplink channel for which the configuration is identified may include a PUSCH. In some examples, the uplink channel may include a UL-MIMO channel. The operation(s) at block 2305 may be performed using the wireless communication management module 1120, 1220, 1320, 1420, and/or 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

At block 2310, the method 2300 may include generating an OFDMA waveform based on the identified configuration. The operation(s) at block 2310 may be performed using the wireless communication management module 1120, 1220, 1320, 1420, and/or 1860 described with reference to FIGS. 11, 12, 13, 14, and/or 18, and/or the waveform generator module 1245, 1345, and/or 1445 described with reference to FIGS. 12, 13, and/or 14.

At block 2315, the method 2300 may include communicating (e.g., transmitting) the generated OFDMA waveform in a signal in the unlicensed radio frequency spectrum band using the uplink channel. The operation(s) at block 2315 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18.

The method 2300 may also include transmitting a DM-RS on the uplink channel, in a set of one or more time slots and one or more frequency sub-carriers. The DM-RS may be transmitted in conjunction with communicating the generated OFDMA waveform at block 2315.

In some examples, the set of one or more time slots and one or more frequency sub-carriers in which the DM-RS is transmitted may be the same as a set of one or more time slots and one or more frequency sub-carriers used to receive a UE-RS on a downlink channel (e.g., as described with reference to FIG. 5 and FIG. 6). In other cases, the set of one or more time slots and one or more frequency sub-carriers in which the DM-RS is transmitted may differ in at least one respect from a set of one or more time slots and one or more frequency sub-carriers used to receive a UE-RS on a downlink channel (e.g., as described with reference to FIG. 5 and FIG. 7). The downlink channel may be a downlink channel used for downlink communications (e.g., LTE/LTE-A downlink communications) in a licensed radio frequency spectrum band (e.g., an LTE/LTE-A radio frequency spectrum band usable for LTE/LTE-A communications) or the unlicensed radio frequency spectrum band.

The DM-RS transmission may be performed using the wireless communication management module 1120, 1220, 1320, 1420, and/or the communication management module 1860 described with reference to FIGS. 11, 12, 13, 14, and/or 18, the transmitter module 1130, 1230, 1330, and/or 1430 described with reference to FIGS. 11, 12, 13, and/or 14, the data channel module 1460 and/or the DM-RS module 1472 described with reference to FIG. 14, the unlicensed radio frequency spectrum band transmitter module 1234 and/or 1434 described with reference to FIGS. 12 and/or 14, and/or the transceiver module(s) 1870 described with reference to FIG. 18.

Thus, the method 2300 may provide for wireless communication. It should be noted that the method 2300 is just one implementation and that the operations of the method 2300 may be rearranged or otherwise modified such that other implementations are possible.

Figure 24:
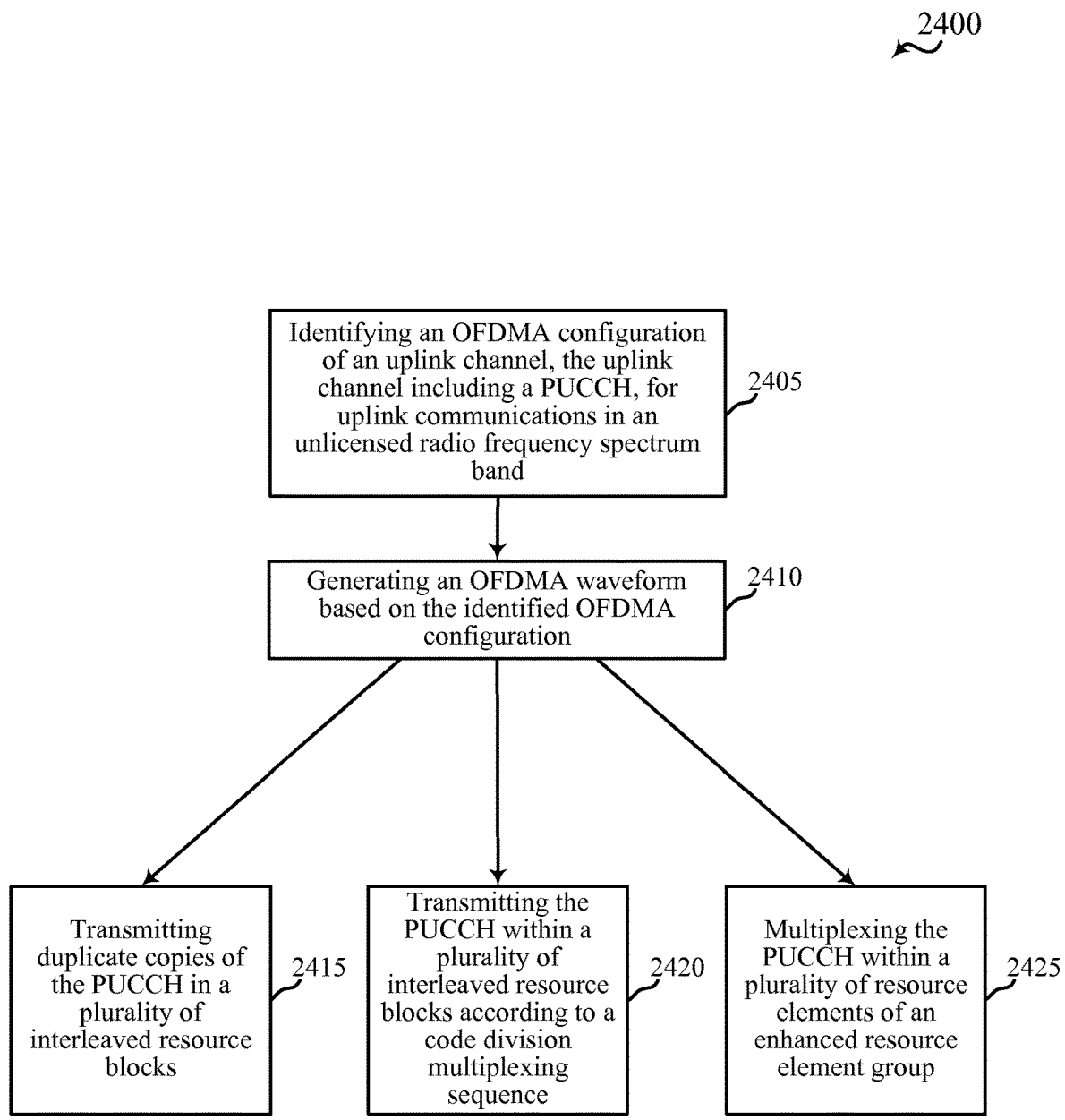
FIG. 24 is a flowchart illustrating an example of a method of wireless communication, in accordance with various aspects of the present disclosure.

FIG. 24 is a flowchart illustrating an example of a method 2400 of wireless communication, in accordance with various aspects of the present disclosure. For clarity, the method 2400 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2405, the method 2400 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). In some examples, the uplink channel for which the configuration is identified may include a PUCCH. In some examples, the uplink channel may include a UL-MIMO channel. The operation(s) at block 2405 may be performed using the wireless communication management module 1120, 1220, 1320, 1420, and/or the communication management module 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

At block 2410, the method 2400 may include generating an OFDMA waveform based on the identified configuration. The operation(s) at block 2410 may be performed using the wireless communication management module 1120, 1220, 1320, 1420, and/or the communication management module 1860 described with reference to FIGS. 11, 12, 13, 14, and/or 18, and/or the waveform generator module 1245, 1345, and/or 1445 described with reference to FIGS. 12, 13, and/or 14.

Following the operation(s) at block 2410, the method 2400 may perform the operation(s) included in one or more of blocks 2415, 2420, and/or 2425. At each of blocks 2415, 2420, and 2425, the method 2400 may include communicating (e.g., transmitting) the generated OFDMA waveform in a signal in the unlicensed radio frequency spectrum band using the uplink channel.

At block 2415, the method 2400 may include transmitting duplicate copies of the PUCCH in a plurality of interleaved resource blocks, as described, for example, with reference to FIG. 8A. At block 2420, the method 2400 may include transmitting the PUCCH within a plurality of interleaved resource blocks according to a code division multiplexing sequence or other orthogonal sequence, as also described, for example, with reference to FIG. 8A. At block 2425, the method 2400 may include multiplexing the PUCCH within a plurality of resource elements of an enhanced resource element group, as described, for example, with reference to FIG. 8B.

The operation(s) at block 2415, 2420, and/or 2425 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the control channel module 1480 described with reference to FIG. 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18.

Thus, the method 2400 may provide for wireless communication. It should be noted that the method 2400 is just one implementation and that the operations of the method 2400 may be rearranged or otherwise modified such that other implementations are possible.

Figure 25:
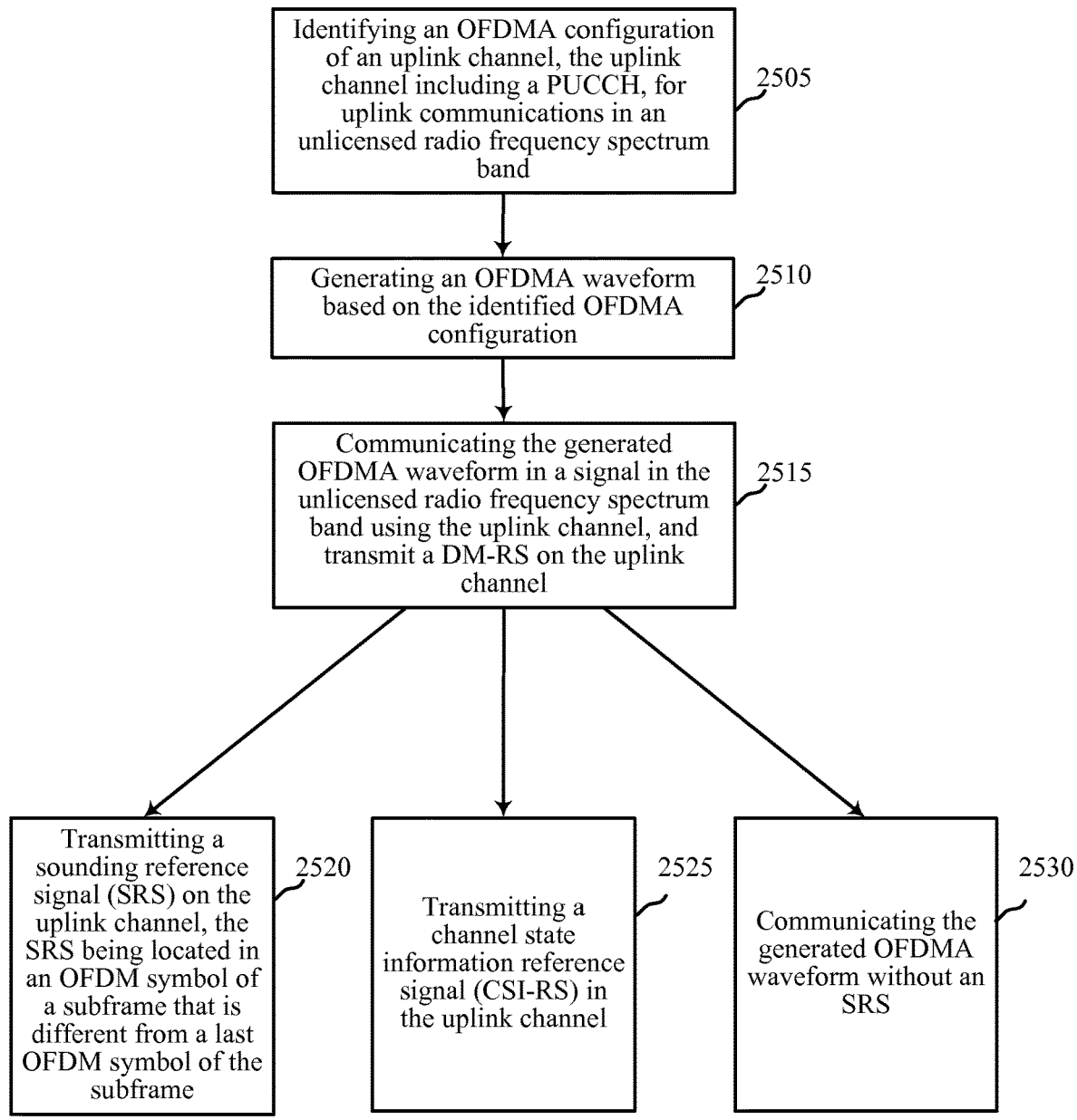
FIG. 25 is a flowchart illustrating an example of a method of wireless communication, in accordance with various aspects of the present disclosure.

FIG. 25 is a flowchart illustrating an example of a method 2500 of wireless communication, in accordance with various aspects of the present disclosure. For clarity, the method 2500 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2505, the method 2500 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). In some examples, the uplink channel for which the configuration is identified may include a PUCCH. In some examples, the uplink channel may include a UL-MIMO channel. The operation(s) at block 2505 may be performed using the wireless communication management module 1120, 1220, 1320, 1420, and/or the communication management module 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

At block 2510, the method 2500 may include generating an OFDMA waveform based on the identified configuration. The operation(s) at block 2510 may be performed using the wireless communication management module 1120, 1220, 1320, 1420, and/or 1860 described with reference to FIGS. 11, 12, 13, 14, and/or 18, and/or the waveform generator module 1245, 1345, and/or 1445 described with reference to FIGS. 12, 13, and/or 14.

At block 2515, the method 2500 may include communicating (e.g., transmitting) the generated OFDMA waveform in a signal in the unlicensed radio frequency spectrum band using the uplink channel. The operation(s) at block 2515 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18.

In conjunction with communicating the generated OFDMA waveform at block 2515, the method 2500 may perform the operation(s) included in one or more of blocks 2520, 2525, and/or 2530.

At block 2520, the method 2500 may include transmitting an SRS on the uplink channel. The SRS may be located in an OFDM symbol of a subframe that is different from a last OFDM symbol of the subframe, as described, for example, with reference to FIG. 4. In other cases, the SRS may be located in the last OFDM symbol of the subframe. The SRS may, in some examples, be configured similarly to how SRS is configured for an LTE/LTE-A uplink channel in a licensed radio frequency spectrum band (e.g., the SRS may be Zadoff-Chu (ZC) sequence based).

At block 2525, the method 2500 may include transmitting a CSI-RS on the uplink channel. The CSI-RS may, in some examples, be transmitted independent of an allocation of resources and on all resource blocks. In some examples, the CSI-RS may be transmitted depending on a resource allocation. The CSI-RS may be wideband and include N tones per resource block. The symbols used for CSI-RS may be pre-defined or defined through control channel (e.g., PUCCH) or radio resource control (RRC) signaling. A rate matching required for a PUSCH and a PUCCH, to accommodate transmission of the CSI-RS, may be indicated to other UEs or apparatuses that are frequency multiplexed on a same uplink subframe of the uplink channel. The method 2500 may also include transmitting a channel state information interference measurement (CSI-IM) on the uplink channel.

At block 2530, the generated OFDMA waveform may be communicated without an SRS in the signal in the unlicensed radio frequency spectrum band using the uplink channel.

The operation(s) at block 2520, 2525, and/or 2530 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18. The operation(s) at block 2520 may also be perfumed using the SRS module 1485 described with reference to FIG. 14. The operation(s) at block 2525 may also be performed using the CSI-RS module 1490 described with reference to FIG. 14.

Thus, the method 2500 may provide for wireless communication. It should be noted that the method 2500 is just one implementation and that the operations of the method 2500 may be rearranged or otherwise modified such that other implementations are possible.

Figure 26:
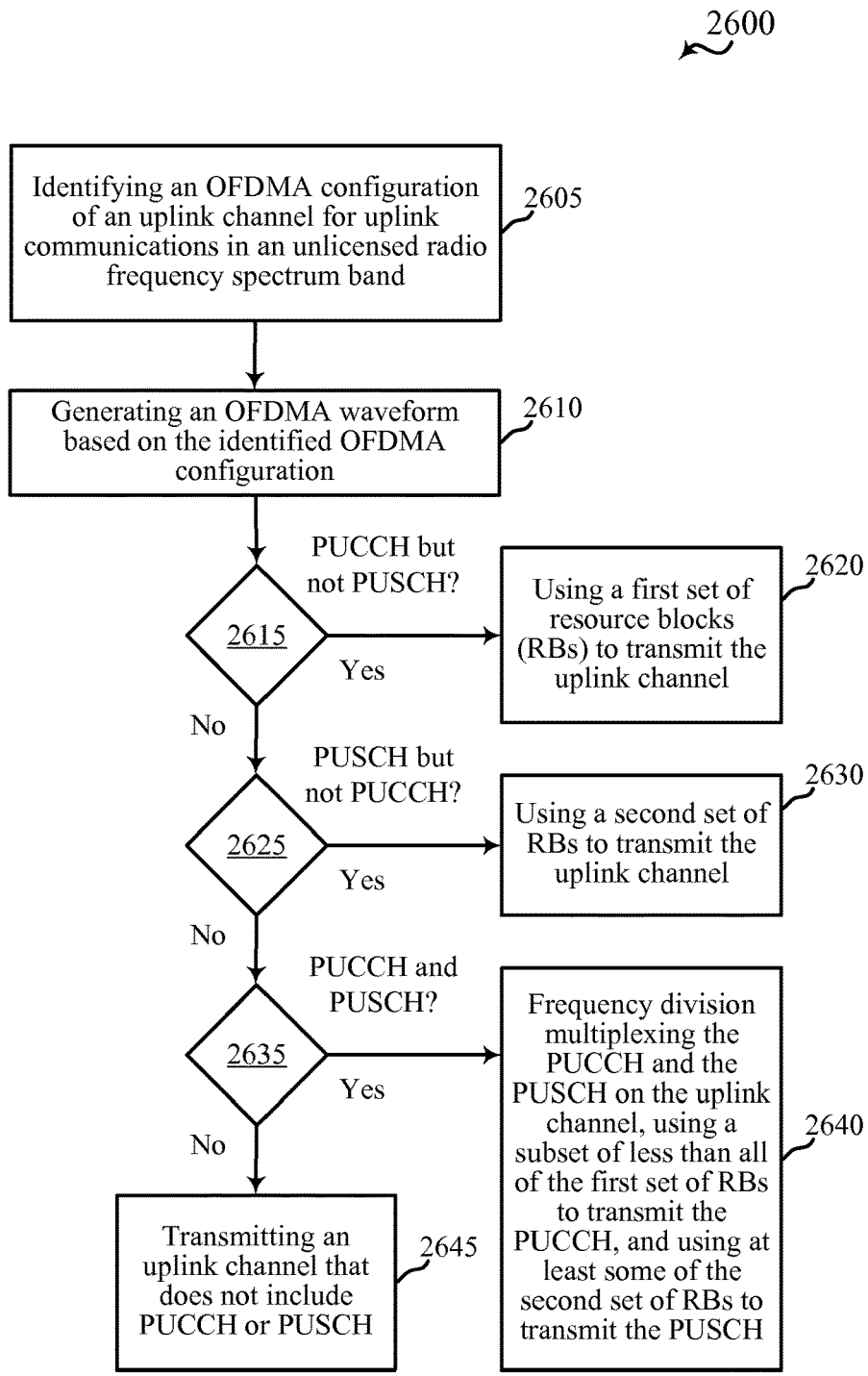
FIG. 26 is a flowchart illustrating an example of a method of wireless communication, in accordance with various aspects of the present disclosure.

FIG. 26 is a flowchart illustrating an example of a method 2600 of wireless communication, in accordance with various aspects of the present disclosure. For clarity, the method 2600 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2605, the method 2600 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). The operation(s) at block 2605 may be performed using the wireless communication management module 1120, 1220, 1320, 1420, and/or the communication management module 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

In some examples, the uplink channel for which the configuration is identified may include a PUSCH and/or a PUCCH. In some examples, the uplink channel may include a UL-MIMO channel.

At block 2610, the method 2600 may include generating an OFDMA waveform based on the identified configuration. The operation(s) at block 2610 may be performed using the wireless communication management module 1120, 1220, 1320, 1420, and/or the communication management module 1860 described with reference to FIGS. 11, 12, 13, 14, and/or 18, and/or the waveform generator module 1245, 1345, and/or 1445 described with reference to FIGS. 12, 13, and/or 14.

At blocks 2615, 2620, 2625, 2630, 2635, 2640, and/or 2645, the method 2600 may include communicating (e.g., transmitting) the generated OFDMA waveform in a signal in the unlicensed radio frequency spectrum band using the uplink channel.

At block 2615, the method 2600 may include determining whether the uplink channel includes a PUCCH but not a PUSCH. If so, the method 2600 may include using a first set of resource blocks to transmit the uplink channel at block 2620. Otherwise, the method 2600 may proceed to block 2625.

At block 2625, the method 2600 may include determining whether the uplink channel includes the PUSCH but not the PUCCH. If so, the method 2600 may include using a second set of resource blocks to transmit the uplink channel at block 2630. Otherwise, the method 2600 may proceed to block 2635.

At block 2635, the method 2600 may include determining whether the uplink channel includes the PUCCH and the PUSCH. If so, the method 2600 may include frequency division multiplexing the PUCCH and the PUSCH on the uplink channel at block 2640. When frequency division multiplexing the PUCCH and the PUSCH on the uplink channel, a subset of less than all of the first set of resource blocks may be used to transmit the PUCCH, and at least some of the second set of resource blocks may be used to transmit the PUSCH, as described, for example, with reference to FIG. 10.

When it is determined at block 2635 that the uplink channel does not include PUCCH or PUSCH, the method 2600 may include transmitting an uplink channel that does not include PUCCH or PUSCH at block 2645.

The operation(s) at block 2615, 2620, 2625, 2630, 2635, 2640, and/or 2645 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the data channel module 1460, the control channel module 1480, and/or the control and data multiplexing module 1495 described with reference to FIG. 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18.

Thus, the method 2600 may provide for wireless communication. It should be noted that the method 2600 is just one implementation and that the operations of the method 2600 may be rearranged or otherwise modified such that other implementations are possible.

Figure 27:
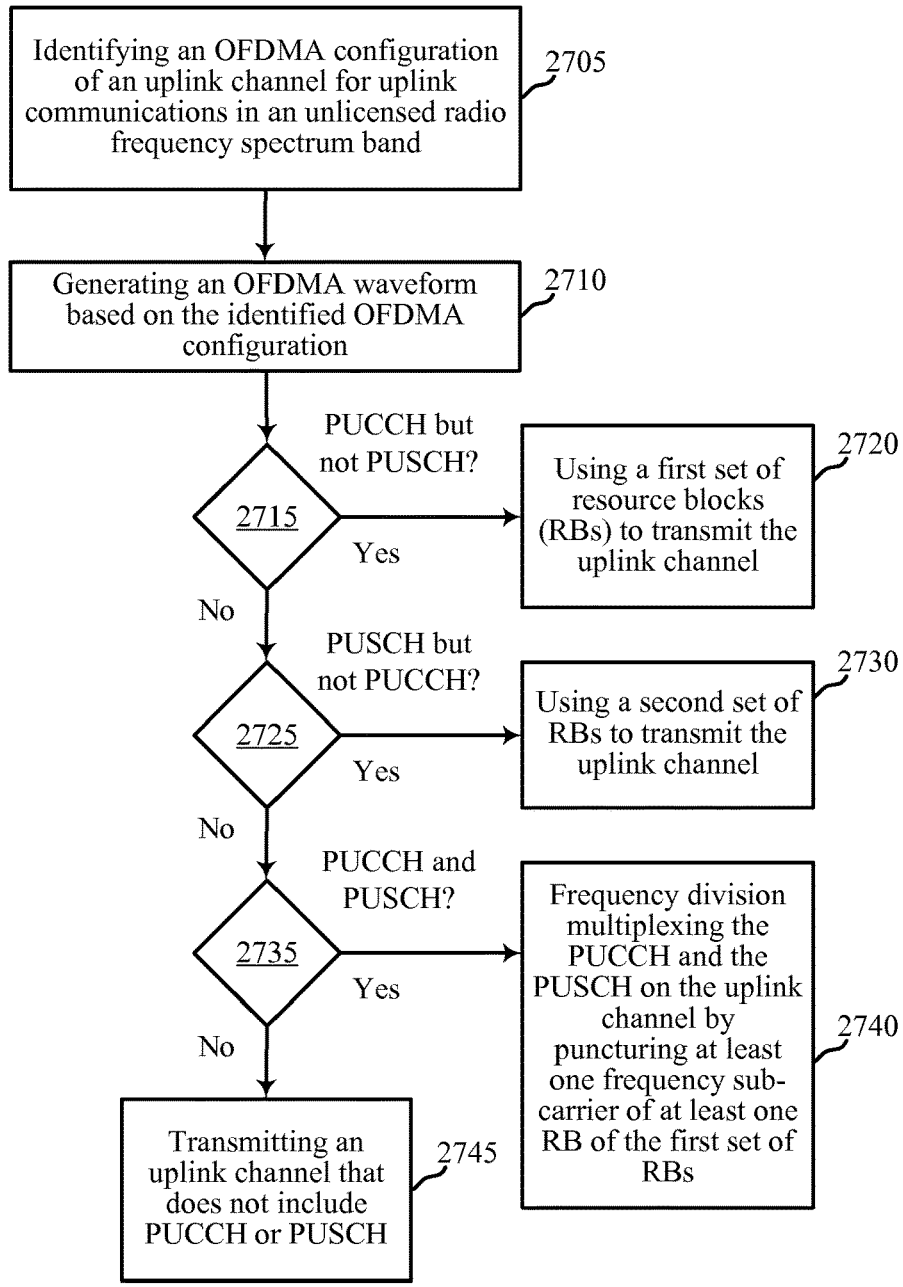
FIG. 27 is a flowchart illustrating an example of a method of wireless communication, in accordance with various aspects of the present disclosure.

FIG. 27 is a flowchart illustrating an example of a method 2700 of wireless communication, in accordance with various aspects of the present disclosure. For clarity, the method 2700 is described below with reference to aspects of one or more of the UEs 115, 215, and/or 1815 described with reference to FIGS. 1, 2A, 2B, and/or 18, and/or aspects of one or more of the apparatuses 1115, 1215, 1315, and/or 1415 described with reference to FIGS. 11, 12, 13, and/or 14. In some examples, a UE such as one of the UEs 115, 215, or 1815 or an apparatus such as one of the apparatuses 1115, 1215, 1315, or 1415 may execute one or more sets of codes to control the functional elements of the UE or apparatus to perform the functions described below.

At block 2705, the method 2700 may include identifying an OFDMA configuration of an uplink channel for uplink communications (e.g., LTE/LTE-A uplink communications) in an unlicensed radio frequency spectrum band (e.g., a shared radio frequency spectrum band usable for Wi-Fi and/or LTE/LTE-A communications). The operation(s) at block 2705 may be performed using the wireless communication management module 1120, 1220, 1320, 1420, and/or the communication management module 1860 described with reference to FIGS. 11, 12, 13, 14, and/or 18, the uplink channel configuration selector module 1240 described with reference to FIG. 12, and/or the uplink channel configuration identifier module 1340 and/or 1440 described with reference to FIGS. 13 and/or 14.

In some examples, the uplink channel for which the configuration is identified may include a PUSCH and/or a PUCCH. In some examples, the uplink channel may include a UL-MIMO channel.

At block 2710, the method 2700 may include generating an OFDMA waveform based on the identified configuration. The operation(s) at block 2710 may be performed using the wireless communication management module 1120, 1220, 1320, 1420, and/or the communication management module 1860 described with reference to FIGS. 11, 12, 13, 14, and/or 18, and/or the waveform generator module 1245, 1345, and/or 1445 described with reference to FIGS. 12, 13, and/or 14.

At blocks 2715, 2720, 2725, 2730, 2735, 2740, and/or 2745, the method 2700 may include communicating (e.g., transmitting) the generated OFDMA waveform in a signal in the unlicensed radio frequency spectrum band using the uplink channel.

At block 2715, the method 2700 may include determining whether the uplink channel includes a PUCCH but not a PUSCH. If so, the method 2700 may include using a first set of resource blocks to transmit the uplink channel at block 2720. Otherwise, the method 2700 may proceed to block 2725.

At block 2725, the method 2700 may include determining whether the uplink channel includes the PUSCH but not the PUCCH. If so, the method 2700 may include using a second set of resource blocks to transmit the uplink channel at block 2730. Otherwise, the method 2700 may proceed to block 2735.

At block 2735, the method 2700 may include determining whether the uplink channel includes the PUCCH and the PUSCH. If so, the method 2700 may include frequency division multiplexing the PUCCH and the PUSCH by puncturing at least one frequency sub-carrier of at least one resource block of the first set of resource blocks, at block 2740, to transmit at least part of the PUSCH.

When it is determined at block 2735 that the uplink channel does not include PUCCH or PUSCH, the method 2700 may include transmitting an uplink channel that does not include PUCCH or PUSCH.

The operation(s) at block 2715, 2720, 2725, 2730, 2735, 2740, and/or 2745 may be performed using the wireless communication management module 1120, 1220, 1320, 1420, and/or the communication management module 1860 described with reference to FIGS. 11, 12, 13, 14, and/or 18, the waveform communication module 1250, 1350, and/or 1450 described with reference to FIGS. 12, 13, and/or 14, the data channel module 1460, the control channel module 1480, and/or the control and data multiplexing module 1495 described with reference to FIG. 14, the transmitter module 1130, 1230, 1330, and/or 1430 described with reference to FIGS. 11, 12, 13, and/or 14, the unlicensed radio frequency spectrum band transmitter module 1234 and/or 1434 described with reference to FIGS. 12 and/or 14, and/or the transceiver module(s) 1870 described with reference to FIG. 18.

Thus, the method 2700 may provide for wireless communication. It should be noted that the method 2700 is just one implementation and that the operations of the method 2700 may be rearranged or otherwise modified such that other implementations are possible.

When transmitting a PUCCH on an uplink channel for uplink communications in an unlicensed radio frequency spectrum band, as described, for example, with reference to FIGS. 24, 26, and/or 27, acknowledgements pertaining to a PDSCH may be transmitted as part of the PUCCH. When transmitting a PUSCH on an uplink channel for uplink communications in an unlicensed radio frequency spectrum band, as described, for example, with reference to FIGS. 22, 23, 26, and/or 27, CQI pertaining to a PDSCH may be transmitted as part of the PUSCH. In cases where a PUCCH and a PUSCH are frequency division multiplexed on an uplink channel, acknowledgements pertaining to a PDSCH may be transmitted as part of the PUCCH, and CQI for the PDSCH may be transmitted as part of the PUSCH.

Figure 28:
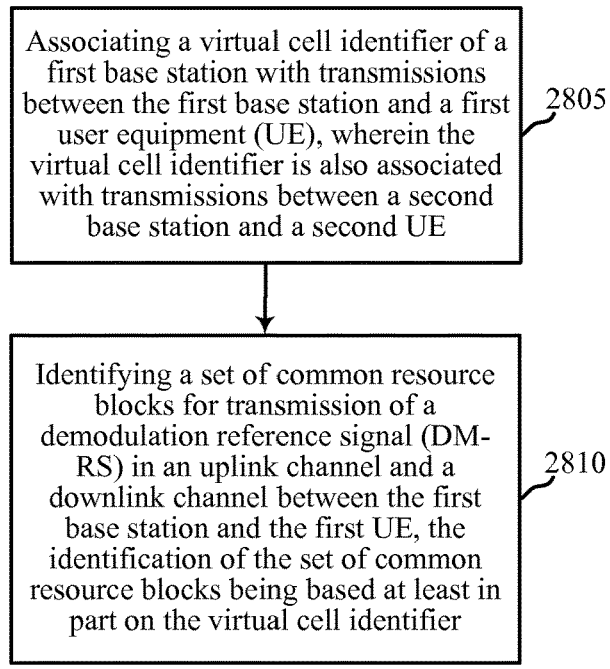
FIG. 28 is a flowchart illustrating an example of a method of wireless communication, in accordance with various aspects of the present disclosure.

FIG. 28 is a flowchart illustrating an example of a method 2800 of wireless communication, in accordance with various aspects of the present disclosure. For clarity, the method 2800 is described below with reference to aspects of one or more of the UEs 115, 215, and/or 1815 described with reference to FIGS. 1, 2A, 2B, and/or 18, aspects of one or more of the base stations 105, 205, and/or 1705 described with reference to FIGS. 1, 2A, 2B, and/or 17, and/or aspects of one or more of the apparatuses 1115, 1515, and/or 1615 described with reference to FIGS. 11, 15, and/or 16. In some examples, a UE such as one of the UEs 115, 215, or 1815, or a base station such as one of the base stations 105, 205, or 1705, or an apparatus such as one of the apparatuses 1115, 1515, or 1615 may execute one or more sets of codes to control the functional elements of the UE, base station, or apparatus to perform the functions described below.

At block 2805, the method 2800 may include associating a virtual cell identifier of a first base station with transmissions between the first base station and a first UE. The virtual cell identifier may also be associated with transmissions between a second base station and a second UE. The transmissions between the first base station and the first UE, and between the second base station and the second UE, may, in some examples, be communications (e.g., LTE/LTE-A communications) in an unlicensed radio frequency spectrum band (e.g., a shared radio frequency spectrum band usable for Wi-Fi and/or LTE/LTE-A communications). The operation(s) at block 2805 may be performed using the wireless communication management module 1120, 1520, 1620, and/or the communication management module 1860 described with reference to FIGS. 11, 15, 16, and/or 18, and/or the virtual cell identifier association module 1540 and/or 1640 described with reference to FIGS. 15 and/or 16.

At block 2810, the method 2800 may include identifying a set of common resource blocks for transmission of a DM-RS in an uplink channel and a downlink channel between the first base station and the first UE. The identification of the set of common resource blocks may be based at least in part on the virtual cell identifier associated with transmissions between the first base station and the first UE at block 2805. The operation(s) at block 2810 may be performed using the wireless communication management module 1120, 1520, 1620, and/or the communication management module 1860 described with reference to FIGS. 11, 15, 16, and/or 18, and/or the common resource block identifier module 1545 and/or 1645 described with reference to FIGS. 15 and/or 16.

The operation(s) at block 2805 and 2810 may be performed by a UE, by a base station, or by another apparatus.

Thus, the method 2800 may provide for wireless communication. It should be noted that the method 2800 is just one implementation and that the operations of the method 2800 may be rearranged or otherwise modified such that other implementations are possible.

Figure 29:
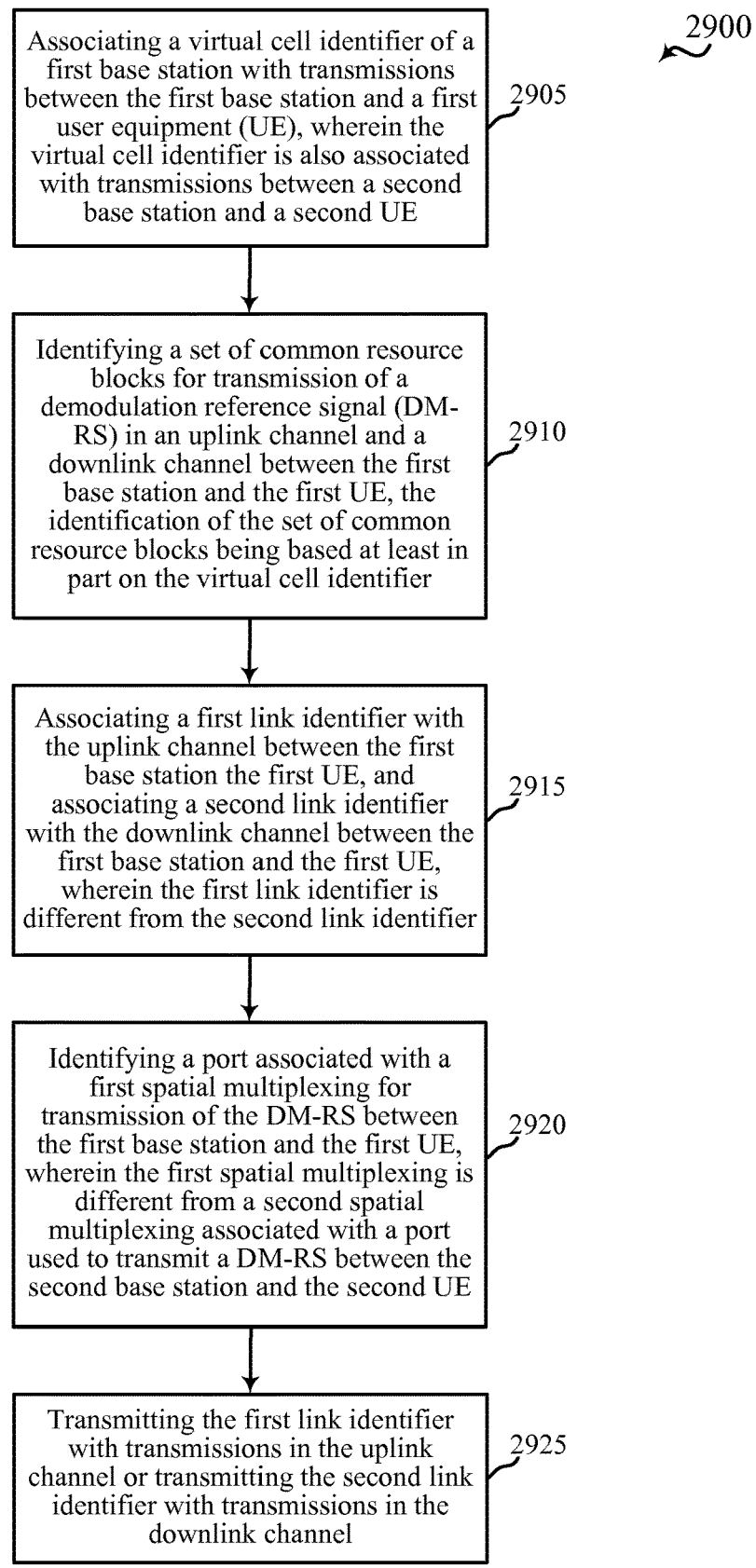
FIG. 29 is a flowchart illustrating an example of a method of wireless communication, in accordance with various aspects of the present disclosure.

FIG. 29 is a flowchart illustrating an example of a method 2900 of wireless communication, in accordance with various aspects of the present disclosure. For clarity, the method 2900 is described below with reference to aspects of one or more of the UEs 115, 215, and/or 1815 described with reference to FIGS. 1, 2A, 2B, and/or 18, aspects of one or more of the base stations 105, 205, and/or 1705 described with reference to FIGS. 1, 2A, 2B, and/or 17, and/or aspects of one or more of the apparatuses 1115, 1515, and/or 1615 described with reference to FIGS. 11, 15, and/or 16. In some examples, a UE such as one of the UEs 115, 215, or 1815, or a base station such as one of the base stations 105, 205, or 1705, or an apparatus such as one of the apparatuses 1115, 1515, or 1615 may execute one or more sets of codes to control the functional elements of the UE, base station, or apparatus to perform the functions described below.

At block 2905, the method 2900 may include associating a virtual cell identifier of a first base station with transmissions between the first base station and a first UE. The virtual cell identifier may also be associated with transmissions between a second base station and a second UE. The transmissions between the first base station and the first, and between the second base station and the second UE, may, in some examples, be communications (e.g., LTE/LTE-A communications) in an unlicensed radio frequency spectrum band (e.g., a shared radio frequency spectrum band usable for Wi-Fi and/or LTE/LTE-A communications). The operation(s) at block 2905 may be performed using the wireless communication management module 1120, 1520, 1620, and/or the communication management module 1860 described with reference to FIGS. 11, 15, 16, and/or 18, and/or the virtual cell identifier association module 1540 and/or 1640 described with reference to FIGS. 15 and/or 16.

At block 2910, the method 2900 may include identifying a set of common resource blocks for transmission of a DM-RS in an uplink channel and a downlink channel between the first base station and the first UE. The identification of the set of common resource blocks may be based at least in part on the virtual cell identifier associated with transmissions between the first base station and the first UE at block 2905. The operation(s) at block 2910 may be performed using the wireless communication management module 1120, 1520, 1620, and/or the communication management module 1860 described with reference to FIGS. 11, 15, 16, and/or 18, and/or the common resource block identifier module 1545 and/or 1645 described with reference to FIGS. 15 and/or 16.

At block 2915, the method 2900 may include associating a first link identifier with the uplink channel between the first base station and the first UE, and associating a second link identifier with the downlink channel between the first base station and the first UE, where the first link identifier is different from the second link identifier. The operation(s) at block 2915 may be performed using the wireless communication management module 1120, 1520, 1620, and/or the communication management module 1860 described with reference to FIGS. 11, 15, 16, and/or 18, and/or the link identifier association module 1650 described with reference to FIG. 16.

At block 2920, the method 2900 may include identifying a port associated with a first spatial multiplexing for transmission of the DM-RS between the first base station and the first UE. The first spatial multiplexing may be different from a second spatial multiplexing associated with a port used to transmit a DM-RS between the second base station and the second UE. The operation(s) at block 2920 may be performed using the wireless communication management module 1120, 1520, 1620, and/or the communication management module 1860 described with reference to FIGS. 11, 15, 16, and/or 18, and/or the DM-RS port identification module 1655 described with reference to FIG. 16.

At block 2925, the method 2900 may include transmitting the first link identifier with transmissions in the uplink channel or transmitting the second link identifier with transmissions in the downlink channel. The transmissions may be made via the identified port. In some examples, transmitting the first link identifier with transmissions in the uplink channel may include generating the DM-RS as a function of the first link identifier. In other cases, transmitting the second link identifier with transmissions in the downlink channel may include generating the DM-RS as a function of the second link identifier.

The operation(s) at block 2925 may be performed using the wireless communication management module 1120, 1520, 1620, and/or the communication management module 1860 described with reference to FIGS. 11, 15, 16, and/or 18, the waveform communication module 1660 described with reference to FIG. 16, the transmitter module 1130, 1530, and/or 1630 described with reference to FIGS. 11, 15, and/or 16, the unlicensed radio frequency spectrum band transmitter module 1534 and/or 1634 described with reference to FIGS. 15 and/or 16, and/or the transceiver module(s) 1870 described with reference to FIG. 18.

The operation(s) at block 2905, 2910, 2915, 2920, and 2925 may be performed by a UE, by a base station, or by another apparatus.

Thus, the method 2900 may provide for wireless communication. It should be noted that the method 2900 is just one implementation and that the operations of the method 2900 may be rearranged or otherwise modified such that other implementations are possible.

In some examples, one or more aspects of the methods 1900, 2000, 2100, 2200, 2300, 2400, 2500, 2600, 2700, 2800, and/or 2900 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
identifying an orthogonal frequency-division multiple access (OFDMA) configuration of an uplink channel for uplink communications based at least in part on an allocation of a plurality of resource blocks, the uplink channel comprising a Physical Uplink Shared Channel (PUSCH), or a Physical Uplink Control Channel (PUCCH), or both;
generating an OFDMA waveform based on the identified OFDMA configuration;
communicating the generated OFDMA waveform in a signal using the uplink channel in the plurality of resource blocks;
transmitting a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
determining allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and
when the uplink channel comprises the PUCCH and the PUSCH, frequency division multiplexing the PUCCH and the PUSCH on the uplink channel, wherein frequency division multiplexing the PUCCH and the PUSCH on the uplink channel comprises:
transmitting the PUCCH using a subset of less than all of the plurality of resource blocks; and
transmitting the PUSCH using at least some of the allocated resources.

2. The method of claim 1, wherein allocating the resources for the PUSCH is for multi-cluster transmission, wherein allocating the resources for the PUSCH is based in part on two or more of the resource blocks assigned to a user equipment.

3. The method of claim 1, further comprising:
mapping one or more modulation symbols to one or more resource elements according to one or more OFDM symbol positions.

4. The method of claim 1, further comprising:
mapping one or more modulation symbols to one or more resource elements according to one or more frequency sub-carriers.

5. The method of claim 1, further comprising:
mapping one or more modulation symbols to one or more resource elements according to an interleaving of time slots and frequency sub-carriers.

6. The method of claim 1, wherein:
the first reference signal comprises a demodulation reference signal (DM-RS) and the second reference signal comprises a user equipment specific reference signal (UE-RS).

7. The method of claim 1, further comprising:
transmitting a third reference signal on the uplink channel in a third set of one or more time slots and one or more third frequency sub-carriers, wherein the third set of one or more time slots and one or more third frequency sub-carriers differs in at least one respect from a fourth set of one or more time slots and one or more fourth frequency sub-carriers used to receive a fourth reference signal on a downlink channel, wherein the first reference signal comprises a first demodulation reference signal (DM-RS), the second reference signal comprises a first user equipment specific reference signal (UE-RS), the third reference signal comprises a second DM-RS different from the first DM-RS, and the fourth reference signal comprises a second UE-RS different from the first UE-RS.

8. The method of claim 1, further comprising:
using physical resource block (PRB) bundling when generating the OFDMA waveform based on the identified OFDMA configuration.

9. The method of claim 1, further comprising:
using precoder cycling when generating the OFDMA waveform based on the identified OFDMA configuration, wherein a precoder is cycled through a pre-defined set of precoders, and wherein the precoder is indicated by a base station as part of an uplink grant.

10. The method of claim 9, wherein the precoder is derived by a UE based at least in part on downlink channel state information reference signal (CSI-RS) transmissions.

11. The method of claim 1, wherein the uplink channel comprises an uplink multiple-input multiple-output (UL-MIMO) channel or a multi-user MIMO (MU-MIMO) channel.

12. The method of claim 1, further comprising:
applying symbol permutation or phase rotation to reduce a metric indicating symbol power when generating the OFDMA waveform based on the identified OFDMA configuration.

13. The method of claim 1, further comprising:
applying different scrambling sequences to the OFDMA waveform; and
selecting one of the scrambling sequences for use when communicating the generated OFDMA waveform in the signal.

14. The method of claim 1, wherein the uplink channel comprises the PUCCH.

15. The method of claim 14, wherein communicating the generated OFDMA waveform using the uplink channel comprises:
transmitting duplicate copies of the PUCCH in a plurality of interleaved resource blocks.

16. The method of claim 14, wherein communicating the generated OFDMA waveform in a signal using the uplink channel comprises:
multiplexing the PUCCH within a plurality of interleaved resource blocks according to a code division multiplexing sequence or other orthogonal sequence.

17. The method of claim 14, wherein communicating the generated OFDMA waveform in a signal using the uplink channel comprises:
multiplexing the PUCCH within a plurality of resource elements of an enhanced resource element group.

18. The method of claim 1, wherein the uplink channel comprises a Physical Random Access Channel (PRACH) transmitted on one or more pre-allocated interlaces.

19. The method of claim 1, further comprising:
transmitting a sounding reference signal (SRS) on the uplink channel, the SRS being located in an OFDM symbol position of a subframe that is different from a last OFDM symbol position of the subframe.

20. The method of claim 1, further comprising:
transmitting a channel state information reference signal (CSI-RS) in the uplink channel, independent of an allocation of resources and on all resource blocks or depending on a resource allocation.

21. The method of claim 20, further comprising:
generating, by a base station, a precoder to be used in a downlink channel based at least in part on the uplink CSI-RS transmission.

22. The method of claim 20, further comprising:
indicating a rate matching for the PUCCH and the PUSCH to accommodate transmission of the CSI-RS.

23. The method of claim 20, further comprising:
transmitting a channel state information interference measurement (CSI-IM) in the uplink channel.

24. The method of claim 1, further comprising:
communicating the generated OFDMA waveform without a sounding reference signal (SRS) in the signal using the uplink channel.

25. The method of claim 1, further comprising:
using the allocated resources to transmit the uplink channel when the uplink channel comprises the PUSCH but not the PUCCH.

26. The method of claim 1, further comprising:
when the uplink channel comprises the PUCCH and the PUSCH, frequency division multiplexing the PUCCH and the PUSCH by puncturing at least one frequency sub-carrier of at least one resource block of the first set of resource blocks to transmit at least part of the PUSCH.

27. The method of claim 1, further comprising;
frequency division multiplexing the PUCCH and the PUSCH on the uplink channel;
transmitting acknowledgements pertaining to a Physical Downlink Shared Channel (PDSCH) as part of the PUCCH; and
transmitting channel quality information (CQI) of a plurality of downlink carriers simultaneously as part of the PUSCH.

28. The method of claim 1, further comprising:
receiving signaling from a base station; and
selecting the OFDMA configuration of the uplink channel based at least in part on the received signaling.

29. The method of claim 28, wherein the signaling from the base station indicates the allocation of the plurality of resource blocks.

30. The method of claim 28, wherein the OFDMA configuration of the uplink channel is selected based at least in part on a modulation and coding scheme (MCS) indicated in a downlink grant or whether an uplink multiple-input multiple-output (UL-MIMO)/multi-user MIMO (MU-MIMO) is enabled or disabled.

31. An apparatus for wireless communication, comprising:
means for identifying an orthogonal frequency-division multiple access (OFDMA) configuration of an uplink channel for uplink communications based at least in part on an allocation of a plurality of resource blocks, the uplink channel comprising a Physical Uplink Shared Channel (PUSCH), or a Physical Uplink Control Channel (PUCCH), or both;
means for generating an OFDMA waveform based on the identified OFDMA configuration;
means for communicating the generated OFDMA waveform in a signal using the uplink channel in the plurality of resource blocks;
means for transmitting a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
means for determining allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and
means for, when the uplink channel comprises the PUCCH and the PUSCH, frequency division multiplexing the PUCCH and the PUSCH on the uplink channel, wherein frequency division multiplexing the PUCCH and the PUSCH on the uplink channel comprises:
means for transmitting the PUCCH using a subset of less than all of the plurality of resource blocks; and
means for transmitting the PUSCH using at least some of the allocated resources.

32. The apparatus of claim 31, wherein allocating the resources for the PUSCH is for multi-cluster transmission, wherein allocating the resources for the PUSCH is based in part on two or more of the resource blocks assigned to a user equipment.

33. The apparatus of claim 31, further comprising:
means for mapping one or more modulation symbols to one or more resource elements according to one or more OFDM symbol positions.

34. The apparatus of claim 31, further comprising:
means for mapping one or more modulation symbols to one or more resource elements according to one or more frequency sub-carriers.

35. The apparatus of claim 31, further comprising:
means for mapping one or more modulation symbols to one or more resource elements according to an interleaving of time slots and frequency sub-carriers.

36. The apparatus of claim 31, wherein:
the first reference signal comprises a demodulation reference signal (DM-RS) and the second reference signal comprises a user equipment specific reference signal (UE-RS).

37. The apparatus of claim 31, further comprising:
means for transmitting a third reference signal on the uplink channel in a third set of one or more time slots and one or more third frequency sub-carriers, wherein the third set of one or more time slots and one or more third frequency sub-carriers differs in at least one respect from a fourth set of one or more time slots and one or more fourth frequency sub-carriers used to receive a fourth reference signal on a downlink channel, wherein the first reference signal comprises a first demodulation reference signal (DM-RS), the second reference signal comprises a first user equipment specific reference signal (UE-RS), the third reference signal comprises a second DM-RS different from the first DM-RS, and the fourth reference signal comprises a second UE-RS different from the first UE-RS.

38. The apparatus of claim 31, further comprising:
means for using physical resource block (PRB) bundling when generating the OFDMA waveform based on the identified OFDMA configuration.

39. The apparatus of claim 31, further comprising:
means for using precoder cycling when generating the OFDMA waveform based on the identified OFDMA configuration, wherein a precoder is cycled through a pre-defined set of precoders, and wherein the precoder is indicated by a base station as part of an uplink grant.

40. The apparatus of claim 39, wherein the precoder is derived by a UE based at least in part on downlink channel state information reference signal (CSI-RS) transmissions.

41. The apparatus of claim 31, wherein the uplink channel comprises an uplink multiple-input multiple-output (UL-MIMO) channel or a multi-user MIMO (MU-MIMO) channel.

42. The apparatus of claim 31, further comprising:
means for applying symbol permutation or phase rotation to reduce a metric indicating symbol power when generating the OFDMA waveform based on the identified OFDMA configuration.

43. The apparatus of claim 31, further comprising:
means for applying different scrambling sequences to the OFDMA waveform; and
means for selecting one of the scrambling sequences for use when communicating the generated OFDMA waveform in the signal.

44. The apparatus of claim 31, wherein the uplink channel comprises the PUCCH.

45. The apparatus of claim 44, wherein the means for communicating the generated OFDMA waveform in a signal using the uplink channel comprises:
transmitting duplicate copies of the PUCCH in a plurality of interleaved resource blocks.

46. The apparatus of claim 44, wherein communicating the generated OFDMA waveform in a signal using the uplink channel comprises:
multiplexing the PUCCH within a plurality of interleaved resource blocks according to a code division multiplexing sequence or other orthogonal sequence.

47. The apparatus of claim 44, wherein communicating the generated OFDMA waveform in a signal using the uplink channel comprises:
means for multiplexing the PUCCH within a plurality of resource elements of an enhanced resource element group.

48. The apparatus of claim 31, wherein the uplink channel comprises a Physical Random Access Channel (PRACH) transmitted on one or more pre-allocated interlaces.

49. The apparatus of claim 31, further comprising:
means for transmitting a sounding reference signal (SRS) on the uplink channel, the SRS being located in an OFDM symbol position of a subframe that is different from a last OFDM symbol position of the subframe.

50. The apparatus of claim 31, further comprising:
means for transmitting a channel state information reference signal (CSI-RS) in the uplink channel, independent of an allocation of resources and on all resource blocks or depending on a resource allocation.

51. The apparatus of claim 50, further comprising:
means for generating, by a base station, a precoder to be used in a downlink channel based in part on the uplink CSI-RS transmission.

52. The apparatus of claim 50, further comprising:
means for indicating a rate matching for the PUCCH and the PUSCH and to accommodate transmission of the CSI-RS.

53. The apparatus of claim 50, further comprising:
means for transmitting a channel state information interference measurement (CSI-IM) in the uplink channel.

54. The apparatus of claim 31, further comprising:
means for communicating the generated OFDMA waveform without a sounding reference signal (SRS) in the signal using the uplink channel.

55. The apparatus of claim 31, further comprising:
means for using the allocated resources to transmit the uplink channel when the uplink channel comprises the PUSCH but not the PUCCH.

56. The apparatus of claim 31, further comprising:
means for, when the uplink channel comprises the PUCCH and the PUSCH, frequency division multiplexing the PUCCH and the PUSCH by puncturing at least one frequency sub-carrier of at least one resource block of the first set of resource blocks to transmit at least part of the PUSCH.

57. The apparatus of claim 31, further comprising;
means for frequency division the PUCCH and the PUSCH on the uplink channel;
means for transmitting acknowledgements pertaining to a Physical Downlink Shared Channel (PDSCH) as part of the PUCCH; and
means for transmitting channel quality information (CQI) of a plurality of downlink carriers simultaneously as part of the PUSCH.

58. The apparatus of claim 31, further comprising:
means for receiving signaling from a base station; and
means for selecting the OFDMA configuration of the uplink channel based at least in part on the received signaling.

59. The apparatus of claim 58, wherein the signaling from the base station indicates the allocation of the plurality of resource blocks.

60. The apparatus of claim 58, wherein the OFDMA configuration of the uplink channel is selected based at least in part on a modulation and coding scheme (MCS) indicated in a downlink grant or whether an uplink multiple-input multiple-output (UL-MIMO)/multi-user MIMO (MU-MIMO) is enabled or disabled.

61. An apparatus for wireless communication, comprising:
a processor;
memory coupled to the processor; and
instructions stored in the memory, the instructions being executable by the processor to: identify an orthogonal frequency-division multiple access (OFDMA) configuration of an uplink channel for uplink communications based at least in part on an allocation of a plurality of resource blocks, the uplink channel comprising a Physical Uplink Shared Channel (PUSCH), or a Physical Uplink Control Channel (PUCCH), or both;
generate an OFDMA waveform based on the identified OFDMA configuration; communicate the generated OFDMA waveform in a signal using the uplink channel in the plurality of resource blocks;
transmit a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
determine allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and
when the uplink channel comprises the PUCCH and the PUSCH, frequency division multiplex the PUCCH and the PUSCH on the uplink channel, wherein frequency division multiplexing the PUCCH and the PUSCH on the uplink channel comprises:
transmit the PUCCH using a subset of less than all of the plurality of resource blocks; and
transmit the PUSCH using at least some of the allocated resources.

62. The apparatus of claim 61, wherein:
the first reference signal comprises a demodulation reference signal (DM-RS) and the second reference signal comprises a user equipment specific reference signal (UE-RS).

63. The apparatus of claim 61, wherein the instructions are executable by the processor to:
apply symbol permutation or phase rotation to reduce a metric indicating symbol power when generating the OFDMA waveform based on the identified OFDMA configuration.

64. The apparatus of claim 61, wherein the instructions are executable by the processor to:
apply different scrambling sequences to the OFDMA waveform; and
select one of the scrambling sequences for use when communicating the generated OFDMA waveform in the signal.

65. The apparatus of claim 61, wherein the uplink channel comprises the PUCCH.

66. The apparatus of claim 65, wherein the instructions executable by the processor to communicate the generated OFDMA waveform in a signal using the uplink channel comprise instructions executable by the processor to:
transmit duplicate copies of the PUCCH in a plurality of interleaved resource blocks.

67. The apparatus of claim 65, wherein the instructions executable by the processor to communicate the generated OFDMA waveform in a signal using the uplink channel comprise instructions executable by the processor to:
multiplex the PUCCH within a plurality of interleaved resource blocks according to a code division multiplexing sequence or other orthogonal sequence.

68. The apparatus of claim 65, wherein the instructions executable to communicate the generated OFDMA waveform in a signal using the uplink channel comprise instructions executable by the processor to:
multiplex the PUCCH within a plurality of resource elements of an enhanced resource element group.

69. The apparatus of claim 61, wherein the instructions are executable by the processor to:
transmit a channel state information reference signal (CSI-RS) in the uplink channel, independent of an allocation of resources and on all resource blocks or depending on a resource allocation.

70. The apparatus of claim 61, wherein the instructions are executable by the processor to:
use the first set of resource blocks to transmit the uplink channel when the uplink channel comprises the PUCCH and the PUSCH; and
use the second set of resource blocks to transmit the uplink channel when the uplink channel comprises the PUSCH but not the PUCCH, the second set of resource blocks being different than the first set of resource blocks.

71. The apparatus of claim 61, wherein the instructions are executable by the processor to:
when the PUCCH and the PUSCH are frequency division multiplexed, also use at least one of the first set of resource blocks to transmit the PUSCH.

72. The apparatus of claim 61, wherein the instructions are executable by the processor to:
when the uplink channel comprises the PUCCH and the PUSCH, frequency division multiplex the PUCCH and the PUSCH by puncturing at least one frequency sub-carrier of at least one resource block of the first set of resource blocks to transmit at least part of the PUSCH.

73. The apparatus of claim 61, wherein the instructions are executable by the processor to:
frequency division multiplex the PUCCH and the PUSCH on the uplink channel;
transmit acknowledgements pertaining to a Physical Downlink Shared Channel (PDSCH) as part of the PUCCH; and
transmitting channel quality information (CQI) of a plurality of downlink carriers simultaneously as part of the PUSCH.

74. A non-transitory computer-readable medium storing computer-executable code for wireless communications, the code executable by a processor to:
- identify an orthogonal frequency-division multiple access (OFDMA) configuration of an uplink channel for uplink communications based at least in part on an allocation of a plurality of resource blocks, the uplink channel comprising a Physical Uplink Shared Channel (PUSCH), or a Physical Uplink Control Channel (PUCCH), or both;
- generate an OFDMA waveform based on the identified OFDMA configuration;
- communicate the generated OFDMA waveform using the uplink channel in the plurality of resource blocks;
- transmit a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
- determine allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and
- when the uplink channel comprises the PUCCH and the PUSCH, frequency division multiplex the PUCCH and the PUSCH on the uplink channel, wherein frequency division multiplexing the PUCCH and the PUSCH on the uplink channel comprises:
  - transmit the PUCCH using a subset of less than all of the plurality of resource blocks; and
  - transmit the PUSCH using at least some of the allocated resources.

75. The non-transitory computer-readable medium of claim 74, wherein the first reference signal comprises a demodulation reference signal (DM-RS) and the second reference signal comprises a user equipment specific reference signal (UE-RS).

76. The non-transitory computer-readable medium of claim 74, wherein the code is executable by the processor to:
- transmit a channel state information reference signal (CSI-RS) in the uplink channel, independent of an allocation of resources and on all resource blocks or depending on a resource allocation.

77. The non-transitory computer-readable medium of claim 74, wherein the code is executable by the processor to:
- use the first set of resource blocks to transmit the uplink channel when the uplink channel comprises the PUCCH but not the PUSCH; and
- use the second set of resource blocks to transmit the uplink channel when the uplink channel comprises the PUSCH but not the PUCCH, the second set of resource blocks being different than the first set of resource blocks.

78. The non-transitory computer-readable medium of claim 74, wherein the code is executable by the processor to:
- when the uplink channel comprises the PUCCH and the PUSCH, frequency division multiplex the PUCCH and the PUSCH by puncturing at least one frequency sub-carrier of at least one resource block of the first set of resource blocks to transmit at least part of the PUSCH.

79. A method for wireless communication, comprising:
- dynamically selecting at a user equipment (UE) a configuration of an uplink channel, the UE configured to dynamically select the configuration from at least two of the following options for uplink communications: an orthogonal frequency-division multiple access (OFDMA) configuration, a single carrier frequency-division multiple access (SC-FDMA) configuration, and a resource block interleaved frequency-division multiple access (FDMA) configuration;
- generating a waveform based on the selected at least one configuration;
- communicating the generated waveform in a signal using the uplink channel;
- transmitting a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
- determine allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and
- when the uplink channel comprises a Physical Uplink Shared Channel (PUSCH) and a Physical Uplink Control Channel (PUCCH), frequency division multiplexing the PUCCH and the PUSCH on the uplink channel, wherein frequency division multiplexing the PUCCH and the PUSCH on the uplink channel comprises:
  - transmitting the PUCCH using a subset of less than all of the plurality of resource blocks; and
  - transmitting the PUSCH using at least some of the allocated resources.

80. The method of claim 79, further comprising:
- receiving signaling from a base station; and
- selecting the configuration of the uplink channel based at least in part on the received signaling.

81. The method of claim 80, wherein the signaling from the base station indicates a resource block allocation, and wherein the configuration of the uplink channel is selected based at least in part on the resource block allocation.

82. The method of claim 80, wherein the configuration of the uplink channel is selected based at least in part on a modulation and coding scheme (MCS) indicated in a downlink grant or whether an uplink multiple-input multiple-output (UL-MIMO)/multi-user MIMO (MU-MIMO) is enabled or disabled.

83. An apparatus for wireless communication, comprising:
- means for dynamically selecting at a user equipment (UE) a configuration of an uplink channel, the UE configured to dynamically select the configuration from at least two of the following options for uplink communications: an orthogonal frequency-division multiple access (OFDMA) configuration, a single carrier frequency-division multiple access (SC-FDMA) configuration, and a resource block interleaved frequency-division multiple access (FDMA) configuration;
- means for generating a waveform based on the selected at least one configuration;
- means for communicating the generated waveform in a signal using the uplink channel;

means for transmitting a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;

means for determining allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and means for, when the uplink channel comprises a Physical Uplink Shared Channel (PUSCH) and a Physical Uplink Control Channel (PUCCH), frequency division multiplexing the PUCCH and the PUSCH on the uplink channel, wherein frequency division multiplexing the PUCCH and the PUSCH on the uplink channel comprises:

means for transmitting the PUCCH using a subset of less than all of the plurality of resource blocks; and means for transmitting the PUSCH using at least some of the allocated resources.

84. The apparatus of claim 83, further comprising:
means for receiving signaling from a base station; and
means for selecting the configuration of the uplink channel based at least in part on the received signaling.

85. The apparatus of claim 84, wherein the signaling from the base station indicates a resource block allocation, and wherein the means for selecting the configuration of the uplink channel comprises means for selecting the configuration of the uplink channel based at least in part on the resource block allocation.

86. The apparatus of claim 84, wherein the means for selecting the configuration of the uplink channel comprises means for selecting the configuration of the uplink channel based at least in part on a modulation and coding scheme (MCS) indicated in a downlink grant or whether an uplink multiple-input multiple-output (UL-MIMO)/multi-user MIMO (MU-MIMO) is enabled or disabled.

87. An apparatus for wireless communication, comprising:
a processor;
memory coupled to the processor; and
instructions stored in the memory, the instructions being executable by the processor to:
dynamically select at a user equipment (UE) a configuration of an uplink channel, the UE configured to dynamically select the configuration from at least two of the following options for uplink communications: an uplink channel from an orthogonal frequency-division multiple access (OFDMA) configuration, a single carrier frequency-division multiple access (SC-FDMA) configuration, and a resource block interleaved frequency-division multiple access (FDMA) configuration;
generate a waveform based on the selected at least one configuration;
communicate the generated waveform in a signal using the uplink channel;
transmit a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
determine allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and
when the uplink channel comprises a Physical Uplink Shared Channel (PUSCH) and a Physical Uplink Control Channel (PUCCH), frequency division multiplex the PUCCH and the PUSCH on the uplink channel, wherein frequency division multiplexing the PUCCH and the PUSCH on the uplink channel comprises:
transmitting the PUCCH using a subset of less than all of the plurality of resource blocks; and
transmitting the PUSCH using at least some of the allocated resources.

88. The apparatus of claim 87, wherein the instructions are executable by the processor to:
receive signaling from a base station; and
select the configuration of the uplink channel based at least in part on the received signaling.

89. The apparatus of claim 88, wherein the signaling from the base station indicates a resource block allocation, and wherein the instructions are executable by the processor to dynamically select the configuration of the uplink channel based at least in part on the resource block allocation.

90. The apparatus of claim 88, wherein the instructions are executable by the processor to dynamically select the configuration of the uplink channel based at least in part on a modulation and coding scheme (MCS) indicated in a downlink grant or whether an uplink multiple-input multiple-output (UL-MIMO)/multi-user MIMO (MU-MIMO) is enabled or disabled.

91. A non-transitory computer-readable medium storing computer-executable code for wireless communications, the code executable by a processor to:
dynamically select at a user equipment (UE) a configuration of an uplink channel, the UE configured to dynamically select the configuration from at least two of the following options for uplink communications: an uplink channel from an orthogonal frequency-division multiple access (OFDMA) configuration, a single carrier frequency-division multiple access (SC-FDMA) configuration, and a resource block interleaved frequency-division multiple access (FDMA) configuration;
generate a waveform based on the selected at least one configuration;
communicate the generated waveform in a signal using the uplink channel;
transmit a first reference signal on the uplink channel in a first set of one or more time slots and one or more first frequency sub-carriers, wherein the first set of one or more time slots and one or more first frequency sub-carriers are the same as a second set of one or more time slots and one or more second frequency sub-carriers used to receive a second reference signal on a downlink channel;
determine allocated resources for the PUSCH based at least in part on a bitmap of interlaces, wherein the allocated resources for the PUSCH are based at least in part on a starting interlace and a number of interlaces, and wherein an interlace comprises a pre-defined set of resource blocks; and when the uplink channel comprises a Physical Uplink Shared Channel (PUSCH) and a Physical Uplink Control Channel (PUCCH), frequency division multiplex the PUCCH and the PUSCH on the uplink channel, wherein frequency division multiplexing the PUCCH and the PUSCH on the uplink channel comprises:

transmitting the PUCCH using a subset of less than all of the plurality of resource blocks; and transmitting the PUSCH using at least some of the allocated resources.

92. The non-transitory computer-readable medium of claim 91, wherein the code is executable by the processor to:

receive signaling from a base station; and select the configuration of the uplink channel based at least in part on the received signaling.

93. The non-transitory computer-readable medium of claim 92, wherein the signaling from the base station indicates a resource block allocation, and wherein the code is executable by the processor to dynamically select the configuration of the uplink channel based at least in part on the resource block allocation.

94. The non-transitory computer-readable medium of claim 92, wherein the code is executable by the processor to dynamically select the configuration of the uplink channel based at least in part on a modulation and coding scheme (MCS) indicated in a downlink grant or whether an uplink multiple-input multiple-output (UL-MIMO)/multi-user MIMO (MU-MIMO) is enabled or disabled.

95. The method of claim 1, further comprising:

allocating resources for the PUSCH based at least in part on a starting resource block and a number of resource blocks.

96. The method of claim 1, wherein the uplink channel for uplink communications is associated with an unlicensed radio frequency spectrum band.

* * * * *